United States Patent
Kawasaki et al.

(10) Patent No.: US 11,284,464 B2
(45) Date of Patent: Mar. 22, 2022

(54) TERMINAL APPARATUS, APPARATUS IN CORE NETWORK, AND COMMUNICATION CONTROL METHOD

(71) Applicants: SHARP KABUSHIKI KAISHA, Sakai (JP); FG INNOVATION COMPANY LIMITED, Tuen Mun (HK)

(72) Inventors: Yudai Kawasaki, Sakai (JP); Masafumi Aramoto, Sakai (JP); Shuichiro Chiba, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/637,703

(22) PCT Filed: Aug. 6, 2018

(86) PCT No.: PCT/JP2018/029366
§ 371 (c)(1),
(2) Date: Feb. 7, 2020

(87) PCT Pub. No.: WO2019/031433
PCT Pub. Date: Feb. 14, 2019

(65) Prior Publication Data
US 2020/0170067 A1 May 28, 2020

(30) Foreign Application Priority Data

Aug. 9, 2017 (JP) .............................. JP2017-154081

(51) Int. Cl.
*H04W 4/00* (2018.01)
*H04W 76/19* (2018.01)
(Continued)

(52) U.S. Cl.
CPC ......... *H04W 76/19* (2018.02); *H04W 12/033* (2021.01); *H04W 12/0471* (2021.01); *H04W 80/08* (2013.01)

(58) Field of Classification Search
CPC ............... H04W 76/19; H04W 12/033; H04W 12/0471; H04W 80/08; H04W 76/11;
(Continued)

(56) References Cited

U.S. PATENT DOCUMENTS

| 2008/0172582 A1* | 7/2008 | Sinicrope | ............. H04L 63/164 714/48 |
| 2010/0199332 A1* | 8/2010 | Bachmann | ............ H04L 63/164 726/4 |

(Continued)

FOREIGN PATENT DOCUMENTS

| WO | WO 2016/0187871 | * 12/2016 | ............ H04W 48/00 |

OTHER PUBLICATIONS

3rd Generation Partnership Project; Technical Specification Group Services and System Aspects; Procedures for the 5G System; Stage 2 (Release 15), 3GPP TS 23.502 V0. 2.0 (Feb. 2017), pp. 1-70.*
(Continued)

*Primary Examiner* — Phuongchau Ba Nguyen
(74) *Attorney, Agent, or Firm* — ScienBiziP, P.C.

(57) ABSTRACT

A terminal apparatus and an apparatus in a core network implement a service request procedure for re-establishing UP resources that have been released. In the service request procedure, re-establishment of the UP resources for multiple PDU sessions is implemented. With this configuration, a UP resource associated with a specific PDU session is allowed to be released while maintaining the specific PDU session established, and a system and a communication control method that allow the UP resource to be released are provided.

2 Claims, 16 Drawing Sheets

(51) Int. Cl.
*H04W 80/08* (2009.01)
*H04W 12/033* (2021.01)
*H04W 12/0471* (2021.01)

(58) Field of Classification Search
CPC ..... H04W 76/34; H04W 76/27; H04W 12/06; H04W 12/0431; H04W 28/04; H04W 72/04; H04W 72/042; H04W 88/08; H04W 76/20; H04W 12/069; H04W 28/0226; H04W 28/0268; H04W 36/0044; H04W 36/14; H04W 40/36; H04W 76/16; H04W 8/06; H04W 8/18; H04W 8/24; H04L 5/0007; H04L 63/0485; H04L 12/4633; H04L 63/0428; H04L 63/08; H04L 63/164

See application file for complete search history.

(56) References Cited

U.S. PATENT DOCUMENTS

| | | | | |
|---|---|---|---|---|
| 2018/0198867 A1* | 7/2018 | Dao | ...................... | H04W 76/34 |
| 2018/0352483 A1* | 12/2018 | Youn | ...................... | H04W 76/11 |
| 2019/0394833 A1* | 12/2019 | Talebi Fard | .......... | H04W 60/00 |
| 2021/0014742 A1* | 1/2021 | Wang | ...................... | H04W 36/14 |
| 2021/0136858 A1* | 5/2021 | Kawasaki | ............. | H04W 76/20 |
| 2021/0306275 A1* | 9/2021 | Ke | .......................... | H04L 47/24 |

OTHER PUBLICATIONS

3rd Generation Partnership Project; Technical Specification Group Services and System Aspects; System Architecture tor the 5G System; Stage 2(Release 15); 3GPP TS 23.501 V1.1.0 (Jul. 2017).

3rd Generation Partnership Project; Technical Specification Group Services and System Aspects; Procedures for the 5G System; Stage 2(Release 15); 3GPP TS 23.502 V0.5.0 (Jul. 2017).

3rd Generation Partnership Project; Technical Specification Group Services and System Aspects; General Packet Radio Service (GPRS) enhancements for Evolved Universal Terrestrial Radio Access Network (E-UTRAN) access (Release 14); 3GPP TS 23.401 V14.4.0 (Jun. 2017).

Motoria Mobility et al.: "Changes to PDU Session Establishment via untrusted non-3GPP access"; S2-173768; SA WG2 Meeting #121; May 15-19, 2017, Hangzhou, P.R. China.

SA2: "LS on interworking and migration for 5GS and EPS (including Option 3)"; RP-170034; 3GPP TSG RAN Meeting #75; Dubrovnik, Croatia, Mar. 6-9, 2017.

Nokia, Alcatel-Lucent Shanghai Bell, Lenovo, Motorola Mobility, Broadcom: "23.502: Re-activation of N2 and N3 via untrusted non-3GPP access", S2-174282, SA WG2 Meeting #122, Jun. 26-30, 2017, San Jose del cabo, Mexico.

* cited by examiner

TERMINAL APPARATUS, APPARATUS IN CORE NETWORK, AND COMMUNICATION CONTROL METHOD

TECHNICAL FIELD

The present invention relates to a terminal apparatus, an apparatus in a core network, and a communication control method. This application claims priority based on JP 2017-154081 filed on Aug. 9, 2017 in Japan, the contents of which are incorporated herein in its entirety by reference.

BACKGROUND ART

The 3rd Generation Partnership Project (3GPP), which undertakes activities for standardizing recent mobile communication systems, discusses System Architecture Evolution (SAE), which is system architecture of Long Term Evolution (LTE). The 3GPP is in a process of standardizing Evolved Packet System (EPS) as a communication system for achieving an all-Internet Protocol (IP) architecture. Note that a core network constituting the EPS is called an Evolved Packet Core (EPC).

Additionally, the 3GPP recently has been studying a next-generation communication technology and a system architecture for 5th Generation (5G) mobile communication system which is a next-generation mobile communication system. Especially, as a system for achieving the 5G mobile communication system, the 3GPP is in a process of standardizing 5G System (5GS) (see NPL 1 and NPL 2). In the 5GS, technical problems for connecting various terminals to a cellular network are identified for standardization to address the technical problems.

For example, requirement conditions include optimization and diversification of a communication procedure for supporting a continual mobile communication service depending on a terminal supporting various access networks, optimization of a system architecture suitable for the optimization and diversification of the communication procedure, and the like.

CITATION LIST

Non Patent Literature

NPL 1: 3GPP TS 23.501 v1.1.0; 3rd Generation Partnership Project; Technical Specification Group Services and System Aspects; System Architecture for the 5G System; Stage 2 (Release 15)

NPL 2: 3GPP TS 23.502 v0.5.0; 3rd Generation Partnership Project; Technical Specification Group Services and System Aspects; Procedures for the 5G System; Stage 2 (Release 15)

NPL 3: 3GPP TS 23.401 v14.4.0; 3rd Generation Partnership Project; Technical Specification Group Services and System Aspects; General Packet Radio Service (GPRS) enhancements for Evolved Universal Terrestrial Radio Access Network (E-UTRAN) access (Release 14)

SUMMARY OF INVENTION

Technical Problem

In the 5GS, a terminal apparatus in a state in which User Plane (UP) resources associated with a specific PDU session out of established PDU Sessions are released is also under study. Further, as a new feature, a system for establishing UP resources associated with a specific PDU session in a connected state is under study (see NPL 1 and NPL 2).

However, in a connected network of a terminal apparatus allowed to use such a special state as above, how the network releases or re-establishes UP resources associated with a specific PDU session, or how the terminal apparatus recognizes a release of UP resources associated with a specific PDU session has not been clarified.

The present invention has been made under such circumstances, and has an object to provide a system and a communication control method for releasing or re-establishing UP resources associated with a specific PDU session while maintaining establishment of the specific PDU session, and to provide a system and a communication control method for allowing a terminal apparatus to recognize a release of UP resources associated with a specific PDU session.

Solution to Problem

A terminal apparatus according to the present embodiment includes: a controller configured to perform a first service request procedure for transition from an idle state to a connected state; and a transmission and/or reception unit configured to receive, for a Protocol Data Unit (PDU) session, an Internet Key Exchange (IKE) child Security Association (SA) creation request message including identification information of the PDU session from a device in a core network in the first service request procedure, wherein the controller re-establishes User Plane (UP) resources of one or multiple of the PDU sessions, based on the first service request procedure.

An apparatus in a core network according to the present embodiment includes: a controller configured to perform a first service request procedure for transition from an idle state to a connected state; and a transmission and/or reception unit configured to transmit, for a Protocol Data Unit (PDU) session, an Internet Key Exchange (IKE) child Security Association (SA) creation request message including identification information of the PDU session to a terminal apparatus in the first service request procedure, wherein the controller re-establishes User Plane (UP) resources of one or multiple of the PDU sessions, based on the first service request procedure.

A communication control method for a terminal apparatus according to the present embodiment includes the steps of: performing a first service request procedure for transition from an idle state to a connected state; receiving, for a Protocol Data Unit (PDU) session, an Internet Key Exchange (IKE) child Security Association (SA) creation request message including identification information of the PDU session from a device in a core network in the first service request procedure; and re-establishing User Plane (UP) resources of one or multiple of the PDU sessions, based on the first service request procedure.

A communication control method for a core network according to the present embodiment includes the steps of: performing a first service request procedure for transition from an idle state to a connected state; transmitting, for a Protocol Data Unit (PDU) session, an Internet Key Exchange (IKE) child Security Association (SA) creation request message including identification information of the PDU session to a terminal apparatus in the first service request procedure; and re-establishing User Plane (UP)

resources of one or multiple of the PDU sessions, based on the first service request procedure.

Advantageous Effects of Invention

According to the present invention, a terminal apparatus and an apparatus in a core network configuring a 5GS can release UP resources associated with a specific PDU session while maintaining establishment of the specific PDU session. Further, in a case that UP resources associated with a specific PDU session are released, a terminal apparatus configuring a 5GS can recognize the release of the UP resources. Further, the released UP resources can be re-established.

DESCRIPTION OF EMBODIMENTS

A preferred embodiment for carrying out the present invention will be described below with reference to the drawings. Note that as an example, the present embodiment describes an embodiment of a mobile communication system to which the present invention is applied.

1. System Overview

Figure 1:
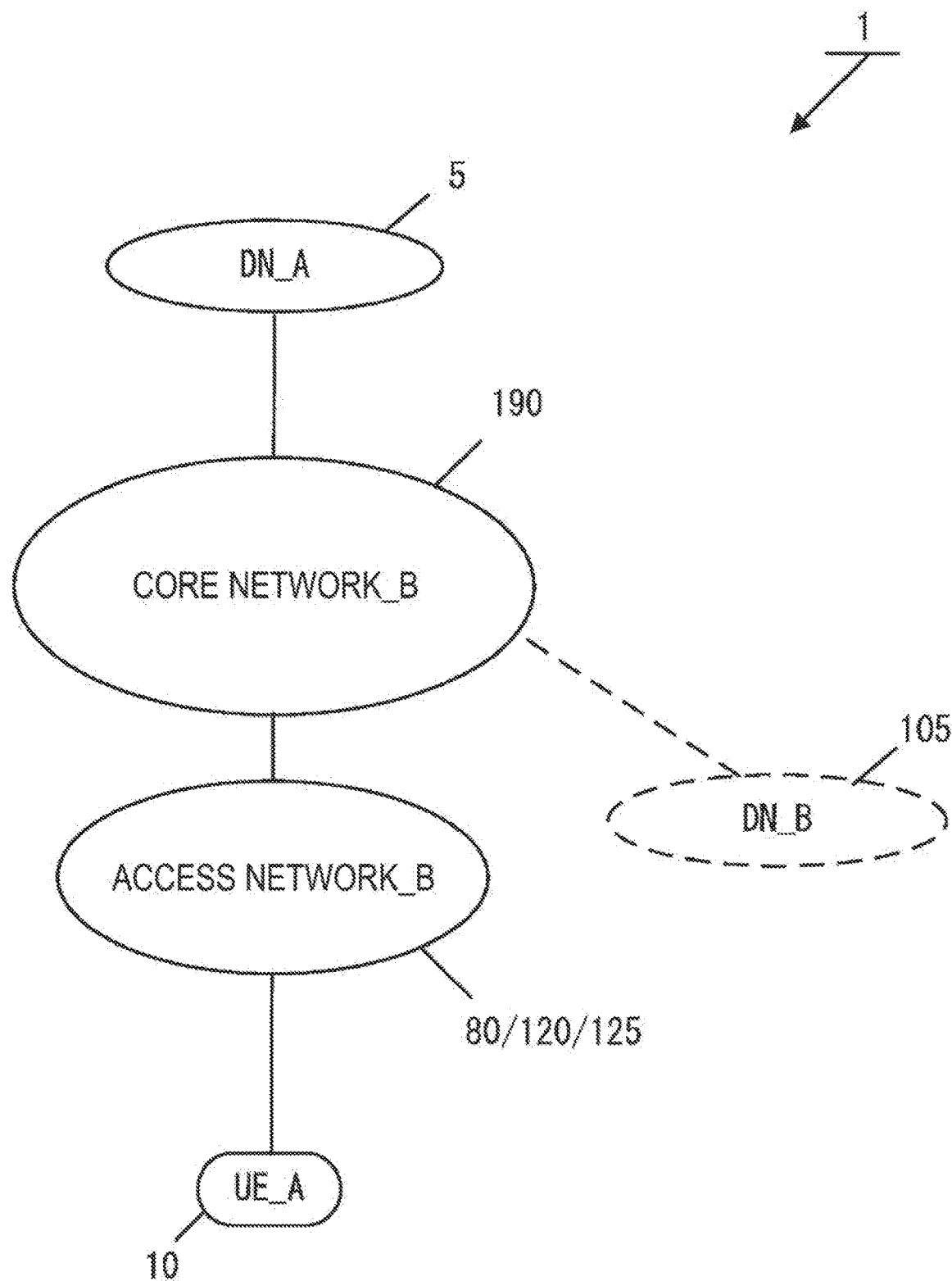
FIG. 1 is a diagram illustrating an overview of a mobile communication system.
Figure 2:
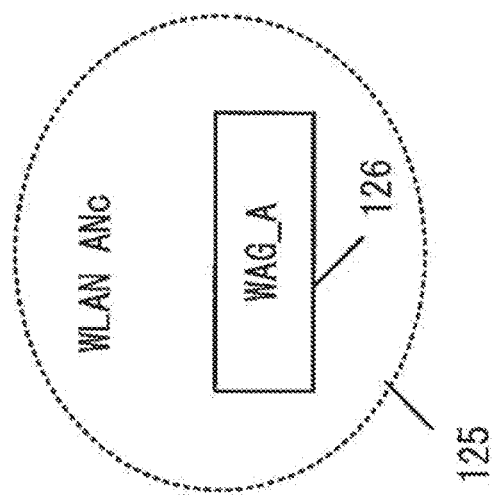
FIG. 2 is a diagram illustrating an example of a configuration or the like of an access network in the mobile communication system.
Figure 2:
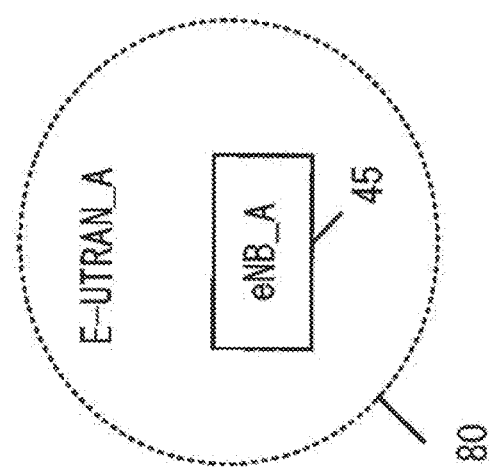
Figure 2:
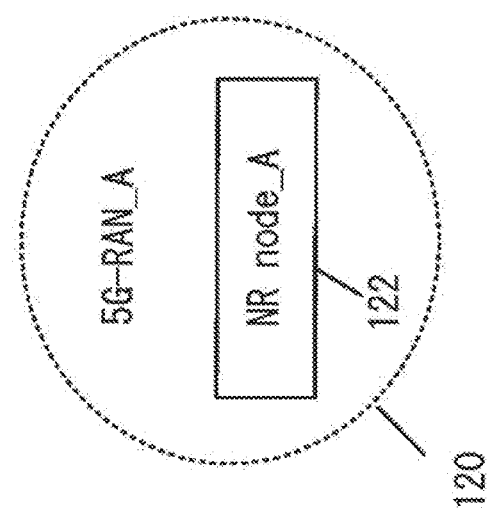
Figure 3:
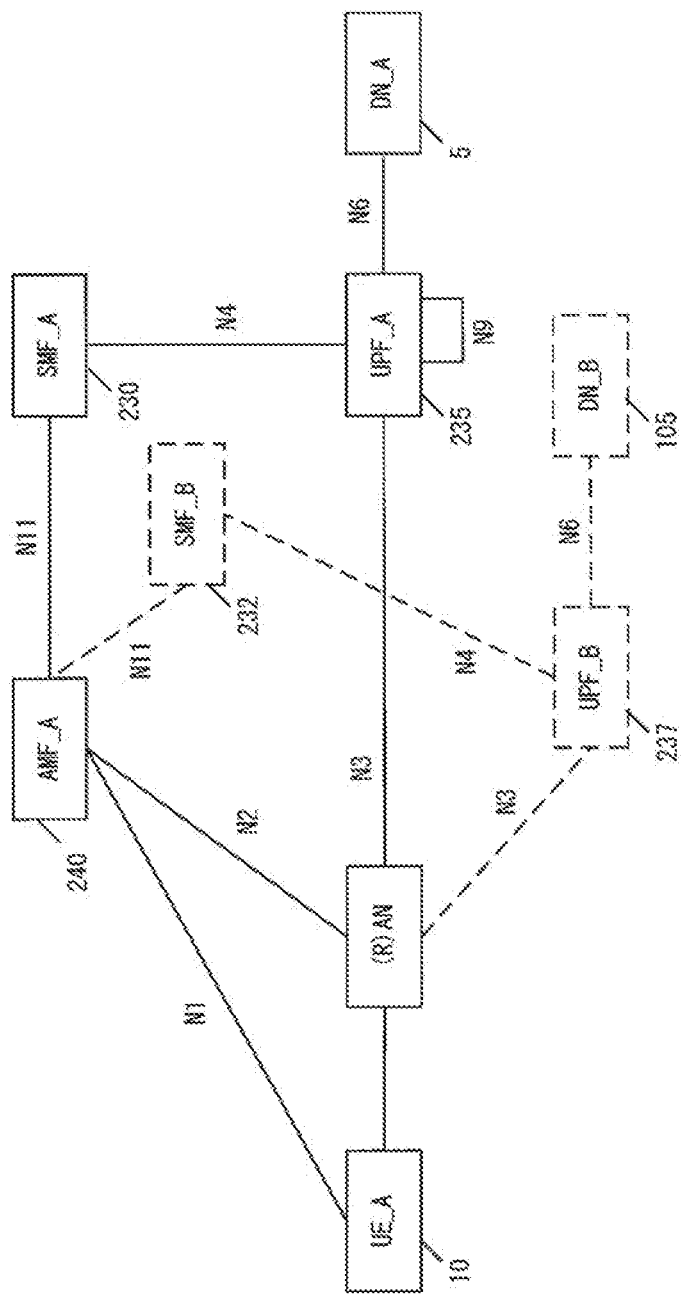
FIG. 3 is a diagram illustrating an example of a configuration or the like of a core network in the mobile communication system.

A schematic mobile communication system according to the present embodiment will be described with reference to FIG. 1, FIG. 2, and FIG. 3. FIG. 2 is a diagram illustrating details of an access network in the mobile communication system of FIG. 1. FIG. 3 is a diagram mainly illustrating details of a core network in the mobile communication system of FIG. 1. As illustrated in FIG. 1, a mobile communication system 1 (also referred to as a 5GS) according to the present embodiment includes a terminal apparatus (also referred to as a user equipment and a mobile terminal apparatus) User Equipment (UE)_A 10, an Access Network (AN)_B, a Core Network (CN)_B 190, and a Data Network (DN)_A 5 and a DN_B 105.

Here, the UE_A 10 may be equipment connectable to a network service via 3GPP access (also referred to as a 3GPP access network) and/or non-3GPP access (also referred to as a non-3GPP access network). The UE_A 10 may include a Universal Integrated Circuit Card (UICC) and an Embedded UICC (eUICC). The UE_A 10 may be a wirelessly connectable terminal apparatus, and may be a Mobile Equipment (ME), a Mobile Station (MS), a Cellular Internet of Things (CIoT) terminal (CIoT UE), or the like.

The UE_A 10 can connect to the access network and/or the core network. The UE_A 10 can connect to the DN_A 5 via the access network and/or the core network. The UE_A 10 transmits and/or receives (communicates) user data to and/or from the DN_A 5 by using a Protocol Data Unit or a Packet Data Unit (PDU) session. Furthermore, the communications of the user data are not limited to Internet Protocol (IP) communications, and may be non-IP communications.

Here, the IP communications are data communications using the IP, and are data communications achieved through transmitting and/or receiving IP packets to which IP headers are given. Note that a payload section constituting the IP packet may include the user data transmitted and/or received by the UE_A 10. The non-IP communications are data communications not using the IP, and are data communications achieved through transmitting and/or receiving data to which the IP headers are not given. For example, the non-IP communication may be the data communication achieved through transmitting and/or receiving application data to which the IP packet is not given, or may transmit and/or receive the user data transmitted and/or received by the UE_A 10 to which another header such as a MAC header and an Ethernet (trade name) frame header is given.

Also, the PDU session is connectivity established between the UE_A 10 and the DN_A 5 and/or the DN_B 105 to provide a PDU connection service. To be more specific, the PDU session may be connectivity established between the UE_A 10 and an external gateway. Here, the external gateway may be a UPF, a Packet Data Network Gateway (PGW), and the like. The PDU session may be a communication path established for transmitting and/or receiving the user data between the UE_A 10 and the core network and/or the DN (the DN_A 5 and/or the DN_B 105), or may be a communication path for transmitting and/or receiving the PDU. Furthermore, the PDU session may be a session established between the UE_A 10 and the core network and/or the DN (the DN_A 5 and/or the DN_B 105), or may be a logical communication path including a transfer path such as one or more bearers between the respective apparatuses in the mobile communication system 1. To be more specific, the PDU session may be a connection established by the UE_A 10 with the core network_B 190 and/or the external gateway, or may be a connection established between the UE_A 10 and a UPF (a UPF_A 235 and/or a UPF_B 237). Furthermore, the PDU session may be connectivity and/or a connection between the UE_A 10 and the UPF (the UPF_A 235 and/or the UPF_B 237) via an NR node_A 122. Furthermore, the PDU session may be identified by a PDU session ID and/or an EPS bearer ID.

Note that the UE_A 10 can transmit and/or receive the user data to and/or from an apparatus, such as an application server, that is located in the DN_A 5 and/or the DN_B 105 by using the PDU session. In other words, the PDU session can transfer the user data transmitted and/or received between the UE_A 10 and the apparatus, such as the application server, that is located in the DN_A 5 and/or the DN_B 105. Furthermore, each apparatus (the UE_A 10, an apparatus in an access network, and/or an apparatus in a core network, and/or an apparatus in a data network) may correlate one or more pieces of identification information to the PDU session for management. Note that these pieces of identification information may include at least one of an Access Point Name (APN), a Traffic Flow Template (TFT), a session type, application identification information, identification information of the DN_A 5 and/or the DN_B 105, Network Slice Instance (NSI) identification information, Dedicated Core Network (DCN) identification information, and access network identification information, or may further include another piece of information. Furthermore, in a case that multiple PDU sessions are established, respective pieces of identification information correlated to the PDU sessions may be the same contents or may be different contents. Furthermore, the NSI identification information is information for identifying an NSI, and hereinafter may be an NSI ID or a Slice instance ID.

As illustrated in FIG. 2, the access network_B may be any of Evolved Universal Terrestrial Radio Access Network (E-UTRAN)_A 80, a 5G-RAN_A 120, and a WLAN ANc 125. Note that the E-UTRAN_A 80 and/or the 5G-RAN_A 120 may also be referred to as a 3GPP access network, and the WLAN ANc 125 may be referred to as a non-3GPP access network. Each radio access network includes an apparatus to which the UE_A 10 is actually connected (such as a base station apparatus and an access point), and the like.

For example, the E-UTRAN_A 80 is an LTE, access network and includes one or more eNBs_A 45. The eNB_A 45 is a radio base station to which the UE_A 10 connects through Evolved Universal Terrestrial Radio Access (E-UTRA). In a case that multiple eNBs are present in the E-UTRAN_A 80, the respective eNBs may be connected to one another.

Furthermore, the 5G-RAN_A 120 is a 5G access network, and includes one or more New Radio Access Technology nodes (NR nodes)_A 122. The NR node_A 122 is a radio base station to which the UE_A 10 connects through 5G Radio Access. In a case that multiple NR nodes_A 122 are present in the 5G-RAN_A 120, the respective NR nodes_A 122 may be connected to one another.

Note that the 5G-RAN_A 120 may be an access network including the E-UTRA and/or the 5G Radio Access. In other words, the 5G-RAN_A 120 may include the eNB_A 45, may include the NR node_A 122, or may include both. In this case, the eNB_A 45 and the NR node_A 122 may be similar apparatuses. Therefore, the NR node_A 122 can be substituted for the eNB_A 45.

The WLAN ANc 125 is a radio LAN access network and includes one or more WLAN Access Gateways (WAGs)_A 126. The WAG_A 126 is a radio base station to which the UE_A 10 connects through wireless LAN access. Furthermore, the WAG_A 126 may serve as a gateway between the core network_B 190 and the WLAN ANc 125. The WAG_A 126 may include a function unit for the radio base station and a function unit for the gateway, which are configured as different apparatuses.

Note that herein, the expression "the UE_A 10 is connected to each radio access network" is equivalent to "the UE_A 10 is connected to a base station apparatus, an access point, or the like included in each radio access network," and is equivalent to "data, signals, and the like transmitted and/or received also pass through the base station apparatus and the access point." Note that a control message transmitted and/or received between the UE_A 10 and the core network_B 190 may be the same control message, irrespective of a type of the access network. Therefore, the expression "the UE_A 10 and the core network_B 190 transmit and/or receive a message to and/or from each other via the NR node_A 122" may be equivalent to "the UE_A 10 and the core network_B 190 transmit a message to each other via the eNB_A 45 and/or the WAG_A 126."

Furthermore, the access network is a radio network connecting with the UE_A 10 and/or the core network. The access network may be a 3GPP access network, or a non-3GPP access network. Note that the 3GPP access network may be the E-UTRAN_A 80 and the 5G-Radio Access Network (RAN_A 120, and the non-3GPP access network may be the WLAN ANc 125. Note that the UE_A 10 may connect to the access network for connection to the core network, or may connect to the core network via the access network.

Moreover, the DN_A 5 and the DN_B 105 are Data Networks that provide communication services to the UE_A 10, may be configured as packet data service networks, and may be configured for each service. Furthermore, the DN_A 5 and the DN_B 105 may include a connected communication terminal. Therefore, the connection with the DN_A 5 and/or the DN_B 105 may be a connection with a communication terminal or a server device deployed in the DN_A 5 and/or the DN_B 105. Furthermore, the transmission and/or reception of the user data to and/or from the DN_A 5 and/or the DN_B 105 may be a transmission and/or reception of the user data to and/or from the communication terminal or the server device deployed in the DN_A 5 and/or the DN_B 105. Although the DN_A 5 and/or the DN_B 105 are located outside the core network in FIG. 1, the DN_A 5 and/or the DN_B 105 may be located within the core network.

The core network_B 190 may be configured as one or more apparatuses in core networks. Here, the apparatus in the core network may be an apparatus that performs some or all processes or functions of each apparatus included in the core network_B 190. Note that the apparatus in the core network may be referred to as a core network apparatus.

Furthermore, the core network is an IP mobile communication network, connected to the access network and/or the DN_A 5, that is operated by a mobile communication operator (Mobile Network Operator: MNO). The core network may be a core network for a mobile communication operator that operates and manages the mobile communication system 1, or may be a core network for a virtual mobile communication operator or a virtual mobile communication service provider, such as a Mobile Virtual Network Operator (MVNO) and a Mobile Virtual Network Enabler (MVNE). Note that the core network_B 190 may be an Evolved Packet Core (EPC) constituting an Evolved Packet System (EPS), or may be a 5G Core Network (5GC) constituting the 5GS. Furthermore, the core network_B 190 may be a core network for a system providing the 5G communication service. Note that the core network_B 190 is not limited to this, and may be a network for providing a mobile communication service.

Next, the core network_B 190 will be described. The core network_B 190 may include at least one of: an Authentication Server Function (AUSF), an Access and Mobility Management Function (AMF)_A 240, a Structured Data Storage network function (SDSF), an Unstructured Data Storage network function (UDSF), a Network Exposure Function (NEF), an NF Repository Function (NRF), a Policy Control Function (PCF), a Session Management Function (SMF)_A 230, a Session Management Function (SMF)_B 232, a Unified Data Management (UDM), a User Plane Function (UPF)_A 235, a User Plane Function (UPF)_B 237, an Application Function (AF), and a Non-3GPP Inter Working Function (N3IWF)_A 128. These may be configured as Network Functions (NFs). The NE may mean a processing function configured in the network.

FIG. 3 illustrates only the AMF (AMF_A 240), the SMF (SMF_A 230 and SMF_B 232), and the UPF (UPF_A 235 and UPF_B 237) among these for simplification, but this does not mean that entities (apparatus and/or NF) other than those described above are not included. Note that, for simplification, the UE_A 10 is referred to as the UE, the AMF_A 240 as the AMP, the SMF_A 230 and the SMF_B 232 as the SMF, the UPF_A 235 and the UPF_B 237 as the UPF, and the DN_A 5 and the DN_B 105 as the DN.

FIG. 3 illustrates an N1 interface (hereinafter also referred to as a reference point), an N2 interface, an N3 interface, an N4 interface, an N6 interface, an N9 interface, and an N11 interface. Here, the N1 interface is an interface between the UE and the AMF, the N2 interface is an interface between (R) access network (AN) and the AMF, and the N3 interface is an interface between the (R) access network (AN) and the UPF, the N4 interface is an interface between the SMF and the UPF, the N6 interface is an interface between the UPF and the DN, the N9 interface is an interface between the UPF and another UPF, and the N11 interface is an interface between the AMF and the SMF. The respective apparatuses can perform communications by using these interfaces.

Note that FIG. 3 is a system configuration diagram in a case that the UE simultaneously accesses two DNs by using multiple PDU sessions. Two SMFs are selected for two different PDU sessions. In addition, there are two SMFs_A 230 and two UPFs_A 235 in FIG. 3.

The following briefly describes each apparatus included in the core network_B 190.

First, the AMF_A 240 is connected to another AMF, SMF (SMF_A 230 and/or SMF_B 232), the access network (i.e., the E-UTRAN_A 80, the 5G-RAN_A 120, and the WLAN ANc 125), the UDM, the AUSF, and the PCF. The AMF_A 240 may have functions as Registration management, Connection management, Reachability management, Mobility management of the UE_A 10 and the like, Session Management (SM) message transfer between the UE and the SMF, Access Authentication and Access Authorization, Security Anchor Function (SEA), Security Context Management (SCM), a support for the N2 interface for the N3IWF_A 128, a support for transmission and/or reception of a NAS signal with the UE via the N3IWF_A 128, authentication of the UE connected via the N3IWF_A 128, management of Registration Management states (RM states), a management of Connection Management states (CM states), and the like. Additionally, one or more AMFs_A 240 may be deployed within the core network_B 190. The AMF_A 240 may be an NF that manages one or more Network Slice Instances (NSIs). The AMF_A 240 may be a common CP function (CCNF, Common Control Plane Network Function (CPNF)) shared among the multiple NSIs.

Additionally, the RM state includes a deregistered state (RM-DEREGISTERED state) and a registered state (RM-REGISTERED state). In the RM-DEREGISTERED state, since the UE is not registered with the network and a UE context in the AMF does not have information of a location and information of routing that are valid for the UE, the AMF is in a state in which the AMF is not reachable to the UE. Also, in the RM-REGISTERED state, since the UE is registered with the network, the UE can receive services that presuppose a registration with the network.

Additionally, the CM state includes a disconnected state (CM-IDLE state) and a connected state (CM-CONNECTED state). In the CM-IDLE state, the UE is in the RM-REGISTERED state but does not have a NAS signaling connection established with the AMF via the N1 interface. In the CM-IDLE state, each apparatus does not have N2 interface connection (N2 connection) and N3 interface connection (N3 connection). Further, in the CM-IDLE state, each apparatus does not establish radio bearers or an IPSec tunnel. Further, in the CM-IDLE state, each apparatus may hold a context of a PDU session associated with the UE_A 10.

Meanwhile, in the CM-CONNECTED state, the UE has the NAS signaling connection established with the AMF via the N1 interface. In the CM-CONNECTED state, each apparatus may have N2 interface connection (N2 connection) and/or N3 interface connection (N3 connection). Further, in the CM-CONNECTED state, each apparatus may establish radio bearers or an IPSec tunnel. Further, in the CM-CONNECTED state, each apparatus may hold a context of a PDU session associated with the UE_A 10. Note that the CM state of the UE_A 10 managed by each apparatus may be managed separately for a state for 3GPP and a state for non-3GPP access.

Here, a trigger that causes the state of the UE_A 10 managed by each apparatus to transition to the CM-IDLE state may be an absence of transmission and/or reception of user data for a certain period of time, or may be expiration of a timer managed by each apparatus. Note that the trigger that causes each apparatus to transition to the CM-IDLE state is not limited to the trigger described above.

Further, a 5GMM state (5GS Mobility Management state) includes a deregistered state (5GMM-DEREGISTERED state) and a registered state (5GMM-REGISTERED state). In the 5GMM-DEREGISTERED state, since the UE_A 10 is not registered with the network and a UE context in the AMF_240 does not have information of a location and information of routing that are valid for the UE_A 10, the AMF_240 is in a state in which the AMF_240 is not reachable to the UE_A 10. Also, in the 5GMM-REGISTERED state, since the UE_A 10 is registered with the network, the UE_A 10 can receive services that presuppose a registration with the network.

Further, the 5GMM state may include a disconnected state (5GMM-IDLE state) and a connected state (5GMM-CONNECTED state). In the 5GMM-IDLE state, the UE_A 10 is in the registered state, but does not have NAS signaling connection established with the AMF_240 via the N1 interface, and N2 interface connection. Further, in the 5GMM-IDLE state, each apparatus does not have N3 interface connection. Further, in the 5GMM-IDLE state, each apparatus does not establish radio bearers or an IPSec tunnel. Further, in the 5GMM-IDLE state, each apparatus may hold a context of a PDU session associated with the UE_A 10.

Meanwhile, in the 5GMM-CONNECTED state, each apparatus has NAS signaling connection established with the AMF_240 via the N1 interface, and N2 interface connection. Further, in the 5GMM-CONNECTED state, each apparatus may have N3 interface connection. Further, in the 5GMM-CONNECTED state, each apparatus may establish radio bearers or an IPSec tunnel. Further, in the 5GMM-CONNECTED state, each apparatus may hold a context of a PDU session associated with the UE_A 10. Note that the 5GMM state of the UE_A 10 managed by each apparatus may be managed separately for a state for 3GPP access and a state for non-3GPP access.

Here, a trigger that causes the state of the UE_A 10 managed by each apparatus to transition to the 5GMM-IDLE state may be an absence of transmission and/or reception of user data for a certain period of time, or may be expiration of a timer managed by each apparatus. Note that the trigger that causes each apparatus to transition to the 5GMM-IDLE state is not limited to the trigger described above. Note that the N3 interface connection may be referred to as an N3 Tunnel. Conversely, the N3 tunnel may be referred to as N3 interface connection. Further, N9 interface connection may be referred to as an N9 Tunnel. Conversely, the N9 tunnel may be referred to as N9 interface connection.

The SMF_A 230 is connected to the AMF_A 240, the UPF_A 235, the UDM, and the PCF. The SMF_B 232 is connected to the AMF_A 240, the UPF_B 237, the UDM, and the PCF. The SMF_A 230 and the SMF_B 232 may have functions as Session Management of the PDU session or the like, IP address allocation for the UE, UPF selection and control, a UPF configuration for routing a traffic to an appropriate destination, a function for giving a notification of an arrival of downlink data (Downlink Data Notification), an identifier of SM information specific to AN (for each AN) transmitted to the AN via the AMF through the N2 interface, determination of a Session and Service Continuity mode (SSC mode) for the session, a roaming function, and the like. Further, although the SMF_A 230 and the SMF_B 232 have been described as different apparatuses or NFs, they may be the same apparatus or function.

The UPF_A 235 is connected to the DN_A 5, the SMF_A 230, another UPF, and the access network (i.e., the E-UTRAN_A 80, the 5G-RAN_A 120, and the WLAN ANc 125). The UPF_B 237 is connected to the DN_B 105, the SMF_B 232, another UPF, and the access network (i.e., the E-UTRAN_A 80, the 5G-RAN_A 120, and the WLAN ANc 125). The UPF_A 235 and the UPF_B 237 may have functions as an anchor to intra-RAT mobility or inter-RAT mobility, Packet routing & forwarding, an Uplink Classifier (UL CL) function supporting routing of multiple traffic flows to one DN, a Branching point function supporting a multi-homed PDU session, QoS processing for user plane, verification of an uplink traffic, buffering of downlink packets, a trigger function of Downlink Data Notification, and the like. Each of the UPF_A 235 and the UPF_B 237 may be a relay apparatus that forwards the user data as a gateway between the DN_A 5 and the core network_B 190 and a gateway between the DN_B 105 and the core network_B 190, respectively. Note that the UPF_A 235 and the UPF_B 237 may serve as a gateway for the IP communications and/or the non-IP communications. Furthermore, the UPF_A 235 and the UPF_B 237 may have a function to forward the IP communications, or may have a function to perform conversion between the non-IP communications and the IP communications. The multiple gateways located may serve as gateways connecting the core network_B 190 with a single DN. Note that the UPF_A 235 and the UPF_B 237 may have connectivity with another NF and may connect to each apparatus via another NF.

Although the UPF_A 235 and the UPF_B 237 have been described as separate apparatuses or NFs, a common UPF_C 239 (also referred to as a branching point or an uplink classifier), which is a UPF different from the UPF_A 235 and the UPF_B 237, may be present between the UPF_A 235 and the access network and between the UPF_B 237 and the access network. In a case that the UPF_C 239 is present, the PDU session between the UE_A 10 and the DN_A 5 is established via the access network, the UPF_C 239, and the UPF_A 235, and the PDU session between the UE_A 10 and the DN_B 105 is established via the access network, the UPF_C 239, and the UPF_B 237.

Note that the User Plane (U-Plane (UP)) may be a communication path for transmitting and/or receiving the user data, and may include multiple bearers. Furthermore, a Control Plane (C-Plane (CP)) may be a communication path for transmitting and/or receiving the control message, and may include multiple bearers.

Additionally, the AUSF is connected to the UDM and the AMF_A 240. The AUSF functions as an authentication server.

The SDSF provides a function for the NEF to store and acquire information as structured data.

The UDSF provides a function for all NFs to store and acquire information as unstructured data.

The NEF provides means to safely provide services and capabilities provided by the 3GPP network. The information received from another NF is stored as structured data.

In a case that the NRF receives an NF Discovery Request from an NF instance, the NRF provides information of the discovered NF instance to the NF or holds information of available NF instances or services supported by the instances.

The PCF is connected to the SMF (SMF_A 230, SMF_B 232), the AF, and the AMF_A 240. A policy rule (policy rule) or the like is provided.

The UDM is connected to the AMF_A 240, the SMF (SMF_A 230, SMF_B 232), the AUSF, and the PCF. The UDM includes a UDM FE (application front end) and a User Data Repository (UDR). The UDM FE performs processing such as authentication information (credentials), location management, and subscriber management (subscription management). The UDR stores data required by the UDM FE for provision and policy profiles required by the PCF.

The AF is connected to the PCF. The AF affects traffic routing or involves the policy control.

The N3IWF_A 128 provides functions, such as IPsec tunnel establishment with the UE, relaying of the NAS (N1) signaling between the UE and the AMF, processing of N2 signaling transmitted from the SMF and relayed by the AMF, establishment of IPsec Security Association (IPsec SA), relaying of user plane packets between the UE and the UPF, and AMF selection.

Further, the N3IWF_A 128 at least supports an NWu interface, an N2 interface, an N3 interface, and/or a Y2 interface. An interface between the N3IWF_A 128 and the UE is the NWu interface. An interface between the N3IWF_A 128 and the AMF is the N2 interface. An interface between the N3IWF_A 128 and the UPF is the N3 interface. The respective apparatuses can perform communications by using these interfaces.

Further, an interface between the N3IWF_A 128 and the WLAN ANc may be the Y2 interface. In a case that the WLAN ANc is described as one access network in the following description, the WLAN ANc may be in a state of being connected to the apparatus in the core network via the N3IWF_A 128. Note that, in this case, an interface between the WLAN ANc and the UE may be a Y1 interface.

1.2. Configuration of Each Apparatus

The configuration of each apparatus will be described below. Note that some or all of functions of each apparatus and each unit in each apparatus described below may operate on physical hardware, or may operate on logical hardware virtually configured on general-purpose hardware.

1.2.1. Configuration of UE

Figure 4:
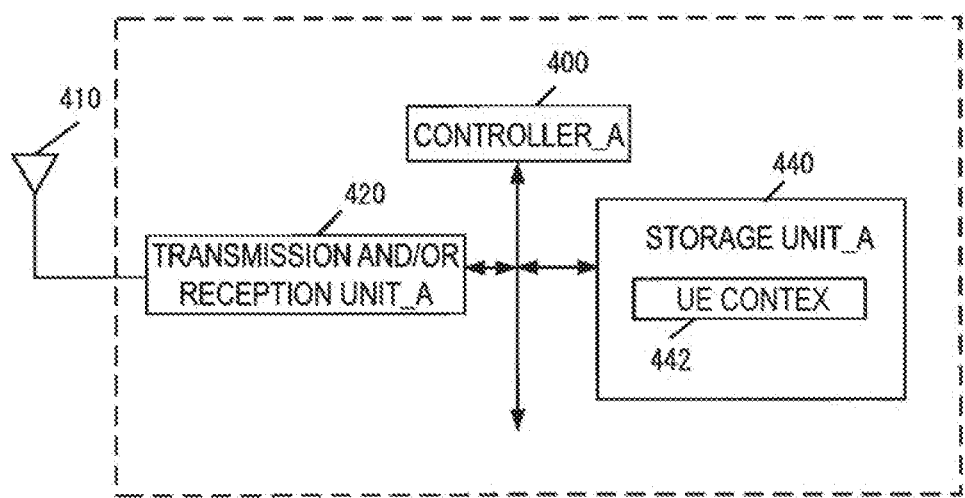
FIG. 4 is a diagram illustrating an apparatus configuration of a UE.

First, FIG. 4 illustrates an apparatus configuration example of the UE_A 10. As illustrated in FIG. 4, the UE_A 10 includes a controller_A 400, a transmission and/or reception unit_A 420, and a storage unit_A 440. The transmission and/or reception unit_A 420 and the storage unit_A 440 are connected to the controller_A 400 via a bus. An external antenna_A 410 is connected to the transmission and/or reception unit_A 420. The storage unit_A 440 stores a UE context 442.

The controller_A 400 is a function unit for controlling the entire UE_A 10. The controller_A 400 reads out and performs various pieces of information and programs stored in the storage unit_A 440 to achieve various processes of the entire UE_A 10.

The transmission and/or reception unit_A 420 is a function unit through which the UE_A 10 connects to the base station (E-UTRAN_A 80 and 5G-RAN_A 120) and/or the access point (WLAN ANc 125) in the access network and connects to the access network. In other words, the UE_A 10 can connect to the base station and/or the access point in the access network via the external antenna 410 connected to the transmission and/or reception unit_A 420. Specifically, the UE_A 10 can transmit and/or receive the user data and/or the control information with the base station and/or the access point in the access network via the external antenna 410 connected to the transmission and/or reception unit_A 420.

The storage unit_A 440 is a function unit that stores programs, data, and the like necessary for each operation by the UE_A 10, and includes, for example, a semiconductor memory, a Hard Disk Drive (HDD), a Solid State Drive (SSD), and the like. The storage unit_A 440 stores identification information, control information, a flag, a parameter, and the like included in the control message transmitted and/or received in a communication procedure described later. The UE context 442 stored in the storage unit_A 440 may be a. UE context used to connect to the access network_B 80/120/125 and a UE context used to connect to the core network_B 190. The UE context 442 may be a UE context stored for each UE, a UE context stored for each PDU session, and a UE context stored for each bearer. The UE context stored for each UE may include an IMSI, an EMM State, a GUTI, and an ME Identity. The UE context stored for each PDU session may include an APN in Use, an Assigned Session Type, IP Address(es), and a Default Bearer. The UE context stored for each bearer may include an EPS Bearer ID, a TI, and a TFT.

1.2.2. Configuration of eNB/NR Node/WAG

Figure 5:
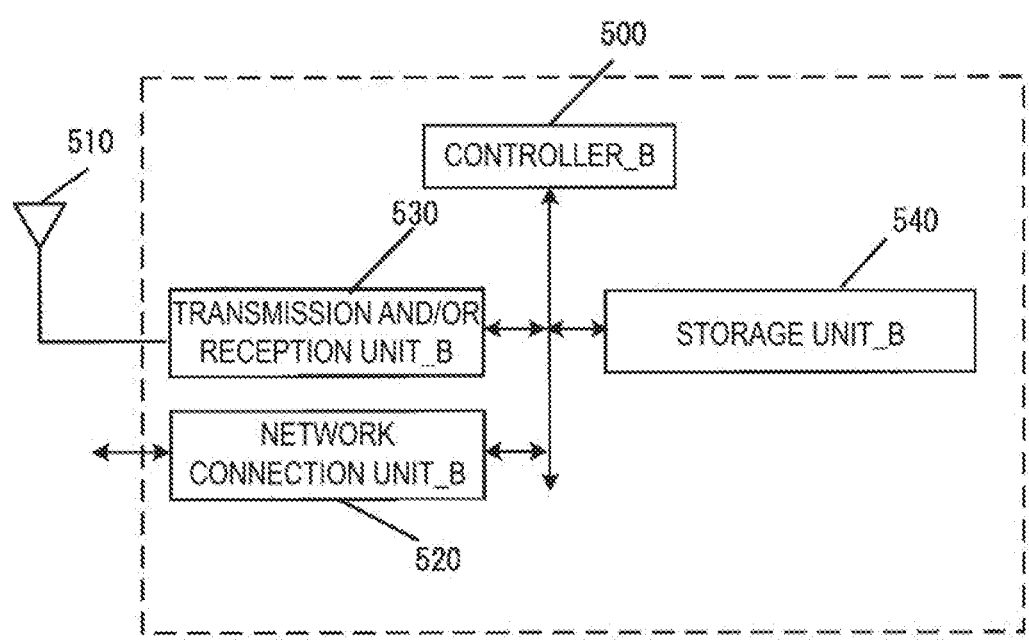
FIG. 5 is a diagram illustrating an apparatus configuration of an eNB/NR node/WAG.

Next, FIG. 5 illustrates an apparatus configuration example of the eNB_A 45, the NR node_A 122, and the WAG_A 126. As illustrated in FIG. 5, the eNB_A 45, the NR node_A 122, and the WAG_A 126 include a controller_B 500, a network connection unit_B 520, a transmission and/or reception unit_B 530, and a storage unit_B 540. The network connection unit_B 520, the transmission and/or reception unit_B 530, and the storage unit_B 540 are connected to the controller_B 500 via a bus. An external antenna 510 is connected to the transmission and/or reception unit_B 530.

The controller_B 500 is a function unit for controlling the entire eNB_A 45, NR node_A 122, and WAG_A 126. The controller_B 500 reads out and performs various pieces of information and programs stored in the storage unit_B 540 to achieve various processes of the entire eNB_A 45, NR node_A 122, and WAG_A 126.

The network connection unit_B 520 is a function unit for the eNB_A 45, the NR node_A 122, and the WAG_A 126 to connect to the AMF_A 240 and the UPF_A 235 in the core network. In other words, the eNB_A 45, the NR node_A 122, and the WAG_A 126 are connectable to the AMF_A 240 and the UPF_A 235 in the core network via the network connection unit_B 520. Specifically, the eNB_A 45, the NR node_A 122, and the WAG_A 126 can transmit and/or receive the user data and/or the control information to and/or from the AMF_A 240 and/or the UPF_A 235 via the network connection unit_B 520.

The transmission and/or reception unit_B 530 is a function unit through which the eNB_A 45, the NR node_A 122, and the WAG_A 126 connect to the UE_A 10. In other words, the eNB_A 45, the NR node_A 122, and the WAG_A 126 can transmit and/or receive the user data and/or the control information to and/or from the UE_A 10 via the transmission and/or reception unit_B 530.

The storage unit_B 540 is a function unit for storing programs, data, and the like necessary for each operation by the eNB_A 45, the NR node_A 122, and the WAG_A 126. The storage unit_B 540 includes, for example, a semiconductor memory, an HDD, an SSD, or the like. The storage unit_B 540 stores identification information, control information, a flag, a parameter, and the like included in the control message transmitted and/or received in a communication procedure described later. The storage unit_B 540 may store these pieces of information as the contexts for each UE_A 10.

1.2.3. Configuration of AMF

Figure 6:
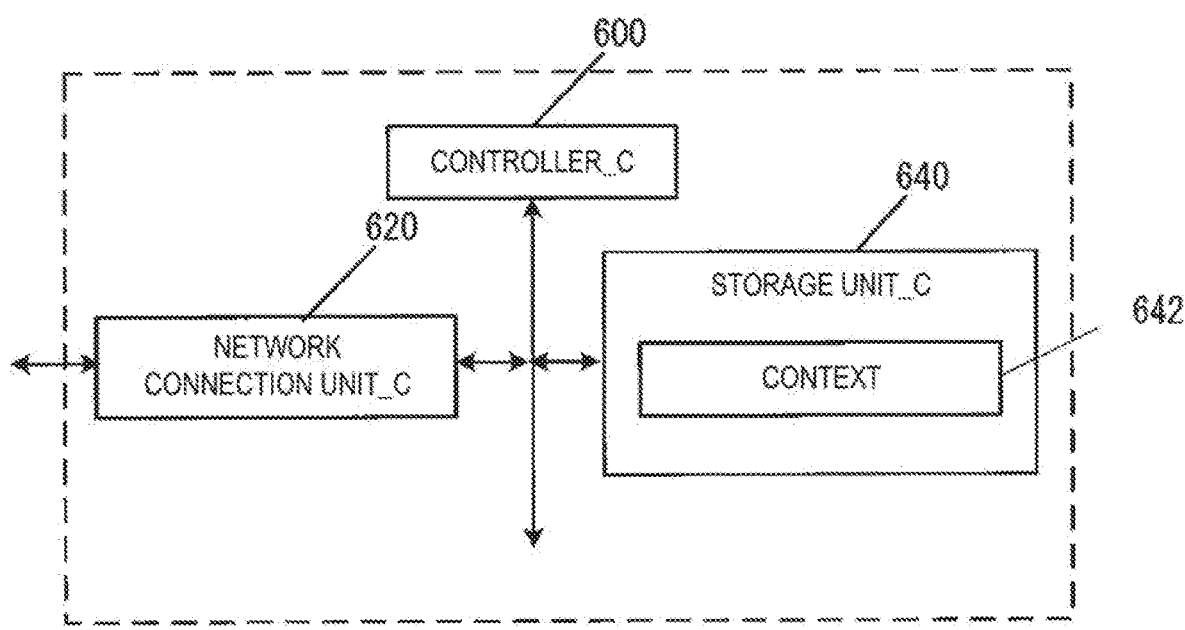
FIG. 6 is a diagram illustrating an apparatus configuration of an AMF.

Next, FIG. 6 illustrates an apparatus configuration example of the AMF_A 240. As illustrated in FIG. 6, the AMF_A 240 includes a controller_C 600, a network connection unit_C 620, and a storage unit_C 640. The network connection unit_C 620 and the storage unit_C 640 are connected to the controller_C 600 via a bus. The storage unit_C 640 stores a context 642.

The controller_C 600 is a function unit for controlling the entire AMF_A 240. The controller_C 600 reads out and performs various pieces of information and programs stored in the storage unit_C 640 to achieve various processes of the entire AMF_A 240.

The network connection unit_C 620 is a function unit for the AMF_A 240 to connect to another AMF_240, the SMF_A 230, the base station (E-UTRAN_A 80 and 5G-RAN_A 120), and/or the access point (WLAN ANc 125) in the access network, the UDM, the AUSF, and the PCF. In other words, the AMF_A 240 can transmit and/or receive the user data and/or the control information to and/or from the base station and/or the access point in the access network, the UDM, the AUSF, and the PCF via the network connection unit_C 620.

The storage unit_C 640 is a function unit that stores programs, data, and the like necessary for each operation by the AMF_A 240. The storage unit_C 640 includes, for example, a semiconductor memory, an HDD, an SSD, and the like. The storage unit_C 640 stores identification information, control information, a flag, a parameter, and the like included in the control message transmitted and/or received in a communication procedure described later. The context 642 stored in the storage unit_C 640 may be a context stored for each UE, a context stored for each PDU session, and a context stored for each bearer. The context stored for each UE may include an IMSI, an MSISDN, an MM State, a GUTI, an ME Identity, a UE Radio Access Capability, a UE Network Capability, an MS Network Capability, an Access Restriction, an MME F-TEID, an SGW F-TEID, an eNB Address, an MME UE S1AP ID, an eNB UE S1AP ID, an NR node Address, an NR node ID, a WAG Address, and a WAG ID. The context stored for each PDU session may include an APN in Use, an Assigned Session Type, IP Address(es), a PGW F-TEID, an SCEF ID, and a Default bearer. The context stored for each bearer may include an EPS Bearer ID, a TI, a TFT, an SGW F-TEID, a PGW F-TEID, art MME F-TEID, an eNB Address, an NR node Address, a WAG Address, an eNB ID, an NR node ID, and a WAG ID.

1.2.4. Configuration of SMF

Figure 7:
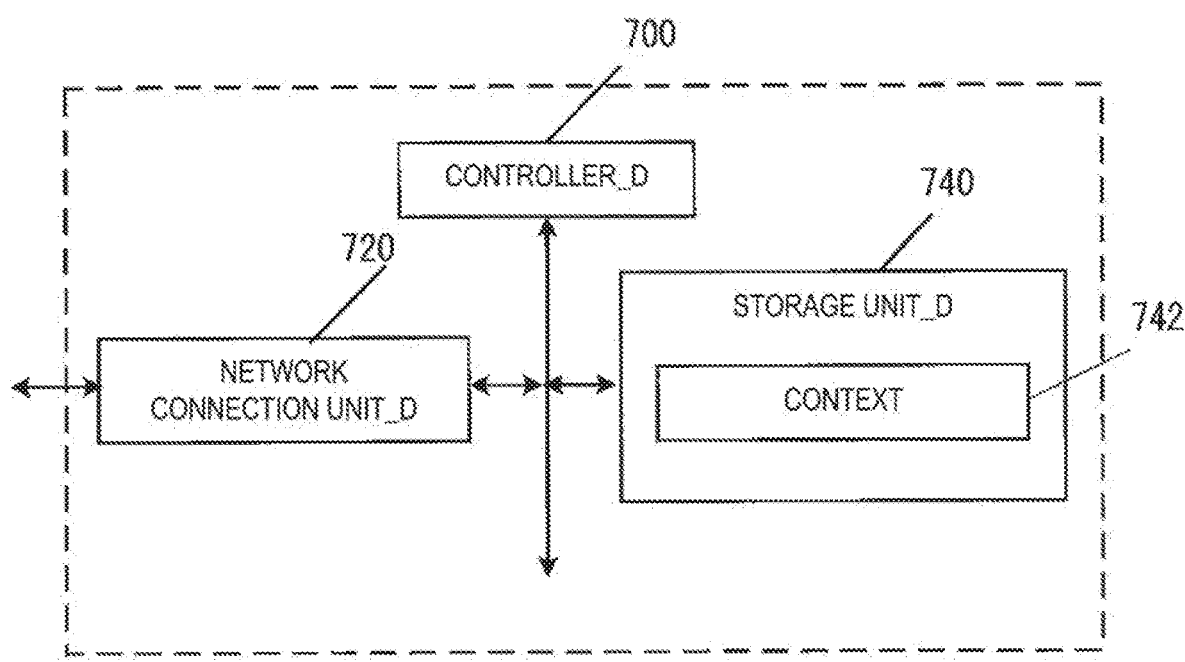
FIG. 7 is a diagram illustrating an apparatus configuration of an SMF/UPF.

Next, FIG. 7 illustrates an apparatus configuration example of the SMF_A 230 and the SMF_B 232. As illustrated in FIG. 7, each of the SMFs_A 230 includes a controller_D 700, a network connection unit_D 720, and a storage unit_D 740. The network connection unit_D 720 and the storage unit_D 740 are connected to the controller_D 700 via a bus. The storage unit_D 740 stores a context 742.

The controller_D 700 in the SMF_A 230 is a function unit for controlling the entire SMF_A 230. The controller_D 700 reads out and performs various pieces of information and programs stored in the storage unit_D 740 to achieve various processes of the entire SMF_A 230.

The network connection unit_D 720 in the SMF_A 230 is a function unit for the SMF_A 230 to connect to the AMF_A 240, the UPF_A 235, the UDM, and the PCF. In other words, the SMF_A 230 can transmit and/or receive the user data and/or the control information to and/or from the AMF_A 240, the UPF_A 235, the UDM, and the PCF via the network connection unit_D 720.

The storage unit_D 740 in the SMF_A 230 is a function unit for storing programs, data, and the like necessary for each operation by the SMF_A 230. The storage unit_D 740 in the SMF_A 230 includes, for example, a semiconductor memory, an HDD, an SSD, or the like. The storage unit_D 740 in the SMF_A 230 stores identification information, control information, a flag, a parameter, and the like included in the control message transmitted and/or received in a communication procedure described later. The context 742 stored in the storage unit_D 740 in the SMF_A 230 may be a context stored for each UE, a context stored for each APN, a context stored for each PDU session, and a context stored for each bearer. The context stored for each UE may include an IMSI, an ME Identity, an MSISDN, and a RAT type. The context stored for each APN may include an APN in use. Note that the context stored for each APN may be stored for each Data Network Identifier. The context stored for each PDU session may include an Assigned Session Type, IP Address(es), an SGW F-TEID, a PGWF-TEID, and a Default Bearer. The context stored for each bearer may include an EPS Bearer ID, a TFT, an SGW F-TEID, and a PGW F-TEID.

Note that the SMF_B 232 is configured similarly to the SMA_A 230.

1.2.5. Configuration of UPF

Next, FIG. 7 illustrates an apparatus configuration example of the UPF_A 235 and the UPF_B 237. As illustrated in FIG. 7, each of the UPFs_A 235 includes the controller_D 700, the network connection unit_D 720, and the storage unit_D 740. The network connection unit_D 720 and the storage unit_D 740 are connected to the controller_D 700 via a bus. The storage unit_D 740 stores the context 742.

The controller_D 700 in the UPF_A 235 is a function unit for controlling the entire UPF_A 235. The controller_D 700 reads out and performs various pieces of information and programs stored in the storage unit_D 740 to achieve various processes of the entire UPF_A 235.

The network connection unit_D 720 in the UPF_A 235 is a function unit for the UPF_A 235 to connect to the DN (that is, the DN_A 5 and/or the DN_B 105), the SMF_A 230, another UPF_A 235, and the access network (that is, the E-UTRAN_A 80, the 5G-RAN_A 120, and the WLAN ANc 125). In other words, the UPF_A 235 can transmit and/or receive the user data and/or the control information to and/or from the DN (that is, the DN_A 5 and/or the DN_B 105), the SMF_A 230, another UPF_A 235, and the access network (that is, the E-UTRAN_A 80, 5G-RAN_A 120, and the WLAN ANc 125) via the network connection unit_D 720.

The storage unit_D 740 in the UPF_A 235 is a function unit for storing programs, data, and the like necessary for each operation by the UPF_A 235. The storage unit_D 740 in the UPF_A 235 includes, for example, a semiconductor memory, an HDD, an SSD, or the like. The storage unit_D 740 in the UPF_A 235 stores identification information, control information, a flag, a parameter, and the like included in the control message transmitted and/or received in a communication procedure described later. The context 742 stored in the storage unit_D 740 in the UPF_A 235 may be a context stored for each UE, a context stored for each APN, a context stored for each PDU session, and a context stored for each bearer. The context stored for each UE may include an IMSI, an ME Identity, an MSISDN, and a RAT type. The context stored for each APN may include an APN in use. Note that the context stored for each APN may be stored for each Data Network Identifier. The context stored for each PDU session may include an Assigned Session Type, IP Address(es), an SGW F-TEID, a PGWF-TEID, and a Default Bearer. The context stored for each bearer may include an EPS Bearer ID, a TFT, an SGW F-TEID, and a PGW F-TEID.

Note that the UPF_B 237 is configured similarly to the UPF_A 235.

1.2.6. Information Stored in Storage Unit in Each Apparatus Described Above

Next, each piece of information stored in the storage unit in each apparatus described above will be described.

The International Mobile Subscriber Identity (IMSI) is permanent identification information of a subscriber (user), and is identification information assigned to a user using the UE. The IMSI stored by the UE_A 10, the MME_A 40/CPF_A 140/AMF_A 2400, and the SGW_A 35 may be the same as the IMSI stored by an HSS_A 50.

A 5GMM State/EMM State/MM State indicates a Mobility management state of the UE_A 10 managed by each of the UE_A 10 and the MME_A 40/CPF_A 140/AMF_A 240. For example, the 5GMM State/EMM State/MM State may be a 5GMM-REGISTERED/EMM-REGISTERED state (registered state) in which the UE_A 10 is registered with the network, and/or a 5GMM-DEREGISTERED/EMM-DEREGISTERED state (deregistered state) in which the UE_A 10 is not registered with the network. The 5GMM State/EMM State/MM State may be a 5GMM-CONNECTED/EMM-CONNECTED/ECM-CONNECTED state in which a connection is maintained between the UE_A 10 and the core network, and/or a 5GMM-IDLE/EMM-IDLE/ECM-IDLE state in which the connection is released. Note that the 5GMM State/EMM State/MM State may be information with which a state in which the UE_A 10 is registered with the EPC and a state in which the UE_A 10 is registered with the NGC or the 5GC can be distinguished.

The Globally Unique Temporary Identity (GUTI) is temporary identification information of the UE_A 10. The GUTI includes identification information of the MME_A 40/CPF_A 140/AMF_A 240 (Globally Unique MME Identifier (GUMMEI)) and identification information of the UE_A 10 in a specific MME_A 40/CPF_A 140/AMF_A 240 (M-Temporary Mobile Subscriber Identity (M-TMSI)). The ME Identity is an ID of the UE_A 10 or the ME, and may be International Mobile Equipment Identity (IMEI) or IMEI Software Version (IMEISV), for example. The MSISDN represents a basic phone number of the UE_A 10. The MSISDN stored by the MME_A 40/CPF_A 140/AMF_A 240 may be information indicated by a storage unit in the HSS_A 50. Note that the GUTI may include information for identifying the CPF_140.

The MME F-TEID is information for identifying the MME_A 40/CPF_A 140/AMF_A 240. The MME F-TEID may include an IP address of the MME_A 40/CPF_A 140/AMF_A 240, may include a Tunnel Endpoint Identifier (TEID) of the MME_A 40/CPF_A 140/AMF_A 240, or may include both of them. The IP address of the MME_A 40/CPF_A 140/AMF_A 240 and the TEID of the MME_A 40/CPF_A 140/AMF_A 240 may be stored independently of each other. The MME F-TEID may be identification information for user data, or identification information for control information.

The SGW F-TEID is information for identifying the SGW_A 35. The SGW F-TEID may include an IP address of the SGW_A 35, may include a TEID of the SGW_A 35, or may include both of them. The IP address of the SGW_A 35 and the TEID of the SGW_A 35 may be stored independently of each other. The SGW F-TEID may be identification information for user data, or identification information for control information.

The PGW F-TEID is information for identifying the PGW_A 30/UPGW_A 130/SMF_A 230/UPF_A 235. The PGW F-TEID may include an IP address of the PGW_A 30/UPGW_A 130/SMF_A 230/UPF_A 235, may include a TEID of the PGW_A 30/UPGW_A 130/SMF_A 230/UPF_A 235, or may include both of them. The IP address of the PGW_A 30/UPGW_A 130/SMF_A 230/UPF_A 235, and the TEID of the PGW_A 30/UPGW_A 130/SMF_A 230/UPF_A 235 may be stored independently of each other. The PGW F-TEID may be identification information for user data, or identification information for control information.

An eNB F-TEID is information for identifying the eNB_A 45. The eNB F-TEID may include an IP address of the eNB_A 45, may include a TEID of the eNB_A 45, or may include both of them. The IP address of the eNB_A 45 and the TEID of the SGW_A 35 may be stored independently of each other. The eNB F-TEID may be identification information for user data, or identification information for control information.

The APN may be identification information for identifying the core network and an external network such as the DN. Furthermore, the APN can also be used as information for selecting a gateway such as the PGW_A 30/UPGW_A 130/UPF_A 235 connecting the core network A_90. Note that the APN may be a Data Network Name (DNN). Accordingly, the APN may be represented as the DNN, or the DNN may be represented as the APN.

Note that the APN may be identification information for identifying such a gateway, or may be identification information for identifying an external network such as the DN. Note that, in a case that multiple gateways connecting the core network and the DN are located, there may be multiple gateways that can be selected according to the APN. Furthermore, one gateway may be selected from among such multiple gateways by another scheme using identification information other than the APN.

The UE Radio Access Capability is identification information indicating a radio access capability of the UE_A 10. The UE Network Capability includes an algorithm of security supported by the UE_A 10 and a key derivative function. The MS Network Capability is information including, in the UE_A 10 having a function of a GERAN_A 25 and/or a UTRAN_A 20, one or more pieces of information necessary for an SGSN_A 42. The Access Restriction is registration information for access restriction. The eNB Address is an IP address of the eNB_A 45. The MME UE S1AP ID is information for identifying the UE_A 10 in the MME_A 40/CPF_A 140/AMF_A 240. The eNB UE S1AP ID is information for identifying the UE_A 10 in the eNB_A 45.

The APN in Use is a recently used APN. The APN in Use may be a Data Network Identifier. The APN may include identification information of the network and identification information of a default operator. Furthermore, the APN in Use may be information for identifying a DN with which the PDU session is established.

The Assigned Session Type is information indicating a PDU session type. The Assigned Session Type may be an Assigned PDN Type. The PDU session type may be an IP, or a non-IP. Furthermore, in a case that the PDU session type is an IP, information indicating a PDN type assigned by the network may be further included. Note that the Assigned Session Type may be IPv4, IPv6, or IPv4v6.

Unless otherwise specifically described, the IP Address refers to the IP address allocated to the UE. The IP address may be an IPv4 address, an IPv6 address, an IPv6 prefix, or an interface ID. Note that, in a case that the Assigned Session Type indicates a non-IP, an element of the IP Address need not be contained.

A DN ID is identification information for identifying the core network_B 190 and an external network such as the DN. Furthermore, the DN ID can also be used as information for selecting a gateway such as the UPGW_A 130 or the PF_A 235 connecting the core network_B 190.

Note that the DN ID may be identification information for identifying such a gateway, or may be identification information for identifying an external network such as the DN. Note that, in a case that multiple gateways connecting the core network_B 190 and the DN are located, there may be multiple gateways that can be selected according to the DN ID. Furthermore, one gateway may be selected from among such multiple gateways by another scheme using identification information other than the DN ID.

Furthermore, the DN ID may be information equivalent to the APN, or different from the APN. Note that, in a case that the DN ID is the information different from the APN, each apparatus may manage information indicating correspondence between the DN ID and the APN, may perform a procedure to inquire the APN by using the DN ID, or may perform a procedure to inquire the DN ID by using the APN.

The SCEF ID is an IP address of an SCEF_A 46 used in the PDU session. The Default Bearer is information acquired and/or created in establishing the PDU session, and is EPS bearer identification information for identifying a default bearer correlated to the PDU session.

The EPS Bearer ID is identification information of the EPS bearer. The EPS Bearer ID may be identification information for identifying a Signalling Radio Bearer (SRB) and/or a Control-plane Radio bearer (CRB), or may be identification information for identifying a Data Radio Bearer (DRB). The Transaction Identifier (TI) is identification information for identifying a bidirectional message flow (Transaction). Note that the EPS Bearer ID may be EPS bearer identification information for identifying a dedicated bearer. Therefore, the EPS bearer ID may be identification information for identifying the EPS bearer different from the default bearer. The TFT indicates all the packet filters associated with the EPS bearer. The TFT is information for identifying some pieces of the transmitted and/or received user data, and thus, the UE_A 10 uses the EPS bearer associated with the TFT to transmit and/or receive the user data identified by the TFT. In still other words, the UE_A 10 uses a Radio Bearer (RB) associated with the TFT to transmit and/or receive the user data identified by the TFT. The TFT may associate the user data such as the transmitted and/or received application data with an appropriate transfer path, and may be identification information for identifying the application data. The UE_A 10 may use the default bearer to transmit and/or receive the user data which cannot be identified by the TFT. The UE_A 10 may store the TFT associated with the default bearer in advance.

The Default Bearer is EPS bearer identification information for identifying a default bearer associated with a PDU session. Note that the EPS bearer may be a logical communication path established between the UE_A 10 and the PGW_A 30/UPGW_A 130/UPF_A 235, or may be a communication path constituting the PDN connection/PDU session. Furthermore, the EPS bearer may be a default bearer, or a dedicated bearer. Furthermore, the EPS bearer may include an RB established between the UE_A 10 and the base station and/or the access point in the access network. Furthermore, the RB and the EPS bearer may be associated with each other on a one-to-one basis. Therefore, identification information of the RB may be associated with the identification information of the EPS bearer on a one-to-one basis, or may be the same identification information as the identification information of the EPS bearer. Note that the RB may be the SRB and/or the CRB, or the DRB. The Default Bearer may be information that the UE_A 10 and/or the SGW_A 35 and/or the PGW_A 30/UPGW_A 130/SMF_A 230/UPF_A 235 acquire from the core network in establishing the PDU session. Note that the default bearer is an EPS bearer first established during the PDN connection/PDU session, and is such an EPS bearer that only one bearer can be established during one PDN connection/PDU session. The default bearer may be an EPS bearer that can be used to communicate user data not associated with the TFT. The dedicated bearer is an EPS bearer established after the default bearer is established during the PDN connection/PDU session, and is such an EPS bearer that multiple bearers can be established during one PDN connection/PDU session. The dedicated bearer is an EPS bearer that can be used to communicate user data not associated with the TFT.

A User Identity is information for identifying a subscriber. The User Identity may be an IMSI, or an MSISDN. Furthermore, the User Identity may also be identification information other than an IMSI or an MSISDN. Serving Node Information is information for identifying the MME_A 40/CPF_A 140/AMF_A 240 used in the PDU session, and may be an IP address of the MME_A 40/CPF_A 140/AMF_A 240.

The eNB Address is an IP address of the eNB_A 45. The eNB ID is information for identifying the UE in the eNB_A 45. An MME Address is an IP address of the MME_A 40/CPF_A 140/AMF_A 240. An MME ID is information for identifying the MME_A 40/CPF_A 140/AMF_A 240. The NR node Address is an IP address of the NR node_A 122. The NR node ID is information for identifying the NR node_A 122. The WAG Address is an IP address of the WAG_A 126. The WAG ID is information for identifying the WAG_A 126.

1.3. Description of Communication Procedures 1.3.1. Terminology and Definition of Identification Information First, before describing detailed processes of communication procedures according to the present embodiment, in order to avoid redundant descriptions, terminology specific to the present embodiment and primary identification information used in each procedure will be described beforehand.

To start with, 1st identification information according to the present embodiment is information indicating a release of UP resources associated with a PDU session while maintaining the PDU session. The 1st identification information may be information for identifying one or multiple PDU sessions from which UP resources have been released. Note that "releasing of UP resources associated with a PDU session while maintaining the PDU session" may be releasing of only a context related to the UP resources out of contexts associated with the PDU session.

2nd identification information according to the present embodiment is capability information indicating whether or not a UE-initiated service request procedure can be performed. The 2nd identification information may be allowing information indicating whether or not the UE-initiated service request procedure is allowed to be performed. Further, based on reception of the 2nd identification information, the UE_A 10 may determine and recognize that the UE-initiated service request procedure can be performed, or may determine and recognize that the UE-initiated service request procedure is allowed. Note that the UE-initiated service request procedure as used herein may signify a procedure performed for establishment of UP resources associated with a PDU session. Further, the UE-initiated service request procedure as used herein may signify a UE-initiated service request procedure initiated in the connected state.

3rd identification information according to the present embodiment is allowing information indicating whether or not a UE-initiated service request procedure is allowed to be performed. Further, based on reception of the 3rd identification information, the UE_A 10 may determine and recognize that the UE-initiated service request procedure is allowed. Note that the UE-initiated service request procedure as used herein may signify a procedure performed for establishment of UP resources associated with a PDU session. Further, the UE-initiated service request procedure as used herein may signify a UE-initiated service request procedure initiated in the connected state.

Further, the 2nd identification information and the 3rd identification information may be a single piece of identification information including significance of each piece of identification information. Therefore, in a case that the present embodiment has description that the 2nd identification information and the 3rd identification information are transmitted or included in the control message, the two pieces of identification information may be transmitted or included in the control message as a single piece of identification information having each significance.

4th identification information according to the present embodiment is capability information indicating whether or not a network-initiated service request procedure can be performed. The 4th identification information may be allowing information indicating whether or not the network-initiated service request procedure is allowed to be performed. Further, based on reception of the 4th identification information, the UE_A 10 may determine and recognize that the network-initiated service request procedure can be performed, or determine and recognize that the network-initiated service request procedure is allowed. Note that the network-initiated service request procedure as used herein may signify a procedure performed for establishment of UP resources associated with a PDU session.

5th identification information according to the present embodiment is allow information indicating whether or not a network-initiated service request procedure is allowed to be performed. Further, based on reception of the 5th identification information, the UE_A 10 may determine and recognize that the network-initiated service request procedure is allowed. Note that the network-initiated service request procedure as used herein may signify a procedure performed for establishment of UP resources associated with a PDU session.

Further, the 4th identification information and the 5th identification information may be a single piece of identification information including significance of each piece of identification information. Therefore, in a case that the present embodiment has description that the 4th identification information and the 5th identification information are transmitted or included in the control message, the two pieces of identification information may be transmitted or included in the control message as a single piece of identification information having each significance.

6th identification information according to the present embodiment s capability information indicating whether or not a network-initiated UP connection establishment procedure can be performed. The 6th identification information may be allowing information indicating whether or not the network-initiated UP connection establishment procedure is allowed to be performed. Further, based on reception of the 6th identification information, the UE_A 10 may determine and recognize that the network-initiated UP connection establishment procedure can be performed, or may determine and recognize that the network-initiated UP connection establishment procedure is allowed. Note that the network-initiated UP connection establishment, procedure as used herein may signify a procedure performed for establishment of UP resources associated with a PDU session.

7th identification information according to the present embodiment is allowing information indicating whether or not a network-initiated UP connection establishment procedure is allowed to be performed. Further, based on reception of the 7th identification information, the UE_A 10 may determine and recognize that the network-initiated UP connection establishment procedure is allowed. Note that the network-initiated UP connection establishment procedure as used herein may signify a procedure performed for establishment of UP resources associated with a PDU session.

Further, the 6th identification information and the 7th identification information may be a single piece of identification information including significance of each of the pieces of identification information. Therefore, in a case that the present embodiment has description that the 6th identification information and the 7th identification information are transmitted or included in the control message, the two pieces of identification information may be transmitted or included in the control message as a single piece of identification information having each significance.

8th identification information according to the present embodiment is information indicating a cause why UP resources associated with a PDU session are released. The 8th identification information may be information indicating that UP resources associated with a PDU session are released due to mobility to the outside of the LADN service area. Further, the 8th identification information may be information indicating that UP resources associated with a PDU session are released due to the situation that the network slice instance became unavailable. Note that the cause why the UP resources associated with a PDU session are released may not be limited to those causes described above.

9th identification information according to the present embodiment is information indicating a value of a timer for managing maintenance of a PDU session. The 9th identification information may be information indicating a period of time in which a PDU session is continuously maintained. Further, based on reception of the 9th identification information, the UE_A 10 may configure a value indicated by the 9th identification information as the value of the timer for managing maintenance of the PDU session, or may start the timer. Further, based on expiration of the timer, the UE_A 10 may release a PDU session from which UP resources have been released.

11th identification information according to the present embodiment, is information indicating a type of an access network. The 11th identification information may be information indicating a type of an access network associated with a PDU session that requires UP resource establishment. Further, the 11th identification information may be information indicating a type of an access network in which a PDU session associated with pending user data to be transmitted is established. Further, the 11th identification information may be information indicating 3GPP access, or may be information indicating non-3GPP access. Further, the 11th identification information may be information indicating 5GRA, may be information indicating E-UTRA, or may be information indicating a Wireless Local Access Network (WLAN). Further, the 11th identification information may be information that triggers initiation of a UE-initiated service request procedure.

12th identification information according to the present embodiment is information for identifying a PDU session. The 12th identification information may be a PDU session ID. Further, the 12th identification information may be information for identifying one or multiple PDU sessions, or may be information including one or multiple PDU session IDs. Further, the 12th identification information may be information for identifying a PDU session that requires UP resource establishment. Further, the 12th identification information may be information for identifying a PDU session associated with pending user data to be transmitted. Further, the 12th identification information may be information that triggers initiation of a UE-initiated service request procedure.

21st identification information according to the present embodiment is information for identifying a PDU session. The 21st identification information may be a PDU session. ID. Further, the 21st identification information may be information for identifying one or multiple PDU sessions, or may be information including one or multiple PDU session IDs. Further, the 21st identification information may be information for identifying a PDU session that requires UP resource establishment. Further, the 21st identification information may be information for identifying a PDU session associated with pending user data to be transmitted.

Further, the 21st identification information may be information selected and determined by the UE_A 10, based on reception of a control message from the network, and/or reception of identification information included in the control message. Specifically, the 21st identification information may be information indicating a PDU session that is the same as, or different from, the PDU session indicated by the 12th identification information.

31st identification information according to the present embodiment is information indicating a cause why a service request procedure has been rejected. The 31st identification information may be information indicating that establishment of UP resources associated with a PDU session is not allowed. Further, the 31st identification information may be information indicating that a request of the UE_A 10 is not allowed in a registration area and/or a TA to which the UE_A 10 currently belongs. Further, the 31st identification information may be information indicating that an area to which the UE_A 10 currently belongs is outside of the LADN service area.

Further, the 31st identification information may be information indicating that a request of the UE_A 10 is not allowed due to unavailability of the slice instance. Further, the 31st identification information may be information indicating that a request of the UE_A 10 has been rejected due to temporary and/or core network congestion, and/or access network congestion. Here, the request of the UE_A 10 may be a request for establishment of UP resources associated with a PDU session. Note that the cause why a service request procedure has been rejected as indicated by the 31st identification information may not be limited to those causes described above.

Further, the 31st identification information may be information indicating that establishment of UP resources associated with a PDU session is not allowed in a UE-initiated service request procedure. Further, the 31st identification information may be information indicating that identification information included in a service request message is inappropriate. Specifically, the 31st identification information may be information indicating that establishment of UP resources associated with a PDU session identified in the 21st identification information is not allowed and/or impossible.

41st identification information according to the present embodiment is capability information of the UE_A 10 indicating whether or not a second-type PDU session is supported. The 41st identification information may be information indicating whether or not the UE_A 10 supports the second-type PDU session.

42nd identification information according to the present embodiment is request information of the UE_A 10 indicating a request for establishment and/or use of the second-type PDU session. The 42nd identification information may be information indicating whether or not the UE_A 10 requests establishment and/or use of the second-type PDU session.

Note that the 42nd identification information and the 41st identification information may be a single piece of identification information including significance of each piece of identification information. Therefore, in a case that the present embodiment has a description that the 42nd identification information and the 41st identification information are transmitted or included in the control message, the two pieces of identification information may be transmitted or included in the control message as a single piece of identification information having each significance.

51st identification information according to the present embodiment is capability information of the network indicating whether or not the second-type PDU session is supported. The 51st identification information may be information indicating whether or not the network supports the second-type PDU session. Note that the UE_A 10 may recognize that establishment and/or use of the second-type PDU session has been accepted or allowed, based on reception of the 51st identification information.

52nd identification information according to the present embodiment is information indicating that the network has accepted and/or allowed a request for establishment and/or use of the second-type PDU session. The 52nd identification information may be information indicating whether or not, the network accepts or alto establishment and/or use of the second-type PDU session.

Note that the 52nd identification information and the 51st identification information may be a single piece of identification information including significance of each piece of identification information. Therefore, in a case that the present embodiment has description that the 52nd identification information and the 51st identification information are transmitted or included in the control message, the two pieces of identification information may be transmitted or included in the control message as a single piece of identification information having each significance.

Next, the identification information according to the present embodiment will be described. A 1st state according to the present embodiment is a state in which a procedure for allowing the UE_A 10 to be connected to and registered with the core network has been completed, and further, each apparatus establishes one or multiple PDU sessions. The 1st state may be a state in which each apparatus establishes one or multiple PDU sessions between the UE_A 10 and the DN_A 5 via the NR node_A 122 and the UPF_A 235. Further, the 1st state may be a state in which each apparatus can transmit and/or receive user data by using a PDU session. Further, the 1st state may be a state in which each apparatus has established UP resources associated with a PDU session. Further, the 1st state may be a state in which each apparatus is in the connected state. Note that the 1st state may not be limited to those states described above.

A 2nd state according to the present embodiment is a state in which a procedure for allowing the UE_A 10 to be connected to and registered with the core network has been completed, and further, each apparatus releases UP resources associated with one or multiple PDU sessions while maintaining the one or multiple PDU sessions. The 2nd state may be a state in which each apparatus establishes one or multiple PDU sessions between the UE_A 10 and the DN_A 5 via the NR node_A 122 and the UPF_A 235. Further, the 2nd state may be a state in which each apparatus cannot transmit and/or receive user data by using a specific PDU session. Further, the 2nd state may be a state in which each apparatus releases a PDU session associated with the PDU session while maintaining the PDU session, in the connected state rather than the disconnected state. Note that the 2nd state may not be limited to those states described above.

A 3rd state according to the present embodiment is a state in which each apparatus has re-established UP resources associated with a PDU session. In other words, the 3rd state may be a state the same as a state before the UP resources associated with the PDU session are released. The 3rd state may be a state the same as the 1st state. Further, the 3rd state may be a state the same as any one of 41st to 46th states. Note that the 3rd state may not be limited to those states described above.

An 11th state according to the present embodiment is a state in which each apparatus is allowed to initiate a UE-initiated service request procedure without transmission and/or reception of a message indicating a request from the network. The 11th state may be a state in which transmission and/or reception of a message indicating a request from the network is not necessary to initiate a UE-initiated service request procedure. Further, the 11th state may be a state in which the UE_A 10 can initiate a UE-initiated service request procedure, irrespective of transmission and/or reception of a message indicating a request from the network. Further, the 11th state may be a state in which the UE_A 10 can initiate a UE-initiated service request procedure at any timing. Here, the UE-initiated service request procedure according to the present embodiment may be a procedure for establishing UP resources associated with a PDU session. Further, the UE-initiated service request procedure may be a procedure performed for a specific PDU session. Note that the 11th state may not be limited to those states described above.

A 12th state according to the present embodiment is a state in which each apparatus is not allowed to initiate a UE-initiated service request procedure without transmission and/or reception of a message indicating a request from the network. The 12th state may be a state in which transmission and/or reception of a message indicating a request from the network is necessary to initiate a UE-initiated service request procedure. Further, the 12th state may be a state in which the UE_A 10 cannot initiate a UE-initiated service request procedure, irrespective of transmission and/or reception of a message indicating a request from the network. Further, the 12th state may be a state in which the UE_A 10 cannot initiate a UE-initiated service request procedure at any timing. Note that the 12th state may not be limited to those states described above.

A 21st state according to the present embodiment is a state in which each apparatus is allowed to perform a network-initiated service request procedure and to perform a network-initiated. UP connection establishment procedure. The 21st state may be a state in which each apparatus can perform a network-initiated service request procedure. Further, the 21st state may be a state in which a network-initiated UP connection establishment procedure can be performed. Further, the 21st state may be a state in which the UE_A 10 can initiate a UE-initiated service request procedure, based on a request message from the network. Note that each of the network-initiated service request procedure and the network-initiated UP connection establishment procedure according to the present embodiment may be a procedure for establishing UP resources associated with a PDU session. Further, each of the network-initiated service request procedure and the network-initiated UP connection establishment procedure may be a procedure performed for a specific PDU session. Note that the 21st state may not be limited to those states described above.

A 22nd state according to the present embodiment is a state in which each apparatus is allowed to perform a network-initiated service request procedure and is not allowed to perform a network-initiated UP connection establishment procedure. The 22nd state may be a state in which each apparatus can perform a network-initiated service request procedure. Further, the 22nd state may be a state in which a network-initiated UP connection establishment procedure cannot be performed. Further, the 22nd state may be a state in which the UE_A 10 cannot initiate a UE-initiated service request procedure, based on a request message from the network. Note that the 22nd state may not be limited to those states described above.

A 23rd state according to the present embodiment is a state in which each apparatus is allowed to perform a network-initiated UP connection establishment procedure and is not allowed to perform a network-initiated service request procedure. The 23rd state may be a state in which each apparatus cannot perform a network-initiated service request procedure. Further, the 23rd state may be a state in which a network-initiated UP connection establishment procedure can be performed. Further, the 23rd state may be a state in which the UE_A 10 can initiate a UE-initiated service request procedure, based on a request message from the network. Note that the 23rd state may not be limited to those states described above.

A 31st state according to the present embodiment is a combination of the 2nd state, the 11th state, and the 21st state. A situation in which a state of each apparatus is the 31st state may signify that each apparatus is in the 2nd state, the 11th state, and the 21st state. Note that the 31st state may not be limited to those states described above.

A 32nd state according to the present embodiment is a combination of the 2nd state, the 11th state, and the 22nd state. A situation in which a state of each apparatus is the 32nd state may signify that each apparatus is in the 2nd state, the 11th state, and the 22nd state. Note that the 32nd state may not be limited to those states described above.

A 33rd state according to the present embodiment is a combination of the 2nd state, the 11th state, and the 23rd state. A situation in which a state of each apparatus is the 33rd state may signify that each apparatus is in the 2nd state, the 11th state, and the 23rd state. Note that the 33rd state may not be limited to those states described above.

A 34th state according to the present embodiment is a combination of the 2nd state, the 12th state, and the 21st state. A situation in which a state of each apparatus is the 34th state may signify that each apparatus is in the 2nd state, the 12th state, and the 21st state. Note that the 34th state may not be limited to those states described above.

A 35th state according to the present embodiment is a combination of the 2nd state, the 12th state, and the 22nd state. A situation in which a state of each apparatus is the 35th state may signify that each apparatus is in the 2nd state, the 12th state, and the 22nd state. Note that the 35th state may not be limited to those states described above.

A 36th state according to the present embodiment is a combination of the 2nd state, the 12th state, and the 23rd state. A situation in which a state of each apparatus is the 36th state may signify that each apparatus is in the 2nd state, the 12th state, and the 23rd state. Note that the 36th state may not be limited to those states described above.

A 41st state according to the present embodiment is a combination of the 1st state, the 11th state, and the 21st state. A situation in which a state of each apparatus is the 41st state may signify that each apparatus is in the 1st state, the 11th state, and the 21st state. Note that the 41st state may not be limited to those states described above.

A 42nd state according to the present embodiment is a combination of the 1st state, the 11th state, and the 22nd state. A situation in which a state of each apparatus is the 42nd state may signify that each apparatus is in the 1st state, the 11th state, and the 22nd state. Note that the 42nd state may not be limited to those states described above.

A 43rd state according to the present embodiment is a combination of the 1st state, the 11th state, and the 23rd state. A situation in which a state of each apparatus is the 43rd state may signify that each apparatus is in the 1st state, the 11th state, and the 23rd state. Note that the 43rd state may not be limited to those states described above.

A 44th state according to the present embodiment is a combination of the 1st state, the 12th state, and the 21st state. A situation in which a state of each apparatus is the 44th state may signify that each apparatus is in the 1st state, the 12th state, and the 21st state. Note that the 44th state may not be limited to those states described above.

A 45th state according to the present embodiment is a combination of the 1st state, the 12th state, and the 22nd state. A situation in which a state of each apparatus is the 45th state may signify that each apparatus is in the 1st state, the 12th state, and the 22nd state. Note that the 45th state may not be limited to those states described above.

A 46th state according to the present embodiment is a combination of the 1st state, the 12th state, and the 23rd state. A situation in which a state of each apparatus is the 46th state may signify that each apparatus is in the 1st state, the 12th state, and the 23rd state. Note that the 46th state may not be limited to those states described above.

The User Plane (UP) resources according to the present embodiment are resources associated with a PDU session and used to transmit and/or receive user data. The UP resources may include radio bearers (Data Radio Bearers (DRBs)) used to transmit and/or receive user data established between the UE_A 10 and the NR node_A 122, and/or an N3 tunnel established between the NR node_A 122 and the UPF_A 235. Further, the UP resources may include an IPsec tunnel used to transmit and/or receive user data established between the UE_A 10 and the N3IWF_A 128, and/or an N3 tunnel established between the N3IWF_A 128 and the UPF_A 235.

Further, "to establish UP resources" may signify that each apparatus establishes radio bearers or an IPsec tunnel used to transmit and/or receive user data, and/or an N3 tunnel, and/or an N9 tunnel. Further, "to establish UP resources" may signify a situation in which each apparatus establishes an N3 tunnel and/or an N9 tunnel associated with a PDU session, and associates the established N3 tunnel and/or N9 tunnel with radio bearers or an IPsec tunnel used to transmit and/or receive maintained user data, so that user data can be transmitted and/or received by using the PDU session. Further, "to establish UP resources" may signify that the SMF_A 230 selects an appropriate UPF_A 235, and establishes a UE context of the selected UPF_A 235.

Further, "to release UP resources" may signify that each apparatus releases radio bearers or an IPsec tunnel used to transmit and/or receive user data, and/or an N3 tunnel, and/or an N9 tunnel. Further, "to release UP resources" may signify that each apparatus releases an N3 tunnel and/or an N9 tunnel while maintaining radio bearers or an IPsec tunnel associated with a PDU session and used to transmit and/or receive user data. Further, "to release UP resources" may signify that the SMF_A 230 also releases a UE context of the UPF_A 235 with which a PDU session is established. Note that the UP resources may signify UP connection. Conversely, the expression "UP connection" may signify UP resources.

The second-type PDU session according to the present embodiment is a PDU session that can be suspended or resumed. Further, the second-type PDU session may be a PDU session that UP resources associated with the PDU session can be released.

Note that suspending and/or resuming of the second-type PDU session may be performed based on that the UE_A 10 has moved to a TA that is different from TA(s) indicated in a TA list held by the UE_A 10, based on performance of a registration procedure that is performed after the UE_A 10 moves to a TA that is different from TA(s) indicated in a TA list held by the UE_A 10, or based on performance of another procedure that is performed after such a registration procedure. In this case, each apparatus cannot perform Session Continuity while the UE_A 10 is in a target TA that is different from TA(s) indicated in a TA list held by the UE_A 10. However, each apparatus may restore to a previous state in a case that the UE_A 10 returns to a source TA (original TA before movement), for example. Note that timing of suspending or resuming the second-type PDU session is not limited to the timing described above.

Furthermore, the second-type PDU session may be released, based on expiration of a first timer. In other words, in a case that the first timer expires while the second-type PDU session is suspended, each apparatus may release the suspended PDU session, or may release a context related to the suspended PDU session.

Note that the suspending and/or resuming of the PDU session may be individually performed by each apparatus without transmitting and/or receiving a control message to and/or from apparatus, or may be implemented by performing a procedure for suspending a PDU session and/or a bearer or a procedure for resuming a PDU session and/or a bearer.

Furthermore, in the present embodiment, the expression "a PDU session is suspended" may signify a situation in which UP resources associated with a PDU session are released while the PDU session is maintained. Furthermore, the expression "a PDU session is suspended" may signify transition to a state in which a context of UP resources associated with a PDU session is released while a context of the PDU session is maintained, or may signify transition to a state in which user data cannot be transmitted and/or received by using the PDU session.

Furthermore, in the present embodiment, the expression "a PDU session is resumed" may signify a situation in which UP resources associated with a PDU session are established. Furthermore, the expression "a PDU session is suspend" may signify transition to a state in which a context of UP resources associated with a PDU session is created, or may signify transition to a state in which user data can be transmitted and/or received by using the PDU session, through the use of a maintained context of the PDU session and the created UP context.

First, in the present embodiment, the network refers to at least a part of the access network_B 80/120/125, the core network_B 190, the DN_A 5, and the DN_B 105. One or more apparatuses included in at least a part of the access network_B 80/120/125, the core network_B 190, the DN_A 5, and the DN_B 105 may also be referred to as a network or a network apparatus. Specifically, the expression "the network performs transmission and/or reception of a message and/or performs a procedure" signifies that "an apparatus in a network (network apparatus) performs transmission and/or reception of a message and/or performs a procedure".

A Session Management (SM) message (also referred to as a Non-Access-Stratum (NAS) SM message) as used in the present embodiment may be a NAS message used in a procedure for the SM, or may be a control message transmitted and/or received between the UE_A 10 and the SMF_A 230 or the SMF_B 232 via the AMF_A 240. Furthermore, the SM message may include a PDU Session Establishment Request message, a PDU Session Establishment Accept message, a PDU session completion message, a PDU session reject message, a PDU session modification request message, a PDU session modification accept message, a PDU session modification reject message, and the like. The procedure for SM may include a PDU session establishment procedure, a PDU session modification procedure, and the like.

The registration area as used in the present embodiment is information indicating one or multiple tracking areas or cells allocated to the UE_A 10. The registration area may be information allocated by the AMF_A 240. The registration area may be information allocated in consideration of a UE mobility pattern and service area restrictions. Further, the registration area may be information indicating a cell to which the UE_A 10 is currently connected, or may be information indicating a tracking area to which the UE_A 10 currently belongs. Further, the registration area may be stored for each access type, and may be information distinguishing a 3GPP connection registration area and a non-3GPP connection registration area, for example. Further, the registration area may be a tracking area.

The tracking area (also referred to as a Tracking Area: TA) as used in the present embodiment is a range that is managed by the core network and can be represented by position information of the UE_A 10. The tracking area may include one or more cells, for example. Furthermore, the TA may be a range in which a control message such as a paging message is broadcasted, or may be a range in which the UE_A 10 can move without a handover procedure.

The TA list as used in the present embodiment is a list including one or more TAs assigned to the UE_A 10 by the network. Note that while the UE_A 10 moves between one or more TAs included in the TA list, the UE_A 10 may be able to move without performing a registration procedure. In other words, the TA list may be an information group indicative of an area in which the UE_A 10 can move without performing the registration procedure.

The Local Area Data Network (LADN) as used in the present embodiment is a DN accessible only from a specific area. The LADN may be a DN for Mobile Edge Computing (MEC). Further, the LADN may be a local DN, or may be a DN located near the access point of the UE_A 10 and operating third party services. Note that the LADN may be represented as the DN_B 105, or the DN_B 105 may be represented as the LADN.

The LADN Service Area as used in the present embodiment is an area accessible to the LADN. The LADN service area may include one or multiple TAs that belong to the current registration area. Further, information related to the LADN service area may be provided to the UE_A 10 from the network during a registration procedure. Further, the UE_A 10 may request PDU session establishment with an available LADN while the UE_A 10 is present in the LADN service area.

Conversely, the UE_A 10 may be prohibited from initiating a PDU session establishment procedure for requesting establishment, of a PDU session with the LADN while the UE_A 10 is present outside of the LADN service area. Further, in a case that the SMF_A 230 receives a request message for establishment of a PDU session with the LADN from the UE_A 10 present outside of the LADN service area, the SMF_A 230 may reject the request of the UE_A 10. Further, in a case that the UE_A 10 is present outside of the LADN service area, the UE_A 10 may be prohibited from initiating a service request procedure for establishing UP resources associated with a PDU session with the LADN. Further, in a case that the SMF_A 230 receives a request message for establishment of UP resources associated with a PDU session with the LADN from the UE_A 10 present outside of the LADN service area, the SMF_A 230 may reject the request of the UE_A 10.

The Network Slice as used in the present embodiment is a logical network that provides specific network capabilities and network performance. The network slice may be hereinafter referred to as an NW slice.

The Network Slice Instance (NSI) as used in the present embodiment includes an instance (entity) of the network function (NF) and a set of required resources, and forms a deployed network slice. Here, the NF is a processing function in the network and is employed or defined in the 3GPP. The NSI is an entity of one or more Network Slices configured in the core network_B 190. The NSI may include a virtual Network Function (NF) generated using a Network Slice Template (NST). Here, the NST is associated with a resource request for providing a required communication service or capability, and is a logical expression of one or more Network Functions (NFs). Specifically, the NSI may be an aggregation including multiple NFs in the core network_B 190. The NSI may be a logical network configured to classify the user data delivered through a service or the like. The network slice may include one or more NFs. The NF included in the network slice may be or may not be an apparatus shared by another network slice. The UE_A 10 can be assigned to the one or more network slices, based on a UE usage type and/or one or more network slice type IDs and/or one or more pieces of registration information such as NS ID(s) and/or the APN.

The Network Slice Instance (NSI) as used in the present embodiment is an entity of each of one or multiple Network Slices configured in the core network_B 190. The NSI as used in the present embodiment may include a virtual Network Function (NF) generated using a Network Slice Template (NST). Here, the NST is associated with a resource request for providing a required communication service or capability, and is a logical expression of one or multiple Network Functions (NFs). Specifically, the NSI may be an aggregation including multiple NFs in the core network_B 190. The NSI may be a logical network configured to classify the user data delivered through a service or the like. The network slice may include at least one or more NFs. The NF included in the network slice may be or may not be an apparatus shared by another network slice. The UE_A 10 and/or the apparatus in the network can be assigned to one or multiple network slices, based on NSSAI and/or S-NSSAI, a UE usage type and/or one or multiple network slice type IDs and/or one or multiple pieces of registration information such as NS ID(s) and/or the APN.

The S-NSSAI as used in the present embodiment is an acronym for Single Network Slice Selection Assistance information, and is information for identifying a network slice. The S-NSSAI may include a Slice/Service type (SST) and a Slice Differentiator (SD). The S-NSSAI may include only an SST, or may include both an SST and an SD. Here, the SST is information indicating expected operation of a network slice in terms of functions and services. The SD may be information that complements the SST in a case that one NSI is selected from multiple NSIs indicated by the SST. The S-NSSAI may be specific information for each PLMN, or may be standard information shared by multiple PLMNs. A network may store one or multiple pieces of S-NSSAI in registration information of the UE_A 10, as default S-NSSAI.

The Single Network Slice Selection Assistance information (NSSAI) as used in the present embodiment is a collection of pieces of S-NSSAI. Each piece of S-NSSAI included in the NSSAI is information for assisting the access network or the core network to select an NSI. The UE_A 10 may store NSSAI allowed by a network for each PLMN. The NSSAI may be information used to select the AMF_A 240.

The mobility of the UE_A 10 across TAs in the present embodiment indicates that the UE_A 10 moves to a TA that is different from a TA to which the UE_A 10 is currently connected. In other words, the mobility of the UE_A 10 across TAs may indicate that the UE_A 10 has entered a TA that is different from a TA to which the UE_A 10 is currently connected. Note that the TA that is different from a TA to which the UE_A 10 is currently connected may be a TA that is not included in the TA list currently held by the UE_A 10. Furthermore, the mobility of the UE_A 10 across TAs may include re-registration of location information and/or switching of an established communication path to perform Session Continuity and/or Service Continuity, based on that the UE_A 10 has entered a TA that is different from a TA to which the UE_A 10 is currently connected.

The first timer in the present embodiment is a timer for indicating expiration time of a suspended PDU session. Each apparatus may release a suspended PDU session, based on expiration of the first timer.

Note that timing of starting the first timer may be time at which a PDU session is suspended, time at which the UE_A 10 enters a new TA, and time at which a tracking area update procedure, which is performed due to the situation that the UE_A 10 has entered a new TA, is completed.

In a case that the UE_A 10 returns to a TA to which the UE_A 10 was previously connected while the first timer is running, or in a case that a tracking area update procedure, which is performed due to the situation that the UE_A 10 has returned to a TA to which the UE_A 10 was previously connected, is completed, the suspended PDU session may be resumed. In this case, the first timer that is running may be stopped, or the first timer may be reset. Note that the TA to which the UE_A 10 was previously connected may be a TA that was included in the TA list held by the UE_A 10 before the PDU session was suspended.

The default-type PDU session in the present embodiment is a PDU session established in a case that each apparatus does not transmit and/or receive identification information indicating a type of a PDU session to be established in a procedure of establishing a PDU session. A type of the default-type PDU session may be determined according to a policy such as a UE policy and an operator policy, or may be configured in the UE_A 10 in advance. Furthermore, the default-type PDU session may be a first PDU session, a second PDU session, or a third PDU session. Note that determination of the default-type PDU session is not limited to the determination described above.

1.3.2. Overview of Communication Procedures

Next, an overview of communication procedures according to the present embodiment will be described. A communication procedure(s) according to the present embodiment is hereinafter also referred to as the present procedure(s). The communication procedures (present procedures) include 1st to 12th communication procedures. Based on a state of each apparatus, a policy of the UE_A 10, an operator policy, a control message transmitted and/or received among apparatuses, and/or identification information included in the control message, for example, each apparatus may select one procedure to be performed out of the 1st to 12th communication procedures, and may perform the selected procedure. Note that conditions used by each apparatus to select one procedure to be performed out of the 1st to 12th communication procedures may not be limited to those conditions described above.

Each apparatus involved in the present procedure may transmit and/or receive each control message described in the present procedure to transmit and/or receive one or more pieces of identification information included in each control message, and may store each piece of transmitted and/or received identification information as a context.

1.3.3. 1st Communication Procedure

Next, a 1st communication procedure according to the present embodiment will be described. The 1st communication procedure is hereinafter also referred to as the present procedure. The 1st communication procedure (present procedure) includes an initial procedure; a PDU session release procedure or a PDU session modification procedure; and a UE-initiated service request procedure, a network-initiated service request procedure, or a network-initiated UP connection establishment procedure, each of which will be described later.

Specifically, each apparatus transitions to the 1st state by performing the initial procedure. Next, each apparatus transitions to the 31st state by performing the PDU session release procedure or the PDU session modification procedure. Next, each apparatus transitions to the 3rd state by performing any one of the UE-initiated service request procedure, the network-initiated service request procedure, and the network-initiated UP connection establishment procedure. Through the above operation, the present procedure is completed.

Here, each apparatus may perform the PDU session release procedure or the PDU session modification procedure, based on transition to the 1st state. Further, each apparatus may perform any procedure of the UE-initiated service request procedure, the network-initiated service request procedure, and the network-initiated UP connection establishment procedure, based on transition to the 31st state.

Note that, regardless of the above conditions, each apparatus may perform the PDU session release procedure or the PDU session modification procedure at any timing, at least on the condition that the apparatus has transitioned to the 1st state. Further, regardless of the above conditions, each apparatus may perform any procedure of the UE-initiated service request procedure, the network-initiated service request procedure, and the network-initiated UP connection establishment procedure at any timing, at least on the condition that the apparatus has transitioned to the 31st state.

Note that, in the case of the present procedure, the 2nd identification information may be information indicating that the UE-initiated service request procedure can be performed. Further, in the case of the present procedure, the 3rd identification information may be information indicating that the UE-initiated service request procedure is allowed. Further, in the case of the present procedure, the 4th identification information may be information indicating that the network-initiated service request procedure can be performed. Further, in the case of the present procedure, the 5th identification information may be information indicating that the network-initiated service request procedure is allowed. Further, in the case of the present procedure, the 6th identification information may be information indicating that the network-initiated UP connection establishment procedure can be performed. Further, in the case of the present procedure, the 7th identification information may be information indicating that the network-initiated UP connection establishment procedure is allowed.

Further, in the case of the present procedure, each of 21st processing and 31st processing may be processing in which the UE_A 10 determines and recognizes that the UE-initiated service request procedure, the network-initiated service request procedure, and the network-initiated UP connection establishment procedure are allowed in a case that the UE_A 10 re-establishes UP resources associated with a PDU session.

Further, in the case of the present procedure, 1st processing and/or 11th processing may be processing for allowing each apparatus to transition to the 1st state, or may be processing in which each apparatus determines to transition to the 1st state. Further, in the case of the present procedure, each of the 21st processing and the 31st processing may be processing for allowing each apparatus to transition to the 31st state, or may be processing in which each apparatus determines to transition to the 31st state. Further, in the case of the present procedure, each of 51st processing and 61st processing may be processing for allowing each apparatus to transition to the 3rd state, or may be processing in which each apparatus determines to transition to the 3rd state.

Further, the UE_A 10 may transition to the 1st state, based on the 1st processing or the 11th processing. Further, the UE_A 10 may transition to the 31st state, based on reception of one or more pieces of identification information out of the 1st identification information to the 9th identification information, the 21st processing, or the 31st processing. Further, the UE_A 10 may transition to the 3rd state, based on the 51st processing or the 61st processing.

1.3.4. 2nd Communication Procedure

Next, a 2nd communication procedure according to the present embodiment will be described. The 2nd communication procedure is hereinafter also referred to as the present procedure. The 2nd communication procedure (present procedure) includes an initial procedure; a PDU session release procedure or a PDU session modification procedure; and a UE-initiated service request procedure or a network-initiated service request procedure, each of which will be described later.

Specifically, each apparatus transitions to the 1st state by performing the initial procedure. Next, each apparatus transitions to the 32nd state by performing the PDU session release procedure or the PDU session modification procedure. Next, each apparatus transitions to the 3rd state by performing either the UE-initiated service request procedure or the network-initiated service request procedure. Through the above operation, the present procedure is completed.

Here, each apparatus may perform the PDU session release procedure or the PDU session modification procedure, based on transition to the 1st state. Further, each apparatus may perform either procedure of the UE-initiated service request procedure or the network-initiated service request procedure, based on transition to the 32nd state.

Note that, regardless of the above conditions, each apparatus may perform the PDU session release procedure or the PDU session modification procedure at any timing, at least on the condition that the apparatus has transitioned to the 1st state. Further, regardless of the above conditions, each apparatus may perform either procedure of the UE-initiated service request procedure or the network-initiated service request procedure at any timing, at least on the condition that the apparatus has transitioned to the 32nd state.

Note that, in the case of the present procedure, the 2nd identification information may be information indicating that the UE-initiated service request procedure can be performed. Further, in the case of the present procedure, the 3rd identification information may be information indicating that the UE-initiated service request procedure is allowed. Further, in the case of the present procedure, the 4th identification information may be information indicating that the network-initiated service request procedure can be performed. Further, in the case of the present procedure, the 5th identification information may be information indicating that the network-initiated service request procedure is allowed. Further, in the case of the present procedure, the 6th identification information may be information indicating that the network-initiated UP connection establishment procedure cannot be performed. Further, in the case of the present procedure, the 7th identification information may be information indicating that the network-initiated UP connection establishment procedure is not allowed.

Further, in the case of the present procedure, each of 21st processing and 31st processing may be processing in which the UE_A 10 determines and recognizes that the UE-initiated service request procedure and the network-initiated service request procedure are allowed in a case that the UE_A 10 re-establishes UP resources associated with a PDU session, or may be processing in which the UE_A 10 determines and recognizes that the network-initiated UP connection establishment procedure is not allowed.

Further, in the case of the present procedure, 1st processing and/or 11th processing may be processing for allowing each apparatus to transition to the 1st state, or may be processing in which each apparatus determines to transition to the 1st state. Further, in the case of the present procedure, each of the 21st processing and the 31st processing may be processing for allowing each apparatus to transition to the 32nd state, or may be processing in which each apparatus determines to transition to the 32nd state. Further, in the case of the present procedure, each of 51st processing and 61st processing may be processing for allowing each apparatus to transition to the 3rd state, or may be processing in which each apparatus determines to transition to the 3rd state.

Further, the UE_A 10 may transition to the 1st state, based on the 1st processing or the 11th processing. Further, the UE_A 10 may transition to the 32nd state, based on reception of one or more pieces of identification information out of the 1st identification information to the 9th identification information, the 21st processing, or the 31st processing. Further, the UE_A 10 may transition to the 3rd state, based on the 51st processing or the 61st processing.

1.3.5. 3rd Communication Procedure

Next, a 3rd communication procedure according to the present embodiment will be described. The 3rd communication procedure is hereinafter also referred to as the present procedure. The 3rd communication procedure (present procedure) includes an initial procedure; a PDU session release procedure or a PDU session modification procedure; and a UE-initiated service request procedure or a network-initiated UP connection establishment procedure, each of which will be described later.

Specifically, each apparatus transitions to the 1st state by performing the initial procedure. Next, each apparatus transitions to the 33rd state by performing the PDU session release procedure or the PDU session modification procedure. Next, each apparatus transitions to the 3rd state by performing either the UE-initiated service request procedure or the network-initiated UP connection establishment procedure. Through the above operation, the present procedure is completed.

Here, each apparatus may perform the PDU session release procedure or the PDU session modification procedure, based on transition to the 1st state. Further, each apparatus may perform either procedure of the UE-initiated service request procedure or the network-initiated UP connection establishment procedure, based on transition to the 33rd state.

Note that, regardless of the above conditions, each apparatus may perform the PDU session release procedure or the PDU session modification procedure at any timing, at least on the condition that the apparatus has transitioned to the 1st state. Further, regardless of the above conditions, each apparatus may perform either procedure of the UE-initiated service request procedure or the network-initiated UP connection establishment procedure at any timing, at least on the condition that the apparatus has transitioned to the 33rd state.

Note that, in the case of the present procedure, the 2nd identification information may be information indicating that the UE-initiated service request procedure can be performed. Further, in the case of the present procedure, the 3rd identification information may be information indicating that the UE-initiated service request procedure is allowed. Further, in the case of the present procedure, the 4th identification information may be information indicating that the network-initiated service request procedure cannot be performed. Further, in the case of the present procedure, the 5th identification information may be information indicating that the network-initiated service request procedure is not allowed. Further, in the case of the present procedure, the 6th identification information may be information indicating that the network-initiated UP connection establishment procedure can be performed. Further, in the case of the present procedure, the 7th identification information may be information indicating that the network-initiated UP connection establishment procedure is allowed.

Further, in the case of the present procedure, each of 21st processing and 31st processing may be processing in which the UE_A 10 determines and recognizes that the UE-initiated service request procedure and the network-initiated UP connection establishment procedure are allowed in a case that the UE_A 10 re-establishes UP resources associated with a PDU session, or may be processing in which the UE_A 10 determines and recognizes that the network-initiated service request procedure is not allowed.

Further, in the case of the present procedure, 1st processing and/or 11th processing may be processing for allowing each apparatus to transition to the 1st state, or may be processing in which each apparatus determines to transition to the 1st state. Further, in the case of the present procedure, each of the 21st processing and the 31st processing may be processing for allowing each apparatus to transition to the 33rd state, or may be processing in which each apparatus determines to transition to the 33rd state. Further, in the case of the present procedure, each of 51st processing and 61st processing may be processing for allowing each apparatus to transition to the 3rd state, or may be processing in which each apparatus determines to transition to the 3rd state.

Further, the UE_A 10 may transition to the 1st state, based on the 1st processing or the 11th processing. Further, the UE_A 10 may transition to the 33rd state, based on reception of one or more pieces of identification information out of the 1st identification information to the 9th identification information, the 21st processing, or the 31st processing. Further, the UE_A 10 may transition to the 3rd state, based on the 51st processing or the 61st processing.

1.3.6. 4th Communication Procedure

Next, a 4th communication procedure according to the present embodiment will be described. The 4th communication procedure is hereinafter also referred to as the present procedure. The 4th communication procedure (present procedure) includes an initial procedure; a PDU session release procedure or a PDU session modification procedure; a network-initiated service request procedure or a network-initiated UP connection establishment procedure, each of which will be described later.

Specifically, each apparatus transitions to the 1st state by performing the initial procedure. Next, each apparatus transitions to the 34th state by performing the PDU session release procedure or the PDU session modification procedure. Next, each apparatus transitions to the 3rd state by performing either the network-initiated service request procedure or the network-initiated UP connection establishment procedure. Through the above operation, the present procedure is completed.

Here, each apparatus may perform the PDU session release procedure or the PDU session modification procedure, based on transition to the 1st state. Further, each apparatus may perform either procedure of the network-initiated service request procedure or the network-initiated UP connection establishment procedure, based on transition to the 34th state.

Note that, regardless of the above conditions, each apparatus may perform the PDU session release procedure or the PDU session modification procedure at any timing, at least on the condition that the apparatus has transitioned to the 1st state. Further, regardless of the above conditions, each apparatus may perform either procedure of the network-initiated service request procedure or the network-initiated UP connection establishment procedure at any timing, at least on the condition that the apparatus has transitioned to the 34th state.

Note that, in the case of the present procedure, the 2nd identification information may be information indicating that the UE-initiated service request procedure cannot be performed. Further, in the case of the present procedure, the 3rd identification information may be information indicating that the UE-initiated service request procedure is not allowed. Further, in the case of the present procedure, the 4th identification information may be information indicating that the network-initiated service request procedure can be performed. Further, in the case of the present procedure, the 5th identification information may be information indicating that the network-initiated service request procedure is allowed. Further, in the case of the present procedure, the 6th identification information may be information indicating that the network-initiated UP connection establishment procedure can be performed. Further, in the case of the present procedure, the 7th identification information may be information indicating that the network-initiated UP connection establishment procedure is allowed.

Further, in the case of the present procedure, each of 21st processing and 31st processing may be processing in which the UE_A 10 determines and recognizes that the network-initiated service request procedure and the network-initiated UP connection establishment procedure are allowed in a case that the UE_A 10 re-establishes UP resources associated with a PDU session, or may be processing in which the UE_A 10 determines and recognizes that the UE-initiated service request procedure is not allowed.

Further, in the case of the present procedure, 1st processing and/or 11th processing may be processing for allowing each apparatus to transition to the 1st state, or may be processing in which each apparatus determines to transition to the 1st state. Further, in the case of the present procedure, each of the 21st processing and the 31st processing may be processing for allowing each apparatus to transition to the 34th state, or may be processing in which each apparatus determines to transition to the 34th state. Further, in the case of the present procedure, each of 51st processing and 61st processing may be processing for allowing each apparatus to transition to the 3rd state, or may be processing in which each apparatus determines to transition to the 3rd state.

Further, the UE_A 10 may transition to the 1st state, based on the 1st processing or the 11th processing. Further, the UE_A 10 may transition to the 34th state, based on reception of one or more pieces of identification information out of the 1st identification information to the 9th identification information, the 21st processing, or the 31st processing. Further, the UE_A 10 may transition to the 3rd state, based on the 51st processing or the 61st processing.

1.3.7. 5th Communication Procedure

Next, a 5th communication procedure according to the present embodiment will be described. The 5th communication procedure is hereinafter also referred to as the present procedure. The 5th communication procedure (present procedure) includes an initial procedure; a PDU session release procedure or a PDU session modification procedure; and a network-initiated service request procedure, each of which will be described later.

Specifically, each apparatus transitions to the 1st state by performing the initial procedure. Next, each apparatus transitions to the 35th state by performing the PDU session release procedure or the PDU session modification procedure. Next, each apparatus transitions to the 3rd state by performing the network-initiated service request procedure. Through the above operation, the present procedure is completed.

Here, each apparatus may perform the PDU session release procedure or the PDU session modification procedure, based on transition to the 1st state. Further, each apparatus may perform the network-initiated service request procedure, based on transition to the 35th state.

Note that, regardless of the above conditions, each apparatus may perform the PDU session release procedure or the PDU session modification procedure at any timing, at least on the condition that the apparatus has transitioned to the 1st state. Further, regardless of the above conditions, each apparatus may perform the network-initiated service request procedure at any timing, at least on the condition that the apparatus has transitioned to the 35th state.

Note that, in the case of the present procedure, the 2nd identification information may be information indicating that the UE-initiated service request procedure cannot be performed. Further, in the case of the present procedure, the 3rd identification information may be information indicating that the UE-initiated service request procedure is not allowed. Further, in the case of the present procedure, the 4th identification information may be information indicating that the network-initiated service request procedure can be performed. Further, in the case of the present procedure, the 5th identification information may be information indicating that the network-initiated service request procedure is allowed. Further, in the case of the present procedure, the 6th identification information may be information indicating that the network-initiated UP connection establishment, procedure cannot be performed. Further, in the case of the present procedure, the 7th identification information may be information indicating that the network-initiated UP connection establishment procedure is not allowed.

Further, in the case of the present procedure, each of 21st processing and 31st processing may be processing in which the UE_A 10 determines and recognizes that the network-initiated service request procedure is allowed in a case that the UE_A 10 re-establishes UP resources associated with a PDU session, or may be processing in which the UE_A 10 determines and recognizes that the UE-initiated service request procedure and the network-initiated UP connection establishment procedure are not allowed.

Further, in the case of the present procedure, 1st processing and/or 11th processing may be processing for allowing each apparatus to transition to the 1st state, or may be processing in which each apparatus determines to transition to the 1st state. Further, in the case of the present procedure, each of the 21st processing and the 31st processing may be processing for allowing each apparatus to transition to the 35th state, or may be processing in which each apparatus determines to transition to the 35th state. Further, in the case of the present procedure, each of 51st processing and 61st processing may be processing for allowing each apparatus to transition to the 3rd state, or may be processing in which each apparatus determines to transition to the 3rd state.

Further, the UE_A 10 may transition to the 1st state, based on the 1st processing or the 11th processing. Further, the UE_A 10 may transition to the 35th state, based on reception of one or more pieces of identification information out of the 1st identification information to the 9th identification information, the 21st processing, or the 31st processing. Further, the UE_A 10 may transition to the 3rd state, based on the 51st processing or the 61st processing.

1.3.8. 6th Communication Procedure

Next, a 6th communication procedure according to the present embodiment will be described. The 6th communication procedure is hereinafter also referred to as the present procedure. The 6th communication procedure (present procedure) includes an initial procedure; a PDU session release procedure or a PDU session modification procedure; and a network-initiated UP connection establishment procedure, each of which will be described later.

Specifically, each apparatus transitions to the 1st state by performing the initial procedure. Next, each apparatus transitions to the 36th state by performing the PDU session release procedure or the PDU session modification procedure. Next, each apparatus transitions to the 3rd state by performing the network-initiated UP connection establishment procedure. Through the above operation, the present procedure is completed.

Here, each apparatus may perform the PDU session release procedure or the PDU session modification procedure, based on transition to the 1st state. Further, each apparatus may perform the network-initiated UP connection establishment procedure, based on transition to the 36th state.

Note that, regardless of the above conditions, each apparatus may perform the PDU session release procedure or the PDU session modification procedure at any timing, at least on the condition that the apparatus has transitioned to the 1st state. Further, regardless of the above conditions, each apparatus may perform the network-initiated UP connection establishment procedure at any timing, at least on the condition that the apparatus has transitioned to the 36th state.

Note that, in the case of the present procedure, the 2nd identification information may be information indicating that the UE-initiated service request procedure cannot be performed. Further, in the case of the present procedure, the 3rd identification information may be information indicating that the UE-initiated service request procedure is not allowed. Further, in the case of the present procedure, the 4th identification information may be information indicating that the network-initiated service request procedure cannot be performed. Further, in the case of the present procedure, the 5th identification information may be information indicating that the network-initiated service request procedure is not allowed. Further, in the case of the present procedure, the 6th identification information may be information indicating that the network-initiated UP connection establishment procedure can be performed. Further, in the case of the present procedure, the 7th identification information may be information indicating that the network-initiated UP connection establishment procedure is allowed.

Further, in the case of the present procedure, each of 21st processing and 31st processing may be processing in which the UE_A 10 determines and recognizes that the network-initiated UP connection establishment procedure is allowed in a case that the UE_A 10 re-establishes UP resources associated with a PDU session, or may be processing in which the UE_A 10 determines and recognizes that the UE-initiated service request procedure and the network-initiated service request procedure are not allowed.

Further, in the case of the present procedure, 1st processing and/or 11th processing may be processing for allowing each apparatus to transition to the 1st state, or may be processing in which each apparatus determines to transition to the 1st state. Further, in the case of the present procedure, each of the 21st processing and the 31st processing may be processing for allowing each apparatus to transition to the 36th state, or may be processing in which each apparatus determines to transition to the 36th state. Further, in the case of the present procedure, each of 51st processing and 61st processing may be processing for allowing each apparatus to transition to the 3rd state, or may be processing in which each apparatus determines to transition to the 3rd state.

Further, the UE_A 10 may transition to the 1st state, based on the 1st processing or the 11th processing. Further, the UE_A 10 may transition to the 36th state, based on reception of one or more pieces of identification information out of the 1st identification information to the 9th identification information, the 21st processing, or the 31st processing. Further, the UE_A 10 may transition to the 3rd state, based on the 51st processing or the 61st processing.

1.3.9. 7th Communication Procedure

Next, a 7th communication procedure according to the present embodiment will be described. The 7th communication procedure is hereinafter also referred to as the present procedure. The 7th communication procedure (present procedure) includes an initial procedure; a core network-initiated UP connection deactivation procedure; and a UE-initiated service request procedure, a network-initiated service request procedure, or a network-initiated UP connection establishment procedure, each of which will be described later.

Specifically, each apparatus transitions to the 41st state by performing the initial procedure. Next, each apparatus transitions to the 31st state by performing the core network-initiated UP connection deactivation procedure. Next, each apparatus transitions to the 3rd state by performing any one of the UE-initiated service request procedure, the network-initiated service request procedure, and the network-initiated UP connection establishment procedure. Through the above operation, the present procedure is completed.

Here, each apparatus may perform the core network-initiated UP connection deactivation procedure, based on transition to the 41st state. Further, each apparatus may perform any procedure of the UE-initiated service request procedure, the network-initiated service request procedure, and the network-initiated UP connection establishment procedure, based on transition to the 31st state.

Note that, regardless of the above conditions, each apparatus may perform the core network-initiated UP connection deactivation procedure at any timing, at least on the condition that the apparatus has transitioned to the 41st state. Further, regardless of the above conditions, each apparatus may perform any procedure of the UE-initiated service request procedure, the network-initiated service request procedure, and the network-initiated UP connection establishment procedure at any timing, at least on the condition that the apparatus has transitioned to the 31st state.

Note that, in the case of the present procedure, the 2nd identification information may be information indicating that the UE-initiated service request procedure can be performed. Further, in the case of the present procedure, the 3rd identification information may be information indicating that the UE-initiated service request procedure is allowed. Further, in the case of the present procedure, the 4th identification information may be information indicating that the network-initiated service request procedure can be performed. Further, in the case of the present procedure, the 5th identification information may be information indicating that the network-initiated service request procedure is allowed. Further, in the case of the present procedure, the 6th identification information may be information indicating that the network-initiated UP connection establishment procedure can be performed. Further, in the case of the present procedure, the 7th identification information may be information indicating that the network-initiated UP connection establishment procedure is allowed.

Further, in the case of the present procedure, 1st processing and/or 11th processing may be processing in which the UE_A 10 determines and recognizes that the UE-initiated service request procedure, the network-initiated service request procedure, and the network-initiated UP connection establishment procedure are allowed in a case that the UE_A 10 re-establishes UP resources associated with a PDU session.

Further, in the case of the present procedure, the 1st processing and/or the 11th processing may be processing for allowing each apparatus to transition to the 41st state, or may be processing in which each apparatus determines to transition to the 41st state. Further, in the case of the present procedure, the 1st processing and/or the 11th processing may be processing in which each apparatus determines to transition to the 31st state in a case that the apparatus performs 41st processing. In other words, in the case of the present procedure, the 1st processing and/or the 11th processing may be processing for determining transition to the 31st state, based on a release of UP resources associated with a PDU session. Further, in the case of the present procedure, the 41st processing may be processing for allowing each apparatus to transition to the 31st state, or may be processing in which each apparatus determines to transition to the 31st state. Further, in the case of the present procedure, each of 51st processing and 61st processing may be processing for allowing each apparatus to transition to the 3rd state, or may be processing in which each apparatus determines to transition to the 3rd state.

Further, the UE_A 10 may transition to the 41st state, based on reception of one or more pieces of identification information out of the 2nd identification information to the 7th identification information, the 1st processing, or the 11th processing. Further, the UE_A 10 may transition to the 31st state, based on the 41st processing. Further, the UE_A 10 may transition to the 3rd state, based on the 51st processing or the 61st processing.

1.3.10. 8th Communication Procedure

Next, an 8th communication procedure according to the present embodiment will be described. The 8th communication procedure is hereinafter also referred to as the present procedure. The 8th communication procedure (present procedure) includes an initial procedure; a core network-initiated UP connection deactivation procedure; and a UE-initiated service request procedure or a network-initiated service request procedure, each of which will be described later.

Specifically, each apparatus transitions to the 42nd state by performing the initial procedure. Next, each apparatus transitions to the 32nd state by performing the core network-initiated. UP connection deactivation procedure. Next, each apparatus transitions to the 3rd state by performing either the UE-initiated service request procedure or the network-initiated service request procedure. Through the above operation, the present procedure is completed.

Here, each apparatus may perform the core network-initiated UP connection deactivation procedure, based on transition to the 42nd state. Further, each apparatus may perform either procedure of the UE-initiated service request procedure or the network-initiated service request procedure, based on transition to the 32nd state.

Note that, regardless of the above conditions, each apparatus may perform the core network-initiated UP connection deactivation procedure at any timing, at least on the condition that the apparatus has transitioned to the 42nd state. Further, regardless of the above conditions, each apparatus may perform either procedure of the UE-initiated service request procedure or the network-initiated service request procedure at any timing, at least on the condition that the apparatus has transitioned to the 32nd state.

Note that, in the case of the present, procedure, the 2nd identification information may be information indicating that the UE-initiated service request procedure can be performed. Further, in the case of the present procedure, the 3rd identification information may be information indicating that the UE-initiated service request procedure is allowed. Further, in the case of the present procedure, the 4th identification information may be information indicating that the network-initiated service request procedure can be performed. Further, in the case of the present procedure, the 5th identification information may be information indicating that the network-initiated service request procedure is allowed. Further, in the case of the present procedure, the 6th identification information may be information indicating that the network-initiated UP connection establishment procedure cannot be performed. Further, in the case of the present procedure, the 7th identification information may be information indicating that the network-initiated UP connection establishment procedure is not allowed.

Further, in the case of the present procedure, 1st processing and/or 11th processing may be processing in which the UE_A 10 determines and recognizes that the UE-initiated service request procedure and the network-initiated service request procedure are allowed in a case that the UE_A 10 re-establishes UP resources associated with a PDU session, or may be processing in which the UE_A 10 determines and recognizes that the network-initiated UP connection establishment procedure is not allowed.

Further, in the case of the present procedure, the 1st processing and/or the 11th processing may be processing for allowing each apparatus to transition to the 42nd state, or may be processing in which each apparatus determines to transition to the 42nd state. Further, in the case of the present procedure, the 1st processing and/or the 11th processing may be processing in which each apparatus determines to transition to the 32nd state in a case that the apparatus performs 41st processing. In other words, in the case of the present procedure, the 1st processing and/or the 11th processing may be processing for determining transition to the 32nd state, based on a release of UP resources associated with a PDU session. Further, in the case of the present procedure, the 41st processing may be processing for allowing each apparatus to transition to the 32nd state, or may be processing in which each apparatus determines to transition to the 32nd state. Further, in the case of the present procedure, each of 51st processing and 61st processing may be processing for allowing each apparatus to transition to the 3rd state, or may be processing in which each apparatus determines to transition to the 3rd state.

Further, the UE_A 10 may transition to the 42nd state, based on reception of one or more pieces of identification information out of the 2nd identification information to the 7th identification information, the 1st processing, or the 11th processing. Further, the UE_A 10 may transition to the 32nd state, based on the 41st processing. Further, the UE_A 10 may transition to the 3rd state, based on the 51st processing or the 61st processing.

1.3.11. 9th Communication Procedure

Next, a 9th communication procedure according to the present embodiment will be described. The 9th communication procedure is hereinafter also referred to as the present procedure. The 9th communication procedure (present procedure) includes an initial procedure; a core network-initiated UP connection deactivation procedure; and a UE-initiated service request procedure or a network-initiated UP connection establishment procedure, each of which will be described later.

Specifically, each apparatus transitions to the 43rd state by performing the initial procedure. Next, each apparatus transitions to the 33rd state by performing the core network-initiated UP connection deactivation procedure. Next, each apparatus transitions to the 3rd state by performing either the UE-initiated service request procedure or the network-initiated UP connection establishment procedure. Through the above operation, the present procedure is completed.

Here, each apparatus may perform the core network-initiated UP connection deactivation procedure, based on transition to the 43rd state. Further, each apparatus may perform either procedure of the UE-initiated service request procedure or the network-initiated UP connection establishment procedure, based on transition to the 33rd state.

Note that, regardless of the above conditions, each apparatus may perform the core network-initiated UP connection deactivation procedure at any timing, at least on the condition that the apparatus has transitioned to the 43rd state. Further, regardless of the above conditions, each apparatus may perform either procedure of the UE-initiated service request procedure or the network-initiated UP connection establishment procedure at any timing, at least on the condition that the apparatus has transitioned to the 33rd state.

Note that, in the case of the present procedure, the 2nd identification information may be information indicating that the UE-initiated service request procedure can be performed. Further, in the case of the present procedure, the 3rd identification information may be information indicating that the UE-initiated service request procedure is allowed. Further, in the case of the present procedure, the 4th identification information may be information indicating that the network-initiated service request procedure cannot be performed. Further, in the case of the present procedure, the 5th identification information may be information indicating that the network-initiated service request procedure is not allowed. Further, in the case of the present procedure, the 6th identification information may be information indicating that the network-initiated UP connection establishment procedure can be performed. Further, in the case of the present procedure, the 7th identification information may be information indicating that the network-initiated UP connection establishment procedure is allowed.

Further, in the case of the present procedure, 1st processing and/or 11th processing may be processing in which the UE_A 10 determines and recognizes that the UE-initiated service request procedure and the network-initiated UP connection establishment procedure are allowed in a case that the UE_A 10 re-establishes UP resources associated with a PDU session, or may be processing in which the UE_A 10 determines and recognizes that the network-initiated service request procedure is not allowed.

Further, in the case of the present procedure, the 1st processing and/or the 11th processing may be processing for allowing each apparatus to transition to the 43rd state, or may be processing in which each apparatus determines to transition to the 43rd state. Further, in the case of the present procedure, the 1st processing and/or the 11th processing may be processing in which each apparatus determines to transition to the 33rd state in a case that the apparatus performs 41st processing. In other words, in the case of the present procedure, the 1st processing and/or the 11th processing may be processing for determining transition to the 33rd state, based on a release of UP resources associated with a PDU session. Further, in the case of the present procedure, the 41st processing may be processing for allowing each apparatus to transition to the 33rd state, or may be processing in which each apparatus determines to transition to the 33rd state. Further, in the case of the present procedure, each of 51st processing and 61st processing may be processing for allowing each apparatus to transition to the 3rd state, or may be processing in which each apparatus determines to transition to the 3rd state.

Further, the UE_A 10 may transition to the 43rd state, based on reception of one or more pieces of identification information out of the 2nd identification information to the 7th identification information, the 1st processing, or the 11th processing. Further, the UE_A 10 may transition to the 33rd state, based on the 41st processing. Further, the UE_A 10 may transition to the 3rd state, based on the 51st processing or the 61st processing.

1.3.12. 10th Communication Procedure

Next, a 10th communication procedure according to the present embodiment will be described. The 10th communication procedure is hereinafter also referred to as the present procedure. The 10th communication procedure (present procedure) includes an initial procedure; a core network-initiated UP connection deactivation procedure; and a network-initiated service request procedure or a network-initiated UP connection establishment procedure, each of which will be described later.

Specifically, each apparatus transitions to the 44th state by performing the initial procedure. Next, each apparatus transitions to the 34th state by performing the core network-initiated UP connection deactivation procedure. Next, each apparatus transitions to the 3rd state by performing either the network-initiated service request procedure or the network-initiated UP connection establishment procedure. Through the above operation, the present procedure is completed.

Here, each apparatus may perform the core network-initiated UP connection deactivation procedure, based on transition to the 44th state. Further, each apparatus may perform either procedure of the network-initiated service request procedure or the network-initiated UP connection establishment procedure, based on transition to the 34th state.

Note that, regardless of the above conditions, each apparatus may perform the core network-initiated UP connection deactivation procedure at any timing, at least on the condition that the apparatus has transitioned to the 44th state.

Further, regardless of the above conditions, each apparatus may perform either procedure of the network-initiated service request procedure or the network-initiated UP connection establishment procedure at any timing, at least on the condition that the apparatus has transitioned to the 34th state.

Note that, in the case of the present procedure, the 2nd identification information may be information indicating that the UE-initiated service request procedure cannot be performed. Further, in the case of the present procedure, the 3rd identification information may be information indicating that the UE-initiated service request procedure is not allowed. Further, in the case of the present procedure, the 4th identification information may be information indicating that the network-initiated service request procedure can be performed. Further, in the case of the present procedure, the 5th identification information may be information indicating that the network-initiated service request procedure is allowed. Further, in the case of the present procedure, the 6th identification information may be information indicating that the network-initiated UP connection establishment procedure can be performed. Further, in the case of the present procedure, the 7th identification information may be information indicating that the network-initiated UP connection establishment procedure is allowed.

Further, in the case of the present procedure, 1st processing and/or 11th processing may be processing in which the UE_A 10 determines and recognizes that the network-initiated service request procedure and the network-initiated UP connection establishment procedure are allowed in a case that the UE_A 10 re-establishes UP resources associated with a PDU session, or may be processing in which the UE_A 10 determines and recognizes that the UE-initiated service request procedure is not allowed.

Further, in the case of the present procedure, the 1st processing and/or the 11th processing may be processing for allowing each apparatus to transition to the 44th state, or may be processing in which each apparatus determines to transition to the 44th state. Further, in the case of the present procedure, the 1st processing and/or the 11th processing may be processing in which each apparatus determines to transition to the 34th state in a case that the apparatus performs 41st processing. In other words, in the case of the present procedure, the 1st processing and/or the 11th processing may be processing for determining transition to the 34th state, based on a release of UP resources associated with a PDU session. Further, in the case of the present procedure, the 41st processing may be processing for allowing each apparatus to transition to the 34th state, or may be processing in which each apparatus determines to transition to the 34th state. Further, in the case of the present procedure, each of 51st processing and 61st processing may be processing for allowing each apparatus to transition to the 3rd state, or may be processing in which each apparatus determines to transition to the 3rd state.

Further, the UE_A 10 may transition to the 44th state, based on reception of one or more pieces of identification information out of the 2nd identification information to the 7th identification information, the 1st processing, or the 11th processing. Further, the UE_A 10 may transition to the 34th state, based on the 41st processing. Further, the UE_A 10 may transition to the 3rd state, based on the 51st processing or the 61st processing.

1.3.13. 11th Communication Procedure

Next, an 11th communication procedure according to the present embodiment will be described. The 11th communication procedure is hereinafter also referred to as the present procedure. The 11th communication procedure (present procedure) includes an initial procedure, a core network-initiated UP connection deactivation procedure, and a network-initiated service request procedure, each of which will be described later.

Specifically, each apparatus transitions to the 45th state by performing the initial procedure. Next, each apparatus transitions to the 35th state by performing the core network-initiated UP connection deactivation procedure. Next, each apparatus transitions to the 3rd state by performing the network-initiated service request procedure. Through the above operation, the present procedure is completed.

Here, each apparatus may perform the core network-initiated UP connection deactivation procedure, based on transition to the 45th state. Further, each apparatus may perform the network-initiated service request procedure, based on transition to the 35th state.

Note that, regardless of the above conditions, each apparatus may perform the core network-initiated. UP connection deactivation procedure at any timing, at least on the condition that the apparatus has transitioned to the 45th state. Further, regardless of the above conditions, each apparatus may perform the network-initiated service request procedure at any timing, at least on the condition that the apparatus has transitioned to the 35th state.

Note that, in the case of the present procedure, the 2nd identification information may be information indicating that the UE-initiated service request procedure cannot be performed. Further, in the case of the present procedure, the 3rd identification information may be information indicating that the UE-initiated service request procedure is not allowed. Further, in the case of the present procedure, the 4th identification information may be information indicating that the network-initiated service request procedure can be performed. Further, in the case of the present procedure, the 5th identification information may be information indicating that the network-initiated service request procedure is allowed. Further, in the case of the present procedure, the 6th identification information may be information indicating that the network-initiated UP connection establishment procedure cannot be performed. Further, in the case of the present procedure, the 7th identification information may be information indicating that the network-initiated UP connection establishment procedure is not allowed.

Further, in the present procedure, 1st processing and/or 11th processing may be processing in which the UE_A 10 determines and recognizes that the network-initiated service request procedure is allowed in a case that the UE_A 10 re-establishes UP resources associated with a PDU session, or may be processing in which that the UE_A 10 determines and recognizes that the UE-initiated service request procedure and the network-initiated UP connection establishment procedure are not allowed.

Further, in the case of the present procedure, the 1st processing and/or the 11th processing may be processing for allowing each apparatus to transition to the 45th state, or may be processing in which each apparatus determines to transition to the 45th state. Further, in the case of the present procedure, the 1st processing and/or the 11th processing may be processing in which each apparatus determines to transition to the 35th state in a case that the apparatus performs 41st processing. In other words, in the case of the present procedure, the 1st processing and/or the 11th processing may be processing for determining transition to the 35th state, based on a release of UP resources associated with a PDU session. Further, in the case of the present procedure, the 41st processing may be processing for allowing each apparatus to transition to the 35th state, or may be processing in which each apparatus determines to transition to the 35th state. Further, in the case of the present procedure, each of 51st processing and 61st processing may be processing for allowing each apparatus to transition to the 3rd state, or may be processing in which each apparatus determines to transition to the 3rd state.

Further, the UE_A 10 may transition to the 45th state, based on reception of one or more pieces of identification information out of the 2nd identification information to the 7th identification information, the 1st processing, or the 11th processing. Further, the UE_A 10 may transition to the 35th state, based on the 41st processing. Further, the UE_A 10 may transition to the 3rd state, based on the 51st processing or the 61st processing.

1.3.14. 12th Communication Procedure

Next, a 12th communication procedure according to the present embodiment will be described. The 12th communication procedure is hereinafter also referred to as the present procedure. The 12th communication procedure (present procedure) includes an initial procedure, a core network-initiated UP connection deactivation procedure, and a network-initiated UP connection establishment procedure, each of which will be described later.

Specifically, each apparatus transitions to the 46th state by performing the initial procedure. Next, each apparatus transitions to the 36th state by performing the core network-initiated UP connection deactivation procedure. Next, each apparatus transitions to the 3rd state by performing the network-initiated UP connection establishment procedure. Through the above operation, the present procedure is completed.

Here, each apparatus may perform the core network-initiated UP connection deactivation procedure, based on transition to the 46th state. Further, each apparatus may perform the network-initiated UP connection establishment procedure, based on transition to the 36th state.

Note that, regardless of the above conditions, each apparatus may perform the core network-initiated UP connection deactivation procedure at any timing, at least on the condition that the apparatus has transitioned to the 46th state. Further, regardless of the above conditions, each apparatus may perform the network-initiated UP connection establishment procedure at any timing, at least on the condition that the apparatus has transitioned to the 36th state.

Note that, in the case of the present procedure, the 2nd identification information may be information indicating that the UE-initiated service request procedure cannot be performed. Further, in the case of the present procedure, the 3rd identification information may be information indicating that the UE-initiated service request procedure is not allowed. Further, in the case of the present procedure, the 4th identification information may be information indicating that the network-initiated service request procedure cannot be performed. Further, in the case of the present procedure, the 5th identification information may be information indicating that the network-initiated service request procedure is not allowed. Further, in the case of the present procedure, the 6th identification information may be information indicating that the network-initiated UP connection establishment procedure can be performed. Further, in the case of the present procedure, the 7th identification information may be information indicating that the network-initiated UP connection establishment procedure is allowed.

Further, in the case of the present procedure, 1st processing and/or 11th processing may be processing in which the UE_A 10 determines and recognizes that the network-initiated UP connection establishment procedure is allowed in a case that the UE_A 10 re-establishes UP resources associated with a PDU session, or may be processing in which the UE_A 10 determines and recognizes that the UE-initiated service request procedure and the network-initiated service request procedure are not allowed.

Further, in the case of the present procedure, the 1st processing and/or the 11th processing may be processing for allowing each apparatus to transition to the 46th state, or may be processing in which each apparatus determines to transition to the 46th state. Further, in the case of the present procedure, the 1st processing and/or the 11th processing may be processing in which each apparatus determines to transition to the 36th state in a case that the apparatus performs 41st processing. In other words, in the case of the present procedure, the 1st processing and/or the 11th processing may be processing for determining transition to the 36th state, based on a release of UP resources associated with a PDU session. Further, in the case of the present procedure, the 41st processing may be processing for allowing each apparatus to transition to the 36th state, or may be processing in which each apparatus determines to transition to the 36th state. Further, in the case of the present procedure, each of 51st processing and 61st processing may be processing for allowing each apparatus to transition to the 3rd state, or may be processing in which each apparatus determines to transition to the 3rd state.

Further, the UE_A 10 may transition to the 46th state, based on reception of one or more pieces of identification information out of the 2nd identification information to the 7th identification information, the 1st processing, or the 11th processing. Further, the UE_A 10 may transition to the 36th state, based on the 41st processing. Further, the UE_A 10 may transition to the 3rd state, based on the 51st processing or the 61st processing.

1.4. Description of Each Procedure for Implementing Communication Procedures

Next, each procedure for implementing the communication procedures according to the present embodiment will be described. Note that each procedure for implementing the communication procedures according to the present embodiment includes an initial procedure, a registration procedure, a PDU session establishment procedure, a PDU session release procedure, a PDU session modification procedure, a core network-initiated UP connection deactivation procedure, a UE-initiated service request procedure, a network-initiated service request procedure, and a network-initiated UP connection establishment procedure. Each of the procedures will be described below.

1.4.1. Initial Procedure

Figure 8:
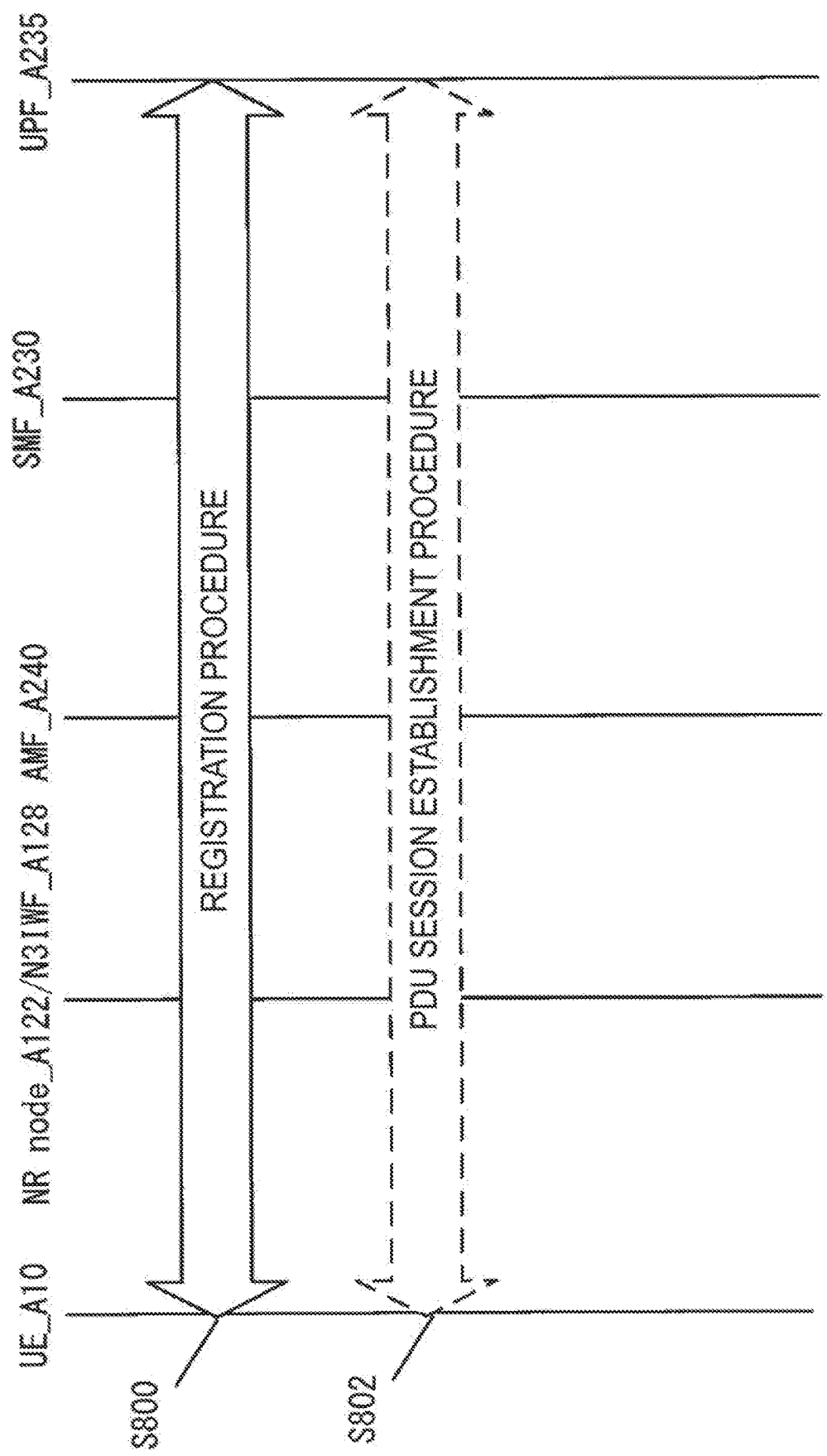
FIG. 8 is a diagram illustrating an initial procedure.

Next, the initial procedure according to the present embodiment will be described with reference to FIG. 8. The initial procedure is hereinafter also referred to as the present procedure. The initial procedure (present procedure) includes a registration procedure and/or a PDU session establishment procedure, each of which will be described later.

Specifically, by performing the registration procedure by each apparatus (S800), the UE_A 10 transitions to a state registered with the network (RM-REGISTERED state). Next, by performing the PDU session establishment procedure by each apparatus (S802), the UE_A 10 establishes the PDU session with the DN_A 5 that provides the PDU connection service via the core network_B 190 and transitions to a state in which the PDU session is established between the apparatuses. Note that, although this PDU session is assumed to be established via the access network and the UPF_A 235, but is not limited thereto. That is, a UPF (UPF_C 239) different from the UPF_A 235 may be present between the UPF_A 235 and the access network. At this time, the PDU session is established via the access network, the UPF_C 239, and the UPF_A 235. Through the above operation, the present procedure is completed.

Note that each apparatus may exchange various pieces of capability information and/or various pieces of request information of each apparatus in the registration procedure and/or the PDU session establishment procedure. Note that, in a case that each apparatus performs the exchange of various pieces of information and/or negotiation of various requests in the registration procedure, each apparatus need not perform the exchange of various pieces of information and/or the negotiation of various requests in the PDU session establishment procedure. In a case that each apparatus does not perform the exchange of various pieces of information and/or the negotiation of various requests in the registration procedure, each apparatus may perform the exchange of various pieces of information and/or the negotiation of various requests in the PDU session establishment procedure. Even in a case that each apparatus performs the exchange of various pieces of information and/or the negotiation of various requests in the registration procedure, each apparatus may perform the exchange of various pieces of information and/or the negotiation of various requests in the PDU session establishment procedure.

Each apparatus may perform the PDU session establishment procedure during the registration procedure, or may perform the PDU session establishment procedure after completion of the registration procedure. In a case that the PDU session establishment procedure is performed in the registration procedure, a PDU Session Establishment Request message may be included in a Registration Request message to be transmitted and/or received, the PDU Session Establishment Accept message may be included in a Registration Accept message to be transmitted and/or received, the PDU session establishment complete message may be included in a registration complete message to be transmitted and/or received, and a PDU Session Establishment Reject message may be included in a Registration Reject message to be transmitted and/or received. In a case that the PDU session establishment procedure is performed during the registration procedure, each apparatus may establish the PDU session, based on completion of the registration procedure, or may transition to a state in which the PDU session is established between the apparatuses.

1.4.2. Overview of Registration Procedure

First, an overview of a Registration procedure will be described. The registration procedure is hereinafter also referred to as the present procedure. The registration procedure is a procedure initiated by the UE_A 10 so as to allow registration with a network (the access network, and/or the core network_B 190, and/or the DN (the DN_A 5)). In a state in which the UE_A 10 is not registered with the network, the UE_A 10 can perform the present procedure at any timing such as a power supply being turned on. In other words, the UE_A 10 may initiate the present procedure at any timing, on the condition that the UE_A 10 is in the deregistered state (RM-DEREGISTERED state). Each apparatus may transition to the registered state (RM-REGISTERED state), based on completion of the registration procedure.

Moreover, the present procedure may be a procedure to update location registration information of the UE_A 10 in the network, and/or to notify the network of the state of the UE_A 10 periodically by the UE_A 10, and/or to update specific parameters related to the UE_A 10 in the network.

The UE_A 10 may initiate the present procedure in a case that the UE_A 10 performs mobility across TAs. In other words, the UE_A 10 may initiate the present procedure in a case that the UE_A 10 moves to a TA different from a TA indicated in the held TA list. Further, the UE_A 10 may initiate the present procedure, based on expiration of a started timer. Furthermore, the UE_A 10 may initiate the present procedure in a case that a context of each apparatus needs to be updated due to a disconnection or deactivation (also referred to as disabling) of the PDU session. Furthermore, the UE_A 10 may initiate the present procedure in a case that a change occurs in capability information and/or preference concerning PDU session establishment of the UE_A 10. Furthermore, the UE_A 10 may initiate the present procedure periodically. Note that, in addition to the cases described above, the UE_A 10 can perform the present procedure at any timing, on the condition that a PDU session has been established.

1.4.2.1. Example of Registration Procedure

Figure 9:
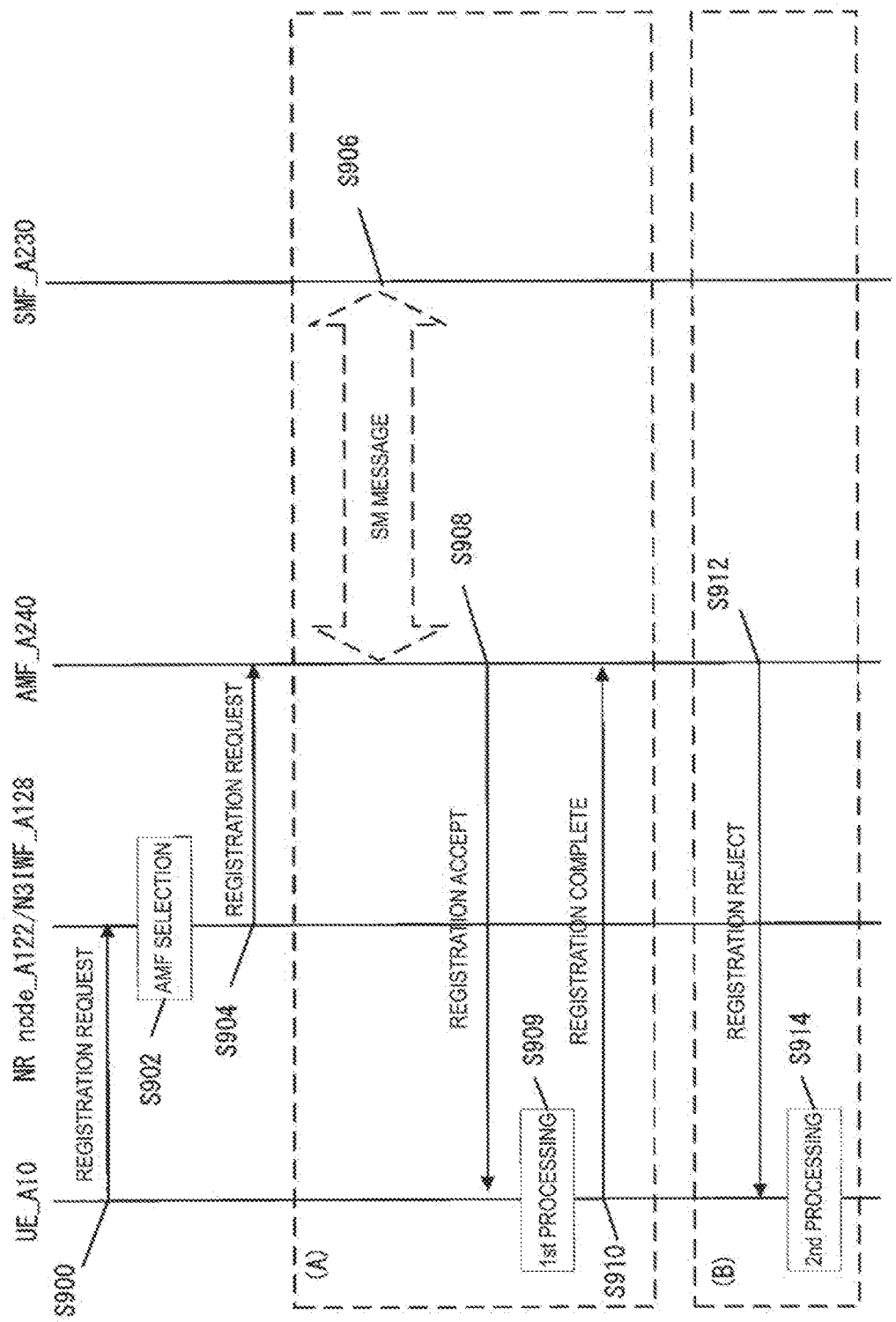
FIG. 9 is a diagram illustrating a registration procedure.

With reference to FIG. 9, an example of a process for performing a registration procedure will be described. In this section, the present procedure refers to the registration procedure. Each step of the present procedure will be described below.

First, the UE_A 10 transmits a Registration Request message to the AMF_A 240 via the NR node (also referred to as a gNB)_A 122 (S900), (S902), and (S904), and thereby initiates the registration procedure. The UE_A 10 may transmit the Registration Request message including a Session Management (SM) message (for example, a PDU Session Establishment Request message), or may transmit the Registration Request message including an SM message (for example, a PDU Session Establishment Request message) together with a Registration Request message, and may thereby initiate a procedure for the SM such as the PDU session establishment procedure during the registration procedure.

Specifically, the UE_A 10 transmits a Radio Resource Control (RRC) message including the Registration Request message to the NR node_A 122 (S900). In a case that the NR node_A 122 receives the RRC message including the Registration Request message, the NR node_A 122 extracts the Registration Request message from the RRC message, and selects the AMF_A 240 as an NF or a common CP function of a routing destination of the Registration Request message (S902). Here, the NR node_A 122 may select the AMF_A 240, based on information included in the RRC message. The NR node_A 122 transmits or forwards the Registration Request message to the selected AMF_A 240 (S904).

Note that the Registration Request message is a Non-Access-Stratum (NAS) message transmitted and/or received on the N1 interface. The RRC message is a control message transmitted and/or received between the UE_A 10 and the NR node_A 122. The NAS message is processed in a NAS layer, the RRC message is processed in an RRC layer, and the NAS layer is a layer higher than the RRC layer.

Additionally, in a case that there are multiple NSIs requesting the registration are present, the UE_A 10 may transmit the Registration Request message for each NSI, or may transmit multiple Registration Request messages included in one or more RRC messages. The multiple Registration Request messages described above may be included in one or more RRC messages to be transmitted as one Registration Request message.

Here, the UE_A 10 may include the 41st identification information and/or the 42nd identification information in the Registration Request message and/or the RRC message. Note that two or more pieces of identification information out of these pieces of identification information may be configured as one or more pieces of identification information.

Further, the UE_A 10 may transmit the Registration Request message and/or the RRC message including the 41st identification information and/or the 42nd identification information, to indicate that the UE_A 10 supports establishment of the second PDU session or so that the UE_A 10 requests that establishment of the second PDU session be allowed.

Further, the UE_A 10 may transmit the 41st identification information and the 42nd identification information in combination, to indicate or request at least one of the matters indicated by the 41st identification information and the 42nd identification information. Note that the matters indicated by transmission of each of the pieces of identification information from the UE_A 10 may not be limited to those matters described above.

Note that the UE_A 10 may determine which piece of identification information out of the 41st identification information and the 42nd identification information is to be included in the Registration Request message, based on capability information of the UE_A 10, and/or a policy such as a UE policy, and/or a preference of the UE_A 10, and/or an application (higher layer). Note that the determination performed by the UE_A 10 as to which piece of identification information is to be included in the Registration Request message is not limited to the determination described above.

The UE_A 10 may include these pieces of identification information in a control message different from the Registration Request message (for example, the NAS message or the RRC message) to transmit the identification information.

In a case that the AMF_A 240 receives a control message different from the Registration Request message and/or the Registration Request message, the AMF_A 240 performs a 1st condition determination. The 1st condition determination is a condition determination for determining whether or not the AMF_A 240 accepts the request of the UE_A 10. In the 1st condition determination, the AMF_A 240 determines whether the 1st condition determination is true or false. In a case that the 1st condition determination is true (in other words, in a case that the network accepts the request of the UE_A 10), the AMF_A 240 initiates the procedure of (A) in the present procedure. In a case that the 1st condition determination is false (in other words, in a case that the network does not accept the request of the UE_A 10), the AMF_A 240 initiates the procedure of (B) in the present procedure.

In the following, steps performed in a case that the 1st condition determination is true, i.e., steps of the procedure of (A) in the present procedure, will be described. The AMF_A 240 performs a 4th condition determination, and initiates the procedure of (A) in the present procedure. The 4th condition determination is a condition determination for determining whether or not the AMF_A 240 transmits and/or receives the SM message to and/or from the SMF_A 230. In other words, the 4th condition determination may be a condition determination for determining whether or not the AMF_A 240 performs the PDU session establishment procedure during the present procedure. In a case that the 4th condition determination is true (in other words, in a case that the AMF_A 240 transmits and/or receives the SM message to and/or from the SMF_A 230), the AMF_A 240 selects the SMF_A 230 and transmits and/or receives the SM message to and/or from the selected SMF_A 230. In a case that the 4th condition determination is false (in other words, in a case that the AMF_A 240 does not transmit and/or receive the SM message to and/or from the SMF_A 230), the AMF_A 240 omits those operations (S906). Note that, in a case that the AMF_A 240 receives an SM message indicating rejection from the SMF_A 230, the AMF_A 240 may halt the procedure of (A) in the present procedure, and may initiate the procedure of (B) in the present procedure.

Further, the AMF_A 240 transmits a Registration Accept message to the UE_A 10 via the NR node_A 122, based on reception of the Registration Request message from the UE_A 10 and/or completion of transmission and/or reception of the SM message to and/or from the SMF_A 230 (S908). For example, in the case that the 4th condition determination is true, the AMF_A 240 may transmit a Registration Accept message, based on reception of the Registration Request message from the UE_A 10. In the case that the 4th condition determination is false, the AMF_A 240 may transmit a Registration Accept message, based on completion of transmission and/or reception of the SM message to and/or from the SMF_A 230. Here, the Registration Accept message may be transmitted as a response message to the Registration Request message. The Registration Accept message is a NAS message transmitted and/or received on the N1 interface. For example, the AMF_A 240 may transmit the Registration Accept message as an N2 interface control message to the NR node_A 122, and the NR node_A 122 that has received the Registration Accept message may transmit the RRC message including the received Registration Accept message to the UE_A 10.

Further, in a case that the 4th condition determination is true, the AMF_A 240 may include the SM message (for example, the PDU Session Establishment Accept message) in the Registration Accept message and transmit the message, or may transmit the SM message (for example, the PDU Session Establishment Accept message), together with the Registration Accept message. The transmission method may be performed in a case that the SM message (for example, the PDU Session Establishment Request message) is included in the Registration Request message and the 4th condition determination is true. The transmission method may be performed in a case that the SM message (for example, the PDU Session Establishment Request message) is included together with the Registration Request message and the 4th condition determination is true. The AMF_A 240 may perform such a transmission method to indicate that the procedure for the SM has been accepted.

Here, the AMF_A 240 may include one or more pieces of identification information out of the 2nd identification information to the 7th identification information, the 51st identification information, and the 52nd identification information in the Registration Accept message, or may indicate that the request of the UE_A 10 has been accepted by including these pieces of identification information. Note that two or more pieces of identification information out of these pieces of identification information may be configured as one or more pieces of identification information.

Further, the AMF_240 may transmit the Registration Accept message including one or more pieces of identification information out of the 2nd identification information to the 7th identification information, to indicate that establishment of a PDU session that can continue to be maintained even after a release of UP resources associated with the PDU session and/or a context of UP resources associated with the PDU session is allowed and/or possible. Further, the AMF_240 may transmit the Registration Accept message including one or more pieces of identification information out of the 2nd identification information to the 7th identification information, to indicate a type of a procedure that can be used to establish UP resources after a release of the UP resources associated with a PDU session, or may indicate a state of a transition destination of the UE_A 10 and/or the apparatus in the core network.

More specifically, the AMF_240 may transmit the Registration Accept message including the 1st identification information and/or the 2nd identification information and/or the 3rd identification information, to indicate whether or not the UE-initiated service request procedure can be used to establish UP resources after a release of the UP resources associated with a PDU session. Further, the AMF_240 may transmit the Registration Accept message including the 1st identification information and/or the 4th identification information and/or the 5th identification information, to indicate whether or not the network-initiated service request procedure can be used to establish UP resources after a release of the UP resources associated with a PDU session. Further, the AMF_240 may transmit the Registration Accept message including the 1st identification information and/or the 6th identification information and/or the 7th identification information, to indicate whether or not the network-initiated UP connection establishment procedure can be used to establish UP resources after a release of the UP resources associated with a PDU session.

Further, the AMF_A 240 may transmit the Registration Accept message including the 51st identification information and/or the 52nd identification information, to indicate that the apparatus in the core network supports establishment of the second PDU session or indicate that the apparatus in the core network allows establishment of the second PDU session.

Further, the AMF_A 240 may transmit two or more pieces of identification information out of the 2nd identification information to the 7th identification information, the 51st identification information, and the 52nd identification information in combination, to indicate or request at least one of the matters indicated by the 2nd identification information to the 7th identification information, the 51st identification information, and the 52nd identification information. Note that the matters indicated by transmission of each of the pieces of identification information from the AMF_A 240 may not be limited to those matters described above.

Note that the AMF_A 240 may determine whether or not which piece of identification information out of the 2nd identification information to the 7th identification information, the 51st identification information, and the 52nd identification information is to be included in the Registration Accept message, based on received identification information, and/or capability information of the network, and/or an operator policy, and/or a state of the network, and/or registration information of a user (user subscription), and/or the like.

For example, the 51st identification information and/or the 52nd identification information may be identification information transmitted in a case that the 41st identification information and/or the 42nd identification information is received through the Registration Request message. Further, each piece of the 2nd identification information to the 7th identification information may be identification information transmitted in a case that the 41st identification information and/or the 42nd identification information is received, or may be information transmitted in a case that establishment of UP resources associated with a PDU session is allowed and/or possible. Note that the determination performed by the AMF_A 240 as to which piece of identification information is to be included in the Registration Accept message is not limited to the determination described above.

The UE_A 10 receives the Registration Accept message via the NR node_A 122 (S908). The UE_A 10 receives the Registration Accept message to recognize contents of various pieces of identification information included in the Registration Accept message.

The UE_A 10 further performs 1st processing, based on reception of the Registration Accept message (S909). Note that the UE_A 10 may perform the 1st processing, based on transmission of the registration complete message, or may perform the 1st processing, based on completion of the present procedure.

Here, the 1st processing may be processing in which the UE_A 10 recognizes matters indicated by the AMF_A 240. Further, the 1st processing may be processing in which the UE_A 10 stores received identification information as a context, or may be processing in which the UE_A 10 forwards received identification information to a higher layer and/or a lower layer. Further, the 1st processing may be processing in which the UE_A 10 receives a notification from a higher layer and/or a lower layer, or may be processing in which the UE_A 10 recognizes such a received notification. Further, the 1st processing may be processing in which the UE_A 10 recognizes that the present procedure has been completed, based on the received notification. Further, the 1st processing may be processing in which the UE_A 10 recognizes that the request of the present procedure has been accepted.

Further, in a case that the UE_A 10 receives one or more pieces of identification information out of the 2nd identification information to the 7th identification information, the 1st processing may be processing in which the UE_A 10 determines and recognizes that establishment of a PDU session that can continue to be maintained even after a release of UP resources associated with the PDU session and/or a context of UP resources associated with the PDU session is allowed and/or possible, based on the received identification information.

Further, the 1st processing may be processing in which the UE_A 10 determines to initiate the PDU session establishment procedure for establishing the above-described PDU session, or may be processing in which the UE_A 10 initiates the PDU session establishment procedure. Further, in a case that the UE_A 10 receives one or more pieces of identification information out of the 2nd identification information to the 7th identification information, the 1st processing may be processing in which the UE_A 10 determines and recognizes which procedure is to be performed to re-establish UP resources after a release of the UP resources associated with a PDU session, based on the received identification information.

For example, in a case that the UE_A 10 receives the 2nd identification information and/or the 3rd identification information, the 1st processing may be processing in which the UE_A 10 determines and recognizes whether or not the UE-initiated service request procedure is allowed to be performed to re-establish UP resources associated with a PDU session, based on the 2nd identification information and/or the 3rd identification information. Further, in a case that the UE_A 10 receives the 4th identification information and/or the 5th identification information, the 1st processing may be processing in which the UE_A 10 determines and recognizes whether or not the network-initiated service request procedure is allowed to be performed to re-establish UP resources associated with a PDU session, based on the 4th identification information and/or the 5th identification information. Further, in a case that the UE_A 10 receives the 6th identification information and/or the 7th identification information, the 1st processing may be processing in which the UE_A 10 determines and recognizes whether or not the network-initiated UP connection establishment procedure is allowed to be performed to re-establish UP resources associated with a PDU session, based on the 6th identification information and/or the 7th identification information.

Further, in a case that the UE_A 10 receives the 51st identification information and/or the 52nd identification information, the 1st processing may be processing in which the UE_A 10 recognizes that the network supports establishment of the second PDU session, or may be processing in which the UE_A 10 recognizes that the network allows establishment of the second PDU session, based on the received identification information. Further, the 1st processing may be processing in which the UE_A 10 recognizes that establishment of a PDU session having the above functionality is supported, or may be processing in which the UE_A 10 recognizes that such a PDU session can be established after completion of the present procedure.

Further, the 1st processing may be processing in which the UE_A 10 selects and recognizes a transition target state out of the 1st state and the 41st to 46th states, based on received identification information, or may be processing in which the UE_A 10 transitions to the selected state. Here, the UE_A 10 may transition to the selected state after a PDU session is established through the PDU session establishment procedure. Note that the 1st processing may not be limited to the processing described above.

Next, the UE_A 10 transmits a Registration Complete message to the AMF_A 240, based on reception of the Registration Accept message and/or completion of the 1st processing (S910). Note that, in a case that the UE_A 10 receives an SM message such as the PDU Session Establishment Accept message, the UE_A 10 may transmit the registration complete message including the SM message such as the PDU session establishment complete message, or may indicate that a procedure for the SM is to complete by including the SM message. Here, the registration complete message may be transmitted as a response message to the Registration Accept message. The registration complete message is a NAS message transmitted and/or received on the N1 interface. For example, the UE_A 10 may transmit the RRC message including the NAS message to the NR node_A 122, and the NR node_A 122 that has received the RRC message may transmit the RRC message as an N2 interface control message to the AMF_A 240.

The AMF_A 240 receives the registration complete message (S910). Each apparatus completes the procedure of (A) in the present procedure, based on transmission and/or reception of the Registration Accept message and/or the registration complete message.

Next, steps performed in a case that the 1st condition determination is false, i.e., steps of the procedure of (B) in the present procedure, will be described. The AMF_A 240 transmits a Registration Reject message to the UE_A 10 via the NR node_A 122 (S912), and thereby initiates the procedure of (B) in the present procedure. Here, the Registration Reject message may be transmitted as a response message to the Registration Request message. The Registration Reject message is a NAS message transmitted and/or received on the N1 interface. For example, the AMF_A 240 may transmit the Registration Reject message as an N2 interface control message to the NR node_A 122, and the NR node_A 122 that has received the Registration Reject message may transmit the RRC message including the received Registration Reject message to the UE_A 10. The Registration Reject message transmitted by the AMF_A 240 is not limited to the Registration Reject message described above, and only needs to be a message for rejecting the request of the UE_A 10.

Note that the procedure of (B) in the present procedure may be initiated in a case that the procedure of (A) in the present procedure is halted. In a case that the 4th condition determination is true in the procedure of (A), the AMF_A 240 may transmit the Registration Reject message including an SM message signifying rejection, such as the PDU Session Establishment. Reject message, or may indicate that a procedure for the SM has been rejected by including the SM message signifying rejection. In that case, the UE_A 10 may further receive the SM message signifying rejection, such as the PDU Session Establishment Reject message, or may recognize that the procedure for the SM has been rejected.

Here, the AMF_A 240 may include one or more pieces of identification information out of the one or multiple pieces of identification information in the Registration Reject message, or may indicate that the request of the UE_A 10 has been rejected by including these pieces of identification information. Note that two or more pieces of identification information out of these pieces of identification information may be configured as one or more pieces of identification information.

Further, the AMF_A 240 may transmit two or more pieces of identification information out of the one or multiple pieces of identification information in combination, so as to indicate or request at least one of the matters indicated by the one or multiple pieces of identification information. Note that the matters indicated by transmission of each of the pieces of identification information from the AMF_A 240 may not be limited to those matters described above. Here, the AMF_A 240 may determine which piece of identification information is to be included in the Registration Reject message, based on received identification information, and/or capability information of the network, and/or a policy such as an operator policy, and/or a state of the network. Note that the determination performed by the AMF_A 240 as to which piece of identification information is to be included in the Registration Reject message is not limited to the determination described above.

The UE_A 10 receives the Registration Reject message. The UE_A 10 performs 2nd processing, based on reception of the Registration Reject message (S914). The UE_A 10 may perform the 2nd processing, based on completion of the present procedure.

Here, the 2nd processing may be processing in which the UE_A 10 recognizes matters indicated by the AMF_A 240. Further, the 2nd processing may be processing in which the UE_A 10 stores received identification information as a context, or may be processing in which the UE_A 10 forwards received identification information to a higher layer and/or a lower layer. Further, the 2nd processing may be processing in which the UE_A 10 receives a notification from a higher layer and/or a lower layer, or may be processing in which the UE_A 10 recognizes such a received notification. Further, the 2nd processing may be processing in which the UE_A 10 recognizes that the present procedure has been completed, based on the received notification. Further, the 2nd processing may be processing in which the UE_A 10 recognizes that the request of the present procedure has been rejected, or may be processing in which the UE_A 10 recognizes a cause why the request of the present procedure has been rejected. Note that the 2nd processing may not be limited to the processing described above.

Further, the UE_A 10 may recognize that the request of the UE_A 10 has been rejected, based on the fact of receiving the Registration Reject message, or based on that fact of not receiving the Registration Accept message. Each apparatus completes the procedure of (B) in the present procedure, based on transmission and/or reception of the Registration Reject message.

Each apparatus completes the present procedure (registration procedure), based on completion of the procedure of (A) or (B) in the present procedure. Note that each apparatus may transition to a state in which the UE_A 10 is registered with the network (RM_REGISTERED state), based on completion of the procedure of (A) in the present procedure, or may maintain a state in which the UE_A 10 is not registered with the network (RM_DEREGISTERED state), based on completion of the procedure of (B) in the present procedure. Transition to each state of each apparatus may be performed based on completion of the present procedure, or may be performed based on an establishment of a PDU session.

Further, each apparatus may perform processing that is based on the identification information transmitted and/or received in the present procedure, based on completion of the present procedure. In other words, the UE_A 10 may perform the 1st processing, or may perform the 2nd processing, based on completion of the present procedure.

The 1st condition determination may be performed based on identification information included in the Registration Request message, and/or subscription information, and/or an operator policy. For example, the 1st condition determination may be true in a case that the network allows the request of the UE_A 10. The 1st condition determination may be false in a case that the network does not allow the request of the UE_A 10. Further, the 1st condition determination may be true in a case that a registration destination network of the UE_A 10 and/or an apparatus in a network supports a function requested by the UE_A 10; otherwise, the 1st condition determination may be false. Further, the 1st condition determination may be true in a case that it is determined that the network is in a congested state, and may be false in a case that it is determined that the network is not in a congested state. Note that conditions for determining true or false of the 1st condition determination need not be limited to the conditions described above.

The 4th condition determination may be performed based on whether or not the AMF_A 240 has received the SM, or may be performed based on whether or not the Registration Request message includes the SM message. For example, the 4th condition determination may be true in a case that the AMF_A 240 receives the SM message and/or in a case that the Registration Request message includes the SM message, and may be false in a case that the AMF_A 240 does not receive the SM and/or in a case that the Registration Request message does not include the SM message. Note that conditions for determining true or false of the 4th condition determination need not be limited to the conditions described above.

1.4.2.2. Modifications of Example of Registration Procedure

The above section "Example of Registration Procedure" has described an example of the registration procedure performed via 3GPP access, but the registration procedure according to the present embodiment may be a procedure performed via non-3GPP access. In this case, the NR node_A 122 in Example of Registration Procedure may be the N3IWF_A 128. Further, the RRC message transmitted and/or received between the UE_A 10 and the NR node_A 122 may be an IKEv2 message transmitted and/or received between the UE_A 10 and the N3IWF_A 128. Further, the identification information and/or the message included in the RRC message to be transmitted and/or received may be included in the IKEv2 message to be transmitted and/or received. Specifically, the transmission and/or reception NAS message included in the RRC message may be included in the IKEv2 message to be transmitted and/or received. More specifically, the Registration Request message, the Registration Accept message, the registration complete message, and the Registration Reject message may be transmitted and/or received via the N3IWF_A 128, or may be included in the IKEv2 message to be transmitted and/or received. Further, the processing performed by the NR node_A 122 may be performed by the N3IWF_A 128. For example, the AMF_240 performed by the NR node_A 122 may be performed by the NR node_A 122.

1.4.3. Overview of PDU Session Establishment Procedure

Next, an overview of a PDU session establishment procedure performed for establishing a PDU session with the DN_A 5 will be described. The PDU session establishment procedure is hereinafter also referred to as the present procedure. The present procedure is a procedure for allowing each apparatus to establish a PDU session. Note that each apparatus may perform the present procedure in a state in which the registration procedure has been completed, or may perform the present procedure during the registration procedure. Each apparatus may initiate the present procedure in the registered state, or may initiate the present procedure at any timing after the registration procedure. Each apparatus may establish a PDU session, based on completion of the PDU session establishment procedure. Furthermore, each apparatus may perform the present procedure multiple times to establish multiple PDU sessions.

1.4.3.1. Example of PDU Session Establishment Procedure

Figure 10:
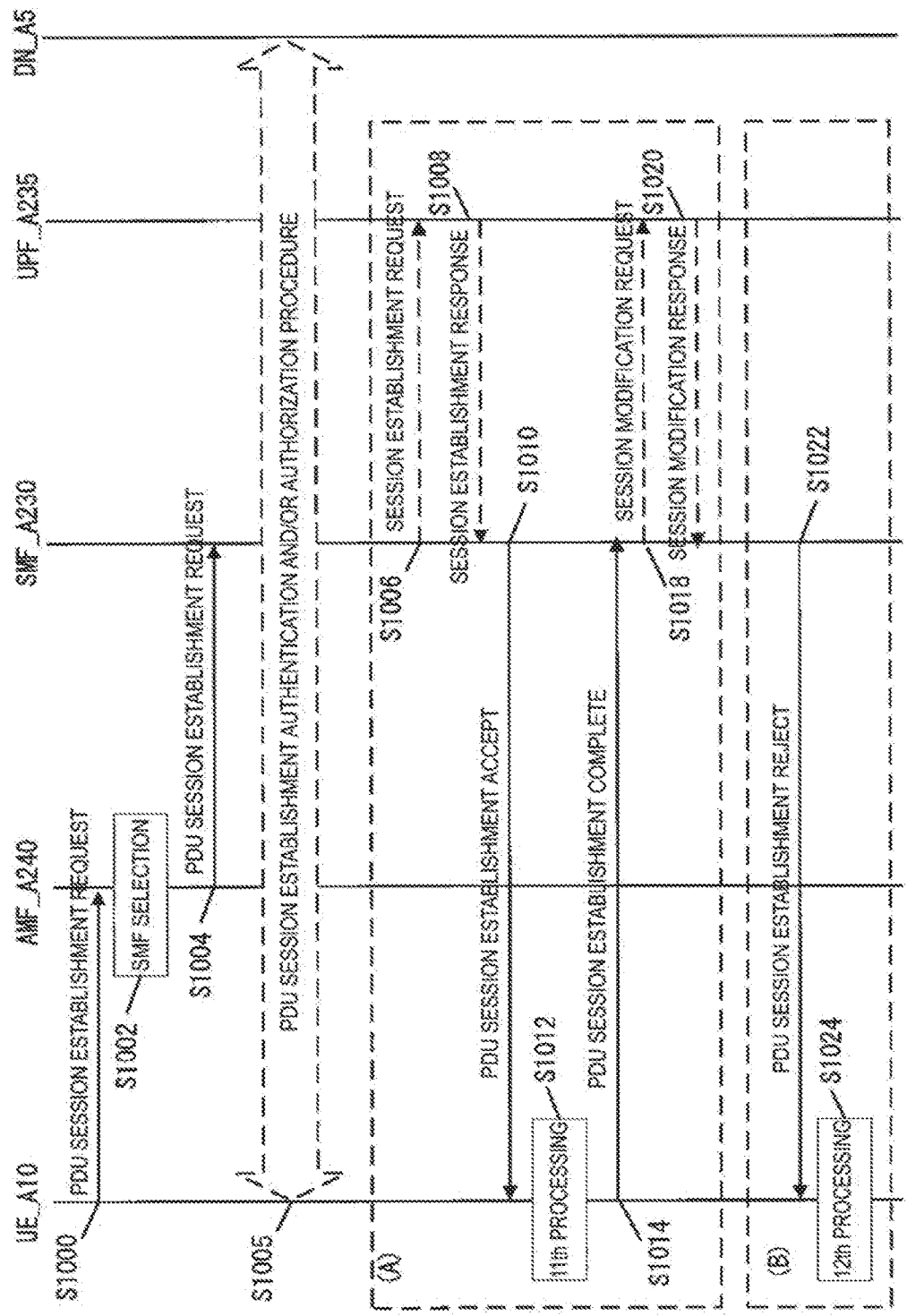
FIG. 10 is a diagram illustrating a PDU session establishment procedure.

With reference to FIG. 10, an example of a process for performing a PDU session establishment procedure will be described. Each step of the present procedure will be described below. First, the UE_A 10 initiates the PDU session establishment procedure by transmitting a PDU Session Establishment Request message to the SMF_A 230 via the NR node_A 122 or the N3IWF_A 128, and the AMF_A 240 (S1000) (S1002) (S1004).

Specifically, the UE_A 10 transmits the PDU Session Establishment Request message to the AMF_A 240 via the NR node_A 122 or the N3IWF_A 128 by using the N1 interface (S1000). In a case that the AMF_A 240 receives the PDU Session Establishment Request message, the AMF_A 240 selects the SMF_A 230 as an NF of a routing destination of the PDU Session Establishment Request message (S1002), and transmits or forwards the PDU Session Establishment Request message to the selected SMF_A 230 by using the N11 interface (S1004). Here, the AMF_A 240 may select the SMF_A 230 as the routing destination, based on information included in the PDU Session Establishment Request message. More specifically, the AMF_A 240 may select the SMF_A 230 as the routing destination, based on each piece of identification information acquired based on reception of the PDU Session Establishment Request message, and/or subscription information, and/or capability information of the network, and/or an operator policy, and/or a state of the network, and/or a context already held by the AMF_A 240.

Note that the PDU Session Establishment Request message may be a NAS message. The PDU Session Establishment Request message is not limited to the PDU Session Establishment Request message described above, and only needs to be a message for requesting establishment of a PDU session.

Here, the UE_A 10 may include the 41st identification information and/or the 42nd identification information in the PDU Session Establishment Request message, or may indicate the request of the UE_A 10 by including these pieces of identification information. Note that two or more pieces of identification information out of these pieces of identification information may be configured as one or more pieces of identification information.

Further, the UE_A 10 may transmit the PDU Session Establishment Request message including the 41st identification information and/or the 42nd identification information, so as to indicate that the UE_A 10 supports establishment of the second PDU session, or to request establishment of the second PDU session. Further, the UE_A 10 may transmit the PDU Session Establishment Request message including the 41st identification information and/or the 42nd identification information, so as to indicate that a requested type of a PDU session to be established is the second PDU session.

Further, the UE_A 10 may transmit the 41st identification information and the 42nd identification information in combination, so as to indicate or request at least one of the matters indicated by the 41st identification information and the 42nd identification information. Note that the matters indicated by transmission of each of the pieces of identification information from the UE_A 10 may not be limited to those matters described above.

Note that the UE_A 10 may determine which piece of identification information out of the 41st identification information and the 42nd identification information is to be included in the PDU Session Establishment Request message, based on capability information of the UE_A 10, and/or a policy such as a UE policy, and/or a preference of the UE_A 10, and/or an application (higher layer), and/or received identification information in the registration procedure. Note that the determination performed by the UE_A 10 as to which piece of identification information is to be included in the PDU Session Establishment Request message is not limited to the determination described above.

In a case that the SMF_A 230 receives the PDU Session Establishment Request message, the SMF_A 230 performs a 3rd condition determination. The 3rd condition determination is a condition determination for determining whether or not the SMF_A 230 accepts the request of the UE_A 10. In the 3rd condition determination, the SMF_A 230 determines whether the 3rd condition determination is true or false. The SMF_A 230 initiates the procedure of (A) in the present procedure in a case that the 3rd condition determination is true, and initiates the procedure of (B) in the present procedure in a case that the 3rd condition determination is false. Note that steps performed in a case that the 3rd condition determination is false will be described later.

In the following, steps performed in a case that the 3rd condition determination is true, i.e., steps of the procedure of (A) in the present procedure, will be described. The SMF_A 230 selects the UPF_A 235 with which a PDU session is to be established, and performs an 11th condition determination.

Here, the 11th condition determination is a condition determination for determining whether or not each apparatus performs a PDU session establishment authentication and/or authorization procedure. In the 11th condition determination, the SMF_A 230 determines whether the 11th condition determination is true or false. In a case that the 11th condition determination is true, the SMF_A 230 initiates the PDU session establishment authentication and/or authorization procedure (S1005). In a case that the 11th condition determination is false, the SMF_A 230 omits the PDU session establishment authentication and/or authorization procedure. Note that the details of the PDU session establishment authentication and/or authorization procedure will be described later.

Next, the SMF_A 230 transmits a Session Establishment request message to the selected UPF_A 235, based on the 11th condition determination and/or completion of the PDU session establishment authentication and/or authorization procedure (S1006), and initiates the procedure of (A) in the present procedure. Note that, based on completion of the PDU session establishment authentication and/or authorization procedure, the SMF_A 230 may initiate the procedure of (B) in the present procedure, instead of initiating the procedure of (A) in the present procedure.

Here, the SMF_A 230 may select one or more UPFs_A 235, based on each piece of identification information acquired based on reception of the PDU Session Establishment Request message, and/or capability information of the network, and/or subscription information, and/or an operator policy, and/or a state of the network, and/or a context already held by the SMF_A 230. Note that, in a case that multiple UPFs_A 235 are selected, the SMF_A 230 may transmit the session establishment request message to each UPF_A 235.

The UPF_A 235 receives the session establishment request message and creates a context for a PDU session. Further, the UPF_A 235 transmits a Session Establishment response message to the SMF_A 230, based on reception of the session establishment request message and/or creation of the context for a PDU session (S1008). Furthermore, the SMF_A 230 receives a session establishment response message. Note that each of the session establishment request message and the session establishment response message may be a control message transmitted and/or received on the N4 interface. Further, the session establishment response message may be a response message to the session establishment request message.

Further, the SMF_A 230 may allocate an address to be allocated to the UE_A 10, based on reception of the PDU Session Establishment Request message and/or selection of the UPF_A 235 and/or reception of the session establishment response message. Note that the SMF_A 230 may allocate the address to be allocated to the UE_A 10 during the PDU session establishment procedure, or may allocate the address after completion of the PDU session establishment procedure.

Specifically, in a case that the SMF_A 230 allocates the IPv4 address without using the DHCPv4, the SMF_A 230 may allocate the address during the PDU session establishment procedure or may transmit the allocated address to the UE_A 10. In addition, in a case that the SMF_A 230 allocates the IPv4 address, and/or the IPv6 address, and/or the IPv6 prefix using the DHCPv4 or the DHCPv6 or Stateless Address Auto-configuration (SLAAC), the SMF_A 230 may allocate the address after the PDU session establishment procedure or may transmit the allocated address to the UE_A 10. Note that the address allocation performed by SMF_A 230 is not limited to these.

Further, based on completion of the address allocation of the address allocated to the UE_A 10, the SMF_A 230 may transmit the PDU Session Establishment Accept message including the allocated address to the UE_A 10, or may transmit the allocated address to the UE_A 10 after completion of the PDU session establishment procedure.

The SMF_A 230 transmits a PDU Session Establishment Accept message to the UE_A 10 via the AMF_A 240, based on reception of the PDU Session Establishment Request message, and/or selection of the UPF_A 235, and/or reception of the session establishment response message, and/or completion of the address allocation of the address allocated to the UE_A 10 (S1010).

Specifically, the SMF_A 230 transmits the PDU Session Establishment Accept message to the AMF_A 240 by using the N11 interface, and the AMF_A 240 that has received the PDU Session Establishment Accept message transmits the PDU Session Establishment Accept message to the UE_A 10 by using the N1 interface.

Note that, in a case that the PDU session is PDN connection, the PDU Session Establishment Accept message may be a PDN connectivity accept message. Further, the PDU Session Establishment Accept message may be a NAS message transmitted and/or received on the N11 interface and the N1 interface. The PDU Session Establishment Accept message is not limited to the PDU Session Establishment Accept message described above, and only needs to be a message indicating that PDU session establishment has been accepted.

Here, the SMF_A 230 may include one or more pieces of identification information out of the 2nd identification information to the 7th identification information, the 51st identification information, and the 52nd identification information in the PDU Session Establishment Accept message, or may indicate that the request of the UE_A 10 has been accepted by including these pieces of identification information. Note that two or more pieces of identification information out of these pieces of identification information may be configured as one or more pieces of identification information.

Further, the SMF_A 230 may transmit the PDU Session Establishment Accept message including one or more pieces of identification information out of the 2nd identification information to the 7th identification information, so as to indicate that establishment of a PDU session that can continue to be maintained even after a release of UP resources associated with the PDU session and/or a context of UP resources associated with the PDU session is allowed and/or possible. Further, the SMF_A 230 may transmit the PDU Session Establishment Accept message including one or more pieces of identification information out of the 2nd identification information to the 7th identification information, so as to indicate that a PDU session that can continue to be maintained even after a release of UP resources associated with the PDU session and/or a context of UP resources associated with the PDU session is to be established, or may indicate that such a PDU session to be established is the PDU session. Further, the SMF_A 230 may transmit the PDU Session Establishment Accept message including one or more pieces of identification information out of the 2nd identification information to the 7th identification information, so as to indicate a type of a procedure that can be used to establish UP resources after a release of the UP resources associated with a PDU session, or may indicate a state of a transition destination of the UE_A 10 and/or the apparatus in the core network.

More specifically, the SMF_A 230 may transmit the PDU Session Establishment Accept message including the 1st identification information and/or the 2nd identification information and/or the 3rd identification information, so as to indicate whether or not the UE-initiated service request procedure can be used to establish UP resources after a release of the UP resources associated with a PDU session. Further, the SMF_A 230 may transmit the PDU Session Establishment Accept message including the 1st identification information and/or the 4th identification information and/or the 5th identification information, so as to indicate whether or not the network-initiated service request procedure can be used to establish UP resources after a release of the UP resources associated with a PDU session. Further, the SMF_A 230 may transmit the PDU Session Establishment Accept message including the 1st identification information and/or the 6th identification information and/or the 7th identification information, so as to indicate whether or not the network-initiated UP connection establishment procedure can be used to establish UP resources after a release of the UP resources associated with a PDU session.

Further, the SMF_A 230 may transmit the PDU Session Establishment Accept message including the 51st identification information and/or the 52nd identification information, so as to indicate that the apparatus in the core network supports establishment of the second PDU session or indicate that the apparatus in the core network allows establishment of the second PDU session. Further, the SMF_A 230 may transmit the PDU Session Establishment Accept message including the 51st identification information and/or the 52nd identification information, so as to indicate that the second PDU session is to be established, or may indicate that a type of a PDU session to be established is the second PDU session.

Further, the SMF_A 230 may transmit two or more pieces of identification information out of the 2nd identification information to the 7th identification information, the 51st identification information, and the 52nd identification information in combination, so as to indicate or request at least one of the matters indicated by the 2nd identification information to the 7th identification information, the 51st identification information, and the 52nd identification information. Note that the matters indicated by transmission of each of the pieces of identification information from the SMF_A 230 may not be limited to those matters described above.

Note that the SMF_A 230 may determine which piece of identification information out of the 2nd identification information to the 7th identification information, the 51st identification information, and the 52nd identification information is to be included in the PDU Session Establishment Accept message, based on received identification information, and/or capability information of the network, and/or a policy such as an operator policy, and/or a state of the network, and/or identification information transmitted and/or received in the registration procedure.

For example, the 51st identification information anchor the 52nd identification information may be identification information transmitted in a case that the 41st identification information and/or the 42nd identification information is received through the Registration Request message. Further, each piece of the 2nd identification information to the 7th identification information may be identification information transmitted in a case that the 41st identification information and/or the 42nd identification information is received, or may be information transmitted in a case that establishment of UP resources associated with a PDU session is allowed and/or possible. Note that the determination performed by the SMF_A 230 as to which piece of identification information is to be included in the PDU Session Establishment Accept message is not limited to the determination described above.

The UE_A 10 receives the PDU Session Establishment Accept message. The UE_A 10 receives the PDU Session Establishment Accept message to recognize contents of various pieces of identification information included in the PDU Session Establishment Accept message.

The UE_A 10 further performs 11th processing, based on reception of the PDU Session Establishment Accept message (S1012). Note that the UE_A 10 may perform the 11th processing, based on transmission of the PDU session establishment complete message, or perform the 11th processing, based on completion of the present procedure.

Here, the 11th processing may be processing in which the UE_A 10 recognizes matters indicated by the SMF_A 230. Further, the 11th processing may be processing in which the UE_A 10 stores received identification information as a context, or may be processing in which the UE_A 10 forwards received identification information to a higher layer and/or a lower layer. Further, the 11th processing may be processing in which the UE_A 10 receives a notification from a higher layer and/or a lower layer, or may be processing in which the UE_A 10 recognizes such a received notification. Further, the 11th processing may be processing in which the UE_A 10 recognizes that the present procedure has been completed, based on the received notification. Further, the 11th processing may be processing in which the UE_A 10 recognizes that the request of the present procedure has been accepted. Further, the 11th processing may be processing in which the UE_A 10 establishes a PDU session, or may be processing in which the UE_A 10 determines and recognizes a type of a PDU session to be established.

Further, in a case that one or more pieces of identification information out of the 2nd identification information to the 7th identification information are received, the 11th processing may be processing in which the UE_A 10 establishes a PDU session that can continue to be maintained even after a release of UP resources associated with the PDU session and/or a context of UP resources associated with the PDU session, based on the received identification information.

Further, in a case that one or more pieces of identification information out of the 2nd identification information to the 7th identification information are received, the 11th processing may be processing in which the UE_A 10 determines and recognizes that a PDU session to be established is the above-described PDU session, based on the received identification information.

Further, in a case that the UE_A 10 receives one or more pieces of identification information out of the 2nd identification information to the 7th identification information, the 11th processing may be processing in which the UE_A 10 determines and recognizes which procedure is to be performed to re-establish UP resources after a release of the UP resources associated with a PDU session to be established, based on the received identification information.

For example, in a case that the UE_A 10 receives the 2nd identification information and/or the 3rd identification information, the 11th processing may be processing in which the UE_A 10 determines and recognizes whether or not the UE-initiated service request procedure is allowed to be performed to re-establish UP resources associated with a PDU session to be established, based on the 2nd identification information and/or the 3rd identification information. Further, in a case that the UE_A 10 receives the 4th identification information and/or the 5th identification information, the 11th processing may be processing in which the UE_A 10 determines and recognizes whether or not the network-initiated service request procedure is allowed to be performed to re-establish UP resources associated with a PDU session to be established, based on the 4th identification information and/or the 5th identification information. Further, in a case that the UE_A 10 receives the 6th identification information and/or the 7th identification information, the 11th processing may be processing in which the UE_A 10 determines and recognizes whether or not the network-initiated UP connection establishment procedure is allowed to be performed to re-establish UP resources associated with a PDU session to be established, based on the 6th identification information and/or the 7th identification information.

Further, in a case that the UE_A 10 receives the 51st identification information and/or the 52nd identification information, the 11th processing may be processing in which the UE_A 10 recognizes that the network supports establishment of the second PDU session, or may be processing in which the UE_A 10 recognizes that the network allows establishment of the second PDU session, based on the received identification information. Further, in a case that the UE_A 10 receives the 51st identification information and/or the 52nd identification information, the 11th processing may be processing in which the UE_A 10 recognizes that the second PDU session is to be established, or may be processing in which the UE_A 10 recognizes that such a PDU session to be established is the second PDU session, based on the received identification information. Further, the 11th processing may be processing in which the UE_A 10 recognizes that a PDU session having the above functionality is to be established.

Further, the 11th processing may be processing in which the UE_A 10 selects and recognizes a transition target state out of the 1st state and the 41st to 46th states, based on received identification information, and transitions to the selected state. Note that the 11th processing may not be limited to the processing described above.

Next, the UE_A 10 transmits a PDU Session Establishment Complete message to the SMF_A 230 via the AMF_A 240, based on reception of the PDU Session Establishment Accept message and/or completion of the 11th processing (S1014). Further, the SMF_A 230 receives the PDU session establishment complete message, and performs a 2nd condition determination.

Specifically, the UE_A 10 transmits the PDU session establishment complete message to the AMF_A 240 by using the N1 interface, and the AMF_A 240 that has received the PDU session establishment complete message transmits the PDU session establishment complete message to the SMF_A 230 by using the N11 interface.

Note that, in a case that the PDU session is PDN connection, the PDU session establishment complete message may be a PDN Connectivity complete message, or may be an Activate default EPS bearer context accept message. Further, the PDU session establishment complete message may be a NAS message transmitted and/or received on the N1 interface and the N11 interface. The PDU session establishment complete message only needs to be a response message to the PDU Session Establishment Accept message. The PDU session establishment complete message, however, is not limited to this, and only needs to be a message indicating that the PDU session establishment procedure is to complete.

The 2nd condition determination is a condition determination for the SMF_A 230 to determine a type of a message on the N4 interface to be transmitted and/or received. In a case that the 2nd condition determination is true, the SMF_A 230 transmits a Session Modification request message to the UPF_A 235 (S1018). In addition, the SMF_A 230 receives a Session Modification response message transmitted from the UPF_A 235 that has received the Session Modification request message (S1020). In a case that the 2nd condition determination is false, the SMF_A 230 transmits a session establishment request message to the UPF_A 235 (S1018), and further receives the session modification accept message transmitted from the UPF_A 235 that has received the session establishment request message (S1020).

Each apparatus completes the procedure of (A) in the present procedure, based on transmission and/or reception of the PDU Session Establishment Accept message, and/or transmission and/or reception of the PDU session establishment complete message, and/or transmission and/or reception of the session modification response message, and/or transmission and/or reception of the session establishment response message, and/or transmission and/or reception of the RA.

Next, steps performed in a case that the 3rd condition determination is false, i.e., steps of the procedure of (B) in the present procedure, will be described. The SMF_A 230 transmits a PDU Session Establishment Reject message to the UE_A 10 via the AMF_A 240 (S1022), and thereby initiates the procedure of (B) in the present procedure.

Specifically, the SMF_A 230 transmits the PDU Session Establishment Reject message to the AMF_A 240 by using the N11 interface, and the AMF_A 240 that has received the PDU Session Establishment Request message transmits the PDU Session Establishment Reject message to the UE_A 10 by using the N1 interface.

Note that, in a case that the PDU session is PDN connection, the PDU Session Establishment Reject message may be a PDN Connectivity reject message. Further, the PDU Session Establishment Reject message may be a NAS message transmitted and/or received on the N11 interface and the N1 interface. The PDU Session Establishment Reject message is not limited to the PDU Session Establishment Reject message described above, and only needs to be a message indicating that establishment of a PDU session has been rejected.

Here, the SMF_A 230 may include one or more pieces of identification information out of the one or multiple pieces of identification information in the PDU Session Establishment Reject message, or may indicate that the request of the UE_A 10 has been rejected by including these pieces of identification information. Note that two or more pieces of identification information out of these pieces of identification information may be configured as one or more pieces of identification information.

Further, the SMF_A 230 may transmit two or more pieces of identification information out of the one or multiple pieces of identification information in combination, so as to indicate or request at least one of the matters indicated by the one or multiple pieces of identification information. Note that the matters indicated by transmission of each of the pieces of identification information from the SMF_A 230 may not be limited to those matters described above. Here, the SMF_A 230 may determine which piece of identification information is to be included in the PDU Session Establishment Reject message, based on received identification information, and/or capability information of the network, and/or a policy such as an operator policy, and/or a state of the network. Note that the determination performed by the SMF_A 230 as to which piece of identification information is to be included in the PDU Session Establishment Reject message is not limited to the determination described above.

The UE_A 10 receives the PDU Session Establishment Reject message. The UE_A 10 performs 12th processing, based on reception of the PDU Session Establishment Reject message (S1024). The UE_A 10 may perform the 12th processing, based on completion of the present procedure.

Here, the 12th processing may be processing in which the UE_A 10 recognizes matters indicated by the SMF_A 230. Further, the 12th processing may be processing in which the UE_A 10 stores received identification information as a context, or may be processing in which the UE_A 10 forwards received identification information to a higher layer and/or a lower layer. Further, the 12th processing may be processing in which the UE_A 10 receives a notification from a higher layer and/or a lower layer, or may be processing in which the UE_A 10 recognizes such a received notification. Further, the 12th processing may be processing in which the UE_A 10 recognizes that the present procedure has been completed, based on the received notification. Further, the 12th processing may be processing in which the UE_A 10 recognizes that the request of the present procedure has been rejected, or may be processing in which the UE_A 10 recognizes a cause why the request of the present procedure has been rejected. Note that the 12th processing may not be limited to the processing described above.

Further, the UE_A 10 may recognize that the request of the UE_A 10 has been rejected, based on the fact of receiving the PDU Session Establishment Reject message, or based on that fact of not receiving the PDU Session Establishment Accept message. Each apparatus completes the procedure of (B) in the present procedure, based on transmission and/or reception of the PDU Session Establishment Reject message.

Each apparatus completes the present procedure, based on completion of the procedure of (A) or (B) in the present procedure. Note that each apparatus may establish a PDU session, or transition to a state in which the PDU session is established, based on completion of the procedure of (A) in the present procedure. Each apparatus may recognize that the present procedure has been rejected, or may transition to a state in which the PDU session is not established, based on completion of the procedure of (B) in the present procedure.

Further, each apparatus may perform processing that is based on the identification information transmitted and/or received in the present procedure, based on completion of the present procedure. In other words, the UE_A 10 may perform the 11th processing or may perform the 12th processing, based on completion of the present procedure.

The 3rd condition determination may be performed based on identification information included in the PDU Session Establishment Request message, and/or subscription information, and/or an operator policy. For example, the 3rd condition determination may be true in a case that the network allows the request of the UE_A 10. The 3rd condition determination may be false in a case that the network does not allow the request of the UE_A 10. Further, the 3rd condition determination may be true in a case that a connection destination network of the UE_A 10 and/or an apparatus in a network supports a function requested by the UE_A 10; otherwise, the 3rd condition determination may be false. Further, the 3rd condition determination may be true in a case that it is determined that the network is in a congested state, and may be false in a case that it is determined that the network is not in a congested state. Note that conditions for determining true or false of the 3rd condition determination need not be limited to the conditions described above.

The 2nd condition determination may be performed based on whether the session on the N4 interface for the PDU session has been established. For example, in a case that the session on the N4 interface for the PDU session has been established, the 2nd condition determination may be true, and in a case that the session on the N4 interface for the PDU session is not established, the 2nd condition determination may be false. Note that conditions for determining true or false of the 2nd condition determination need not be limited to the conditions described above.

The 11th condition determination may be performed based on identification information included in the PDU Session Establishment Request message, and/or subscription information, and/or an operator policy. For example, the 11th condition determination may be true in a case that the network allows authentication and/or authorization of the DN_A 5 during the present procedure. The 11th condition determination may be false in a case that the network does not allow authentication and/or authorization of the DN_A 5 during the present procedure. Further, the 11th condition determination may be true in a case that a network as a connection destination of the UE_A 10 and/or an apparatus in a network supports authentication and/or authorization of the DN_A 5 during the present procedure; otherwise, the 11th condition determination may be false. Further, the 11th condition determination may be true in a case that the 61st identification information is received; otherwise, the 11th condition determination may be false. In other words, the 11th condition determination may be true in a case that information such as an SM PDU DN Request Container and/or a container including multiple pieces of information is received; otherwise, the 11th condition determination may be false. Note that conditions for determining true or false of the 11th condition determination need not be limited to the conditions described above.

1.4.4. Overview of PDU Session Release Procedure

Next, an overview of a PDU session release procedure for releasing a PDU session will be described. The PDU session release procedure is hereinafter also referred to as the present procedure. The present procedure is a procedure for allowing each apparatus to release a PDU session. Here, "releasing a PDU session" may be releasing UP resources associated with a PDU session. Note that each apparatus may perform the present procedure in a state in which a PDU session has been established, or may initiate the present procedure at any timing after the PDU session establishment procedure.

Further, the present procedure may be a procedure initiated by the UE_A 10, or may be a procedure initiated by the apparatus in the core network such as the SMF_A 230. For example, the UE_A 10 may initiate the present procedure, based on mobility of the UE_A 10, and/or a change in the state of the UE_A 10, and/or a request from the application of the UE_A 10, and/or the policy of the UE_A 10. Further, the apparatus in the core network such as the SMF_A 230 may initiate the present procedure, based on reception of a request message from the UE_A 10, may initiate the present procedure, based on network configuration and/or an operator policy, or may initiate the present procedure, based on a trigger other than reception of a request message from the UE_A 10.

Note that the trigger other than reception of a request message from the UE_A 10 may be detection of mobility of the UE_A 10, may be detection of a change in the state of the UE_A 10 and/or the access network and/or the core network, or may be a change in the state of the network slice. Further, the trigger other than reception of a request message from the UE_A 10 may be reception of a request from the application server of the DN_A 5, may be a change in the network configuration, or may be a change in the operator policy. Further, the trigger other than reception of a request message from the UE_A 10 may be expiration of a started timer. Note that the trigger that causes the UE_A 10 and/or the apparatus in the core network to initiate the present procedure is not limited to those triggers described above.

Based on completion of the present procedure, each apparatus may release a PDU session, or may release a context of a PDU session. Further, based on completion of the present procedure, each apparatus may release UP resources associated with a PDU session, or may release a context of UP resources associated with a PDU session. Further, in a case that multiple PDU sessions are established, each apparatus may perform the present procedure for each of the PDU sessions.

1.4.4.1. Example of PDU Session Release Procedure

Figure 11:
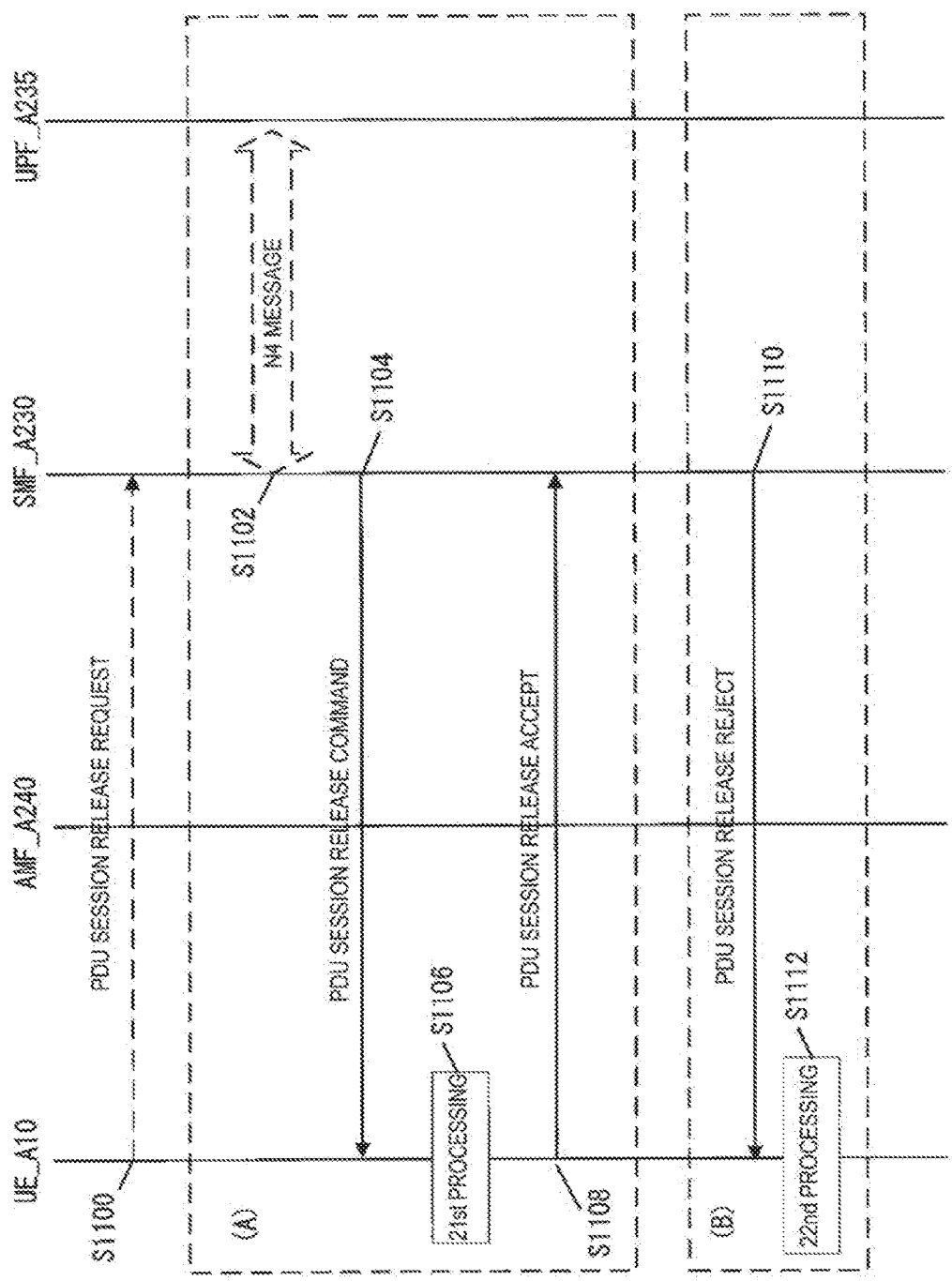
FIG. 11 is a diagram illustrating a PDU session release procedure.

With reference to FIG. 11, an example of a process for performing a PDU session release procedure will be described. Each step of the present procedure will be described below. In a case that the present procedure is a procedure initiated by the UE_A 10, first, the UE_A 10 transmits a PDU Session Release Request message to the SMF_A 230 via the NR node_A 122 and the AMF_A 240 (S1100), and thereby initiates the PDU session release procedure.

Specifically, the UE_A 10 transmits the PDU session release request message to the AMF_A 240 via the NR node_A 122 by using the N1 interface. In a case that the AMF_A 240 receives the PDU session release request message, the AMF_A 240 selects the SMF_A 230 as an NF of a routing destination of the PDU session release request message, and transmits or forwards the PDU session release request message to the selected SMF_A 230 by using the N11 interface. Here, the AMF_A 240 may select the SMF_A 230 as the routing destination, based on information included in the PDU session release request message.

Note that the PDU session release request message may be a NAS message. The PDU session release request message is not limited to the PDU session release request message described above, and only needs to be a message for requesting establishment of a PDU session.

Further, in a case that the present procedure is a procedure initiated by the apparatus in the core network such as the SMF_A 230, each apparatus may transmit and/or receive an N4 message instead of transmitting and/or receiving the PDU session release request message (S1102), and may thereby initiate the PDU session release procedure.

Here, the UE_A 10 may include one or multiple pieces of identification information in the PDU session release request message, or may indicate the request of the UE_A 10 by including these pieces of identification information. Further, the UE_A 10 may include one or multiple PDU session IDs in the PDU session release request message, or may indicate that target PDU session(s) is one or multiple PDU sessions identified by PDU session ID(s) by including these PDU session IDs. Note that two or more pieces of identification information out of these pieces of identification information may be configured as one or more pieces of identification information. Further, the matters indicated by transmission of each of the pieces of identification information from the UE_A 10 may not be limited to those matters described above.

Further, the UE_A 10 may determine which piece of identification information out of the one or multiple pieces of identification information is to be included in the PDU session release request message, based on capability information of the UE_A 10, and/or a policy such as a UE policy, and/or a preference of the UE_A 10, and/or an application (higher layer). Note that the determination performed by the UE_A 10 as to which piece of identification information is to be included in the PDU session release request message is not limited to the determination described above.

The SMF_A 230 receives the PDU session release request message, and performs a 21st condition determination. The 21st condition determination is a condition determination for determining whether or not the SMF_A 230 accepts the request of the UE_A 10. In the 21st condition determination, the SMF_A 230 determines whether the 21st condition determination is true or false. The SMF_A 230 initiates the procedure of (A) in the present procedure in a case that the 21st condition determination is true, and initiates the procedure of (B) in the present procedure in a case that the 21st condition determination is false. Note that steps performed in a case that the 21st condition determination is false will be described later.

In the following, steps performed in a case that the 21st condition determination is true, i.e., steps of the procedure of (A) in the present procedure, will be described. The SMF_A 230 selects the UPF_A 235 with which the PDU session to be released is established, transmits and/or receives an N4 message to and/or from the selected UPF_A 235 (S1102), and thereby initiates the procedure of (A) in the present procedure. Note that the N4 message may be a control message transmitted and/or received on the N4 interface, may be an N4 session release request message, or may be an N4 session release response message.

Here, the SMF_A 230 may include one or multiple PDU session IDs in the N4 message, or may indicate that target PDU session(s) is one or multiple PDU sessions identified by PDU session ID(s) by including these PDU session IDs. Further, the SMF_A 230 may indicate a release of UP resources associated with a PDU session while maintaining the PDU session by transmitting the N4 message. Further, the UPF_A 235 may release UP resources associated with a PDU session while maintaining the PDU session, based on reception of the N4 message.

Next, the SMF_A 230 transmits a PDU Session Release Command message to the UE_A 10 via the AMF_A 240, based on reception of the PDU session release request message and/or transmission and/or reception of the N4 message (S1104).

Specifically, the SMF_A 230 transmits the PDU session release command message to the AMF_A 240 by using the N11 interface, and the AMF_A 240 that has received the PDU session release command message transmits the PDU session release command message to the UE_A 10 by using the N1 interface.

Further, in a case of being forwarded on the N1 interface, the PDU session release command message may be forwarded via the NR node_A 122. Further, in a case of being forwarded between the NR node_A 122 and the UE_A 10, the PDU session release command message may be included in the RRC message to be forwarded. Note that the RRC message may be an RRC connection reconfiguration message.

Further, in a case of being forwarded between the AMF_240 and the NR node_A 122, the PDU session release command message may be included in an N2 message to be forwarded. Note that the AMF_240 may transmit the N2 message including information for identifying a PDU session and/or information indicating that the AMF_240 releases radio bearers used to transmit and/or receive user data, together with the PDU session release command message. Further, the AMF_240 may transmit the N2 message including these pieces of information, so as to notify the access network that the AMF_240 releases all the radio bearers, including the default DRBs, that are used to transmit and/or receive user data associated with the PDU session.

Alternatively, the AMF_240 may transmit the N2 message including information for identifying a PDU session and/or information indicating that the AMF_240 maintains radio bearers used to transmit and/or receive user data, together with the PDU session release command message. Further, the AMF_240 may transmit the N2 message including these pieces of information, so as to notify the access network that the AMF_240 maintains the radio bearers, such as the default DRBs, that are used to transmit and/or receive user data associated with the PDU session.

Note that the PDU session release command message may be a NAS message transmitted and/or received on the N11 interface or the N1 interface. The PDU session release command message is not limited to the PDU session release command message described above, and only needs to be a message indicating that the PDU session release request message has been accepted.

Here, the SMF_A 230 may include one or more pieces of identification information out of the 1st identification information to the 9th identification information in the PDU session release command message. Further, by including these pieces of identification information, the SMF_A 230 may indicate that the request of the UE_A 10 has been accepted, or may indicate the request of the apparatus in the core network. Further, the SMF_A 230 may include one or multiple PDU session IDs in the PDU session release command message, or may indicate that target PDU session(s) is one or multiple PDU sessions identified by PDU session ID(s) by including these PDU session IDs. Note that two or more pieces of identification information out of these pieces of identification information may be configured as one or more pieces of identification information.

Further, the SMF_A 230 may transmit the PDU session release command message including one or more pieces of identification information out of the 1st identification information to the 9th identification information, so as to indicate that UP resources associated with a PDU session are to be released. Further, the SMF_A 230 may transmit the PDU session release command message including one or more pieces of identification information out of the 1st identification information to the 9th identification information, so as to indicate a type of a procedure that can be used to establish UP resources associated with a PDU session, or indicate a state of a transition destination of the UE_A 10 and/or the apparatus in the core network.

More specifically, the SMF_A 230 may transmit the PDU session release command message including the 1st identification information and/or the 2nd identification information and/or the 3rd identification information, so as to indicate whether or not the UE-initiated service request procedure can be used to establish UP resources associated with a PDU session. Further, the SMF_A 230 may transmit the PDU session release command message including the 1st identification information and/or the 4th identification information and/or the 5th identification information, so as to indicate whether or not the network-initiated service request procedure can be used to establish UP resources associated with a PDU session. Further, the SMF_A 230 may transmit the PDU session release command message including the 1st identification information and/or the 6th identification information and/or the 7th identification information, so as to indicate whether or not the network-initiated UP connection establishment procedure can be used to establish UP resources associated with a PDU session.

Further, the SMF_A 230 may transmit the PDU session release command message including the 8th identification information, so as to indicate a cause why UP resources associated with a PDU session are released. Further, the SMF_A 230 may transmit the PDU session release command message including the 9th identification information, so as to request that a value indicated by the 9th identification information be configured as a value of a timer indicating a period of time in which a PDU session is maintained, or request that the timer be started.

Further, the SMF_A 230 may transmit two or more pieces of identification information out of the 1st identification information to the 9th identification information in combination, so as to indicate or request at least one of the matters indicated by the 1st identification information to the 9th identification information. Note that the matters indicated by transmission of each of the pieces of identification information from the SMF_A 230 may not be limited to those matters described above.

Note that the SMF_A 230 may determine which piece of identification information out of the 1st identification information to the 9th identification information is to be included in the PDU session release command message, based on received identification information, and/or capability information of the network, and/or a policy such as an operator policy, and/or a state of the network. Note that the determination performed by the SMF_A 230 as to which piece of identification information is to be included in the PDU session release command message is not limited to the determination described above.

The UE_A 10 receives the PDU session release command message. The UE_A 10 receives the PDU session release command message to recognize contents of various pieces of identification information included in the PDU session release command message.

The UE_A 10 further performs 21st processing, based on reception of the PDU session release command message (S1106). Note that the UE_A 10 may perform the 21st processing, based on transmission of the PDU session release accept message, or may perform the 21st processing, based on completion of the present procedure.

Here, the 21st processing may be processing in which the UE_A 10 recognizes matters indicated by the SMF_A 230. Further, the 21st processing may be processing in which the UE_A 10 stores received identification information as a context, or may be processing in which the UE_A 10 forwards received identification information to a higher layer and/or a tower layer. Further, the 21st processing may be processing in which the UE_A 10 receives a notification from a higher layer and/or a lower layer, or may be processing in which the UE_A 10 recognizes such a received notification. Further, the 21st processing may be processing in which the UE_A 10 recognizes that the present procedure has been completed, based on the received notification. Further, the 21st processing may be processing in which the UE_A 10 recognizes that the request of the present procedure has been accepted.

Further, in a case that the UE_A 10 receives one or more pieces of identification information out of the 1st identification information to the 9th identification information, the 21st processing may be processing in which the UE_A 10 releases UP resources associated with a PDU session while maintaining the PDU session, or may be processing in which the UE_A 10 releases a context of UP resources associated with a PDU session. Further, in a case that the UE_A 10 receives one or more pieces of identification information out of the 1st identification information to the 9th identification information, the 21st processing may be processing in which the UE_A 10 determines and recognizes that UP resources associated with a PDU session and/or a context of UP resources associated with a PDU session is to be released, based on the received identification information. Further, in a case that the UE_A 10 receives one or more pieces of identification information out of the 1st identification information to the 9th identification information, the 21st processing may be processing in which the UE_A 10 determines and recognizes that the UE_A 10 continues to maintain a PDU session even after a release of UP resources associated with the PDU session and/or a context of UP resources associated with the PDU session, based on the received identification information.

More specifically, in a case that the UE_A 10 receives the 1st identification information, the 21st processing may be processing in which the UE_A 10 releases UP resources associated with a PDU session identified by the 1st identification information while maintaining the PDU session, or may be processing in which the UE_A 10 releases a context of the UP resources. Further, in a case that the UE_A 10 receives one or more pieces of identification information out of the 2nd identification information to the 7th identification information, the 21st processing may be processing in which the UE_A 10 determines and recognizes which procedure is to be performed to re-establish UP resources associated with a PDU session, based on the received identification information.

For example, in a case that the UE_A 10 receives the 2nd identification information and/or the 3rd identification information, the 21st processing may be processing in which the UE_A 10 determines and recognizes whether or not the UE-initiated service request procedure is allowed to be performed to re-establish UP resources associated with a PDU session, based on the 2nd identification information and/or the 3rd identification information. Further, in a case that the UE_A 10 receives the 4th identification information and/or the 5th identification information, the 21st processing may be processing in which the UE_A 10 determines and recognizes whether or not the network-initiated service request procedure is allowed to be performed to re-establish UP resources associated with a PDU session, based on the 4th identification information and/or the 5th identification information. Further, in a case that the UE_A 10 receives the 6th identification information and/or the 7th identification information, the 21st processing may be processing in which the UE_A 10 determines and recognizes whether or not the network-initiated UP connection establishment procedure is allowed to be performed to re-establish UP resources associated with a PDU session, based on the 6th identification information and/or the 7th identification information.

Further, in a case that the UE_A 10 receives the 8th identification information, the 21st processing may be processing in which the UE_A 10 recognizes a cause why UP resources associated with a PDU session have been released. Further, the UE_A 10 may select a procedure performed to re-establish UP resources associated with a PDU session, based on the cause determined in the 21st processing as to why the UP resources associated with the PDU session have been released. Further, in a case that the UE_A 10 receives the 9th identification information, the 21st processing may be processing in which the UE_A 10 configures a value indicated by the 9th identification information as a value of a timer indicating a period of time in which a PDU session is maintained after a release of UP resources associated with a PDU session, or may be processing in which the UE_A 10 starts the timer.

Further, the 21st processing may be processing in which the UE_A 10 selects and recognizes a transition target state out of the 31st to 36th states, based on received identification information, and transitions to the selected state. Note that the 21st processing may not be limited to the processing described above.

Next, the UE_A 10 transmits a PDU Session Release Accept message to the SMF_A 230 via the AMF_A 240, based on reception of the PDU session release command message and/or completion of the 21st processing (S1108). Further, the SMF_A 230 receives the PDU session release accept message.

Specifically, the UE_A 10 transmits the PDU session release accept message to the AMF_A 240 by using the N1 interface, and the AMF_A 240 that has received the PDU session release accept message transmits the PDU session release accept message to the SMF_A 230 by using the N11 interface.

Further, in a case of being forwarded on the N1 interface, the PDU session release accept message may be forwarded via the NR node_A 122. Further, in a case of being forwarded between the NR node_A 122 and the UE_A 10, the PDU session release accept message may be included in the RRC message to be forwarded. Note that the RRC message may be an RRC connection reconfiguration complete message.

Note that the PDU session release accept message may be a NAS message transmitted and/or received on the N1 interface and the N11 interface. The PDU session release accept message only needs to be a response message to the PDU session release command message. The PDU session release accept message, however, is not limited to this, and only needs to be a message indicating that the PDU session release procedure has been accepted.

Each apparatus completes the procedure of (A) in the present procedure, based on transmission and/or reception of the PDU session release accept message.

Next, steps performed in a case that the 21st condition determination is false, i.e., steps of the procedure of (B) in the present procedure, will be described. The SMF_A 230 transmits a PDU Session Release Reject message to the UE_A 10 via the AMF_A 240 (S1110), and thereby initiates the procedure of (B) in the present procedure.

Specifically, the SMF_A 230 transmits the PDU session release reject message to the AMF_A 240 by using the N11 interface, and the AMF_A 240 that has received the PDU session release request message transmits the PDU session release reject message to the UE_A 10 by using the N1 interface.

Note that the PDU session release reject message may be a NAS message transmitted and/or received on the N11 interface and the N1 interface. The PDU session release reject message is not limited to the PDU session release reject message described above, and only needs to be a message indicating that the PDU session release request message has been rejected.

Here, the SMF_A 230 may include one or more multiple of identification information in the PDU session release reject message, or may indicate that the request of the UE_A 10 has been rejected by including these pieces of identification information. Note that two or more pieces of identification information out of these pieces of identification information may be configured as one or more pieces of identification information. Further, the matters indicated by transmission of each of the pieces of identification information from the SMF_A 230 may not be limited to those matters described above.

Further, the SMF_A 230 may determine which piece of identification information out of the one or multiple pieces of identification information is to be included in the PDU session release reject message, based on received identification information, and/or capability information of the network, and/or a policy such as an operator policy, and/or a state of the network. Note that the determination performed by the SMF_A 230 as to which piece of identification information is to be included in the PDU session release reject message is not limited to the determination described above.

The UE_A 10 receives the PDU session release reject message. The UE_A 10 performs 22nd processing, based on reception of the PDU session release reject message (S1112). The UE_A 10 may perform the 22nd processing, based on completion of the present procedure.

Here, the 22nd processing may be processing in which the UE_A 10 recognizes matters indicated by the SMF_A 230. Further, the 22nd processing may be processing in which the UE_A 10 stores received identification information as a context, or may be processing in which the UE_A 10 forwards received identification information to a higher layer and/or a lower layer. Further, the 22nd processing may be processing in which the UE_A 10 receives a notification from a higher layer and/or a lower layer, or may be processing in which the UE_A 10 recognizes such a received notification. Further, the 22nd processing may be processing in which the UE_A 10 recognizes that the present procedure has been completed, based on the received notification. Further, the 22nd processing may be processing in which the UE_A 10 recognizes that the request of the present procedure has been rejected, or may be processing in which the UE_A 10 recognizes a cause why the request of the present procedure has been rejected. Note that the 22nd processing may not be limited to the processing described above.

Further, the UE_A 10 may recognize that the request of the UE_A 10 has been rejected, based on the fact of receiving the PDU session release reject message, or based on that fact of not receiving the PDU session release command message. Each apparatus completes the procedure of (B) in the present procedure, based on transmission and/or reception of the PDU session release reject message.

Each apparatus completes the present procedure, based on completion of the procedure of (A) or (B) in the present procedure. Note that each apparatus may transition to a state in which PDU session has been released, and/or a state in which UP resources associated with a PDU session have been released, and/or a state in which UP resources associated with a PDU session have been released while the PDU session is maintained, based on completion of the procedure of (A) in the present procedure. Each apparatus may recognize that the present procedure has been rejected, or may transition to a state in which a PDU session has not been released and/or a state in which UP resources associated with a PDU session have not been released, based on completion of the procedure of (B) in the present procedure.

Further, each apparatus may perform processing that is based on the identification information transmitted and/or received in the present procedure, based on completion of the present procedure. In other words, the UE_A 10 may perform the 21st processing, or may perform the 22nd processing, based on completion of the present procedure.

The he 21st condition determination may be performed based on identification information included in the PDU session release request message, and/or subscription information, and/or an operator policy. For example, the 21st condition determination may be true in a case that the network allows the request of the UE_A 10. The he 21st condition determination may be false in a case that the network does not allow the request of the UE_A 10. Note that conditions for determining true or false of the 21st condition determination need not be limited to the conditions described above.

1.4.5. Overview of PDU Session Modification Procedure

Next, an overview of a PDU session modification procedure for modifying a state of a PDU session will be described. The PDU session modification procedure is hereinafter also referred to as the present procedure. The present procedure is a procedure for allowing each apparatus to modify a state of a PDU session. Here, "modifying a state of a PDU session" may be modifying QoS associated with a PDU session, or may be modifying a state of UP resources associated with a PDU session. Note that each apparatus may perform the present procedure in a state in which a PDU session has been established, or may initiate the present procedure at any timing after the PDU session establishment procedure.

Further, the present procedure may be a procedure initiated by the UE_A 10, or may be a procedure initiated by the apparatus in the core network such as the SMF_A 230. For example, the UE_A 10 may initiate the present procedure, based on mobility of the UE_A 10, and/or a change in the state of the UE_A 10, and/or a request from the application of the UE_A 10, and/or the policy of the UE_A 10. Further, the apparatus in the core network such as the SMF_A 230 may initiate the present procedure, based on reception of a request message from the UE_A 10, may initiate the present procedure, based on network configuration and/or an operator policy, or may initiate the present procedure, based on a trigger other than reception of a request message from the UE_A 10.

Note that the trigger other than reception of a request message from the UE_A 10 may be detection of mobility of the UE_A 10, may be detection of a change in the state of the UE_A 10 and/or the access network and/or the core network, or may be a change in the state of the network slice. Further, the trigger other than reception of a request message from the UE_A 10 may be reception of a request from the application server of the DN_A 5, may be a change in the network configuration, or may be a change in the operator policy. Further, the trigger other than reception of a request message from the UE_A 10 may be expiration of a started timer. Note that the trigger that causes the UE_A 10 and/or the apparatus in the core network to initiate the present procedure is not limited to those triggers described above.

Based on completion of the present procedure, each apparatus may release a PDU session, or may release a context of a PDU session. Further, based on completion of the present procedure, each apparatus may release UP resources associated with a PDU session, or may release a context of UP resources associated with a PDU session. Further, in a case that multiple PDU sessions are established, each apparatus may perform the present procedure for each of the PDU sessions.

1.4.5.1. Example of PDU Session Modification Procedure

Figure 12:
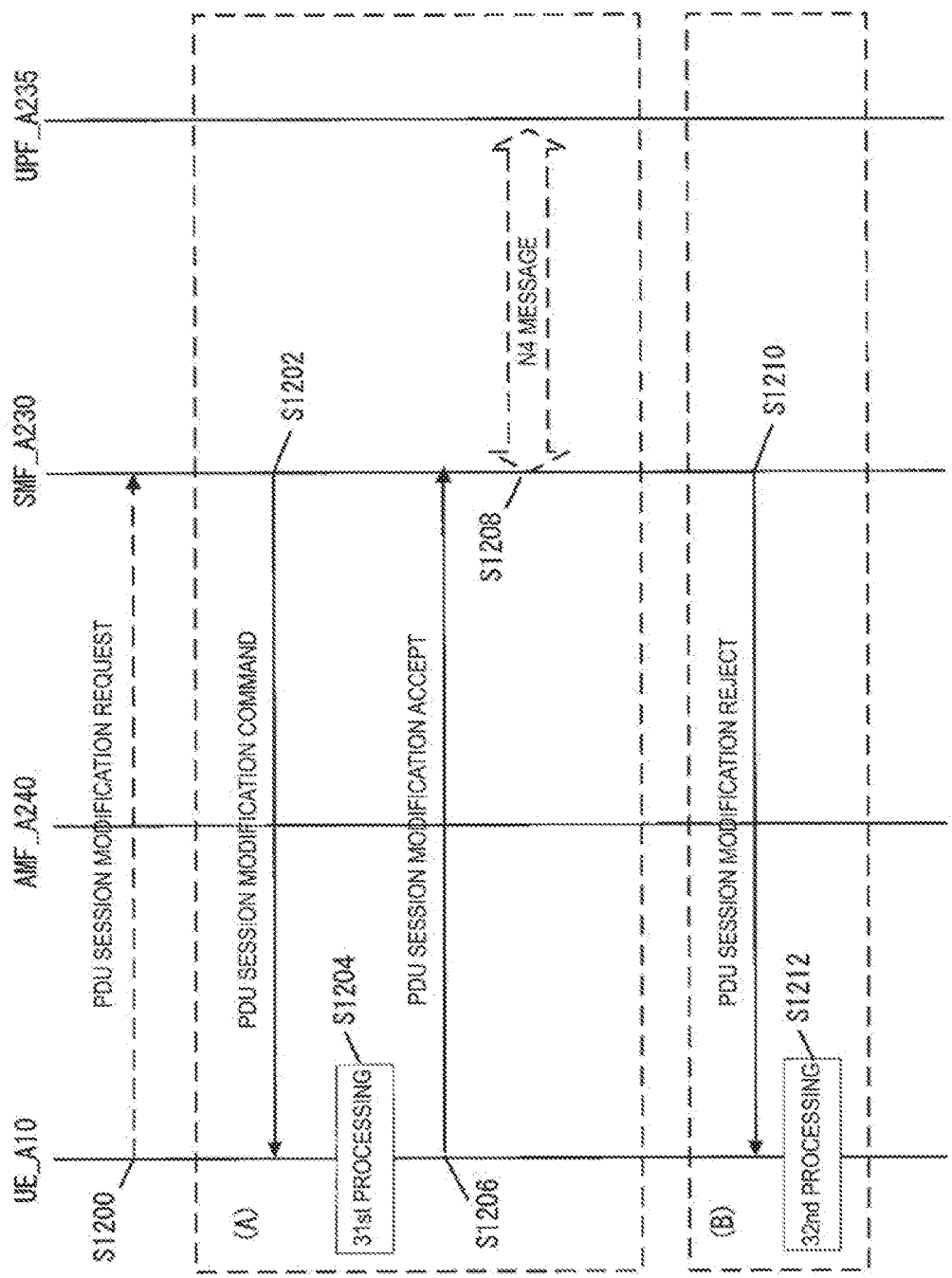
FIG. 12 is a diagram illustrating a PDU session modification procedure.

With reference to FIG. 12, an example of a process for performing a PDU session modification procedure will be described. Each step of the present procedure will be described below. In a case that the present procedure is a procedure initiated by the UE_A 10, first, the UE_A 10 transmits a PDU Session Modification Request message to the SMF_A 230 via the NR node_A 122 and the AMF_A 240 (S1200), and thereby initiates the PDU session modification procedure.

Specifically, the UE_A 10 transmits the PDU session modification request message to the AMF_A 240 via the NR node_A 122 by using the N1 interface. In a case that the AMF_A 240 receives the PDU session modification request message, the AMF_A 240 selects the SMF_A 230 as an NF of a routing destination of the PDU session modification request message, and transmits or forwards the PDU session modification request message to the selected SMF_A 230 by using the N11 interface. Here, the AMF_A 240 may select the SMF_A 230 as the routing destination, based on information included in the PDU session modification request message.

Note that the PDU session modification request message may be a NAS message. The PDU session modification request message is not limited to the PDU session modification request message described above, and only needs to be a message for requesting establishment of a PDU session.

Further, in a case that the present procedure is a procedure initiated by the apparatus in the core network such as the SMF_A 230, each apparatus may transmit and/or receive a PDU session modification command message instead of transmitting and/or receiving the PDU session modification request message (S1102), and may thereby initiate the PDU session modification procedure.

Here, the UE_A 10 may include one or multiple pieces of identification information in the PDU session modification request message, or may indicate a request of the UE_A 10 by including these pieces of identification information. Further, the UE_A 10 may include one or multiple PDU session IDs in the PDU session modification request message, or may indicate that target PDU session(s) is one or multiple PDU sessions identified by PDU session ID(s) by including these PDU session IDs. Note that two or more pieces of identification information out of these pieces of identification information may be configured as one or more pieces of identification information. Further, the matters indicated by transmission of each of the pieces of identification information from the UE_A 10 may not be limited to those matters described above.

Further, the UE_A 10 may determine which piece of identification information out of the one or multiple pieces of identification information is to be included in the PDU session modification request message, based on capability information of the UE_A 10, and/or a policy such as a UE policy, and/or a preference of the UE_A 10, and/or an application (higher layer). Note that the determination performed by the UE_A 10 as to which piece of identification information is to be included in the PDU session modification request message is not limited to the determination described above.

The SMF_A 230 receives the PDU session modification request message, and performs a 31st condition determination. The 31st condition determination is a condition determination for determining whether or not the SMF_A 230 accepts the request of the UE_A 10. In the 31st condition determination, the SMF_A 230 determines whether the 31st condition determination is true or false. The SMF_A 230 initiates the procedure of (A) in the present procedure in a case that the 31st condition determination is true, and initiates the procedure of (B) in the present procedure in a case that the 31st condition determination is false. Note that steps performed in a case that the 31st condition determination is false will be described later.

In the following, steps performed in a case that the 31st condition determination is true, i.e., steps of the procedure of (A) in the present procedure, will be described. The SMF_A 230 transmits a PDU Session Modification Command message to the UE_A 10 via the AMF_A 240, based on reception of the PDU session modification request message and/or transmission and/or reception of the N4 message (S1202), and thereby initiates the procedure of (A) in the present procedure.

Specifically, the SMF_A 230 transmits the PDU session modification command message to the AMF_A 240 by using the N11 interface, and the AMF_A 240 that has received the PDU session modification command message transmits the PDU session modification command message to the UE_A 10 by using the N1 interface.

Further, in a case of being forwarded on the N1 interface, the PDU session modification command message may be forwarded via the NR node_A 122. Further, in a case of being forwarded between the NR node_A 122 and the UE_A 10, the PDU session modification command message may be included in the RRC message to be forwarded. Note that the RRC message may be an RRC connection reconfiguration message.

Further, in a case of being forwarded between the AMF_240 and the NR node_A 122, the PDU session modification command message may be included in an N2 message to be forwarded. Note that the AMF_240 may transmit the N2 message including information for identifying a PDU session and/or information indicating that the AMF_240 releases radio bearers used to transmit and/or receive user data, together with the PDU session modification command message. Further, the AMF_240 may transmit the N2 message including these pieces of information, so as to notify the access network that the AMF_240 releases all the radio bearers, including the default DRBs, that are used to transmit and/or receive user data associated with the PDU session.

Alternatively, the AMF_240 may transmit the N2 message including information for identifying a PDU session and/or information indicating that the AMF_240 maintains radio bearers used to transmit and/or receive user data, together with the PDU session modification command message. Further, the AMF_240 may transmit the N2 message including these pieces of information, so as to notify the access network that the AMF_240 maintains the radio bearers, such as the default DRBs, that are used to transmit and/or receive user data associated with the PDU session.

Note that the PDU session modification command message may be a NAS message transmitted and/or received on the N11 interface and the N1 interface. The PDU session modification command message is not limited to the PDU session modification command message described above, and only needs to be a message indicating that the PDU session modification request message has been accepted.

Here, the SMF_A 230 may include one or more pieces of identification information out of the 1st identification information to the 9th identification information in the PDU session modification command message, or may indicate that the request of the UE_A 10 has been accepted by including these pieces of identification information. Further, the SMF_A 230 may include one or multiple PDU session IDs in the PDU session modification command message, or may indicate that target PDU session(s) is one or multiple PDU sessions identified by PDU session ID(s) by including these PDU session IDs. Note that two or more pieces of identification information out of these pieces of identification information may be configured as one or more pieces of identification information.

Further, the SMF_A 230 may transmit the PDU session modification command message including one or more pieces of identification information out of the 1st identification information to the 9th identification information, so as to indicate that UP resources associated with a PDU session are to be released. Further, the SMF_A 230 may transmit the PDU session modification command message including one or more pieces of identification information out of the 1st identification information to the 9th identification information, so as to indicate a type of a procedure that can be used to establish UP resources associated with a PDU session, or indicate a state of a transition destination of the UE_A 10 and/or the apparatus in the core network.

More specifically, the SMF_A 230 may transmit the PDU session modification command message including the 1st identification information and/or the 2nd identification information and/or the 3rd identification information, so as to indicate whether or not the UE-initiated service request procedure can be used to establish UP resources associated with a PDU session. Further, the SMF_A 230 may transmit the PDU session modification command message including the 1st identification information and/or the 4th identification information and/or the 5th identification information, so as to indicate whether or not the network-initiated service request procedure can be used to establish UP resources associated with a PDU session. Further, the SMF_A 230 may transmit the PDU session modification command message including the 1st identification information and/or the 6th identification information and/or the 7th identification information, so as to indicate whether or not the network-initiated UP connection establishment procedure can be used to establish UP resources associated with a PDU session.

Further, the SMF_A 230 may transmit the PDU session modification command message including the 8th identification information, so as to indicate a cause why UP resources associated with a PDU session are released. Further, the SMF_A 230 may transmit the PDU session modification command message including the 9th identification information, so as to request that a value indicated by the 9th identification information be configured as a value of a timer indicating a period of time in which a PDU session is maintained, or request that the timer be started.

Further, the SMF_A 230 may transmit two or more pieces of identification information out of the 1st identification information to the 9th identification information in combination, so as to indicate or request at least one of the matters indicated by the 1st identification information to the 9th identification information. Note that the matters indicated by transmission of each of the pieces of identification information from the SMF_A 230 may not be limited to those matters described above.

Note that the SMF_A 230 may determine which piece of identification information out of the 1st identification information to the 9th identification information is to be included in the PDU session modification command message, based on received identification information, and/or capability information of the network, and/or a policy such as an operator policy, and/or a state of the network. Note that the determination performed by the SMF_A 230 as to which piece of identification information is to be included in the PDU session modification command message is not limited to the determination described above.

The UE_A 10 receives the PDU session modification command message. The UE_A 10 receives the PDU session modification command message to recognize contents of various pieces of identification information included in the PDU session modification command message.

The UE_A 10 further performs 31st processing, based on reception of the PDU session modification command message (S1204). Note that the UE_A 10 may perform the 31st processing, based on transmission of the PDU session modification accept message, or may perform the 31st processing, based on completion of the present procedure.

Here, the 31st processing may be processing in which the UE_A 10 recognizes matters indicated by the SMF_A 230. Further, the 31st processing may be processing in which the UE_A 10 stores received identification information as a context, or may be processing in which the UE_A 10 forwards received identification information to a higher layer and/or a lower layer. Further, the 31st processing may be processing in which the UE_A 10 receives a notification from a higher layer and/or a lower layer, or may be processing in which the UE_A 10 recognizes such a received notification. Further, the 31st processing may be processing in which the UE_A 10 recognizes that the present procedure has been completed, based on the received notification. Further, the 31st processing may be processing in which the UE_A 10 recognizes that the request of the present procedure has been accepted.

Further, in a case that the UE_A 10 receives one or more pieces of identification information out of the 1st identification information to the 9th identification information, the 31st processing may be processing in which the UE_A 10 releases UP resources associated with a PDU session while maintaining the PDU session, or may be processing in which the UE_A 10 releases a context of UP resources associated with a PDU session. Further, in a case that the UE_A 10 receives one or more pieces of identification information out of the 1st identification information to the 9th identification information, the 31st processing may be processing in which the UE_A 10 determines and recognizes that UP resources associated with a PDU session and/or a context of UP resources associated with a PDU session is to be released, based on the received identification information. Further, in a case that the UE_A 10 receives one or more pieces of identification information out of the 1st identification information to the 9th identification information, the 31st processing may be processing in which the UE_A 10 determines and recognizes that the UE_A 10 continues to maintain a PDU session even after a release of UP resources associated with the PDU session and/or a context of UP resources associated with the PDU session, based on the received identification information.

More specifically, in a case that the UE_A 10 receives the 1st identification information, the 31st processing may be processing in which the UE_A 10 releases UP resources associated with a PDU session identified by the 1st identification information while maintaining the PDU session, or may be processing in which the UE_A 10 releases a context of the UP resources. Further, in a case that the UE_A 10 receives one or more pieces of identification information out of the 2nd identification information to the 7th identification information, the 31st processing may be processing in which the UE_A 10 determines and recognizes which procedure is to be performed to re-establish UP resources associated with a PDU session, based on the received identification information.

For example, in a case that the UE_A 10 receives the 2nd identification information and/or the 3rd identification information, the 31st processing may be processing in which the UE_A 10 determines and recognizes whether or not the UE-initiated service request procedure is allowed to be performed to re-establish UP resources associated with a PDU session, based on the 2nd identification information and/or the 3rd identification information. Further, in a case that the UE_A 10 receives the 4th identification information and/or the 5th identification information, the 31st processing may be processing in which the UE_A 10 determines and recognizes whether or not the network-initiated service request procedure is allowed to be performed to re-establish UP resources associated with a PDU session, based on the 4th identification information and/or the 5th identification information. Further, in a case that the UE_A 10 receives the 6th identification information and/or the 7th identification information, the 31st processing may be processing in which the UE_A 10 determines and recognizes whether or not the network-initiated UP connection establishment procedure is allowed to be performed to re-establish UP resources associated with a PDU session, based on the 6th identification information and/or the 7th identification information.

Further, in a case that the UE_A 10 receives the 8th identification information, the 31st processing may be processing in which the UE_A 10 recognizes a cause why UP resources associated with a PDU session have been released. Further, the UE_A 10 may select a procedure performed to re-establish UP resources associated with a PDU session, based on the cause determined in the 31st processing as to why the UP resources associated with the PDU session have been released. Further, in a case that the UE_A 10 receives the 9th identification information, the 31st processing may be processing in which the UE_A 10 configures a value indicated by the 9th identification information as a value of a timer indicating a period of time in which a PDU session is maintained after a release of UP resources associated with a PDU session, or may be processing in which the UE_A 10 starts the timer.

Further, the 31st processing may be processing in which the UE_A 10 selects and recognizes a transition target state out of the 31st to 36th states, based on received identification information, and transitions to the selected state. Note that the 31st processing may not be limited to the processing described above.

Next, the UE_A 10 transmits a PDU session modification accept (PDU Session Release Accept) message to the SMF_A 230 via the AMF_A 240, based on reception of the PDU session modification command message and/or completion of the 31st processing (S1206). Further, the SMF_A 230 receives the PDU session modification accept message.

Specifically, the UE_A 10 transmits the PDU session modification accept message to the AMF_A 240 by using the N1 interface, and the AMF_A 240 that has received the PDU session modification accept message transmits the PDU session modification accept message to the SMF_A 230 by using the N11 interface.

Further, in a case of being forwarded on the N1 interface, the PDU session modification accept message may be forwarded via the NR node_A 122. Further, in a case of being forwarded between the NR node_A 122 and the UE_A 10, the PDU session modification accept message may be included in the RRC message to be forwarded. Note that the RRC message may be an RRC connection reconfiguration complete message.

Note that the PDU session modification accept message may be a NAS message transmitted and/or received on the N1 interface and the N11 interface. The PDU session modification accept message only needs to be a response message to the PDU session modification command message. The PDU session modification accept message is, however, not limited to this, and only needs to be a message indicating that the PDU session modification procedure has been accepted.

Next, the SMF_A 230 selects the UPF_A 235 with which the PDU session to be modified is established, based on reception of the PDU session modification accept message, and transmits and/or receives the N4 message to and/or from the selected UPF_A 235 (S1208). Note that the N4 message may be a control message transmitted and/or received on the N4 interface, may be an N4 session modification request message, or may be an N4 session modification response message.

Here, the SMF_A 230 may include one or multiple PDU session IDs in the N4 message, or may indicate that target PDU session(s) is one or multiple PDU sessions identified by PDU session ID(s) by including these PDU session IDs. Further, the SMF_A 230 may indicate a release of UP resources associated with a PDU session while maintaining the PDU session by transmitting the N4 message. Further, the UPF_A 235 may release UP resources associated with a PDU session while maintaining the PDU session, based on reception of the N4 message.

Each apparatus completes the procedure of (A) in the present procedure, based on transmission and/or reception of the PDU session modification accept message and/or transmission and/or reception of the N4 message.

Next, steps performed in a case that the 31st condition determination is false, i.e., steps of the procedure of (B) in the present procedure, will be described. The SMF_A 230 transmits a PDU Session Modification Reject message to the UE_A 10 via the AMF_A 240 (S1210), and initiates the procedure of (B) in the present procedure.

Specifically, the SMF_A 230 transmits the PDU session modification reject message to the AMF_A 240 by using the N11 interface, and the AMF_A 240 that has received the PDU session modification request message transmits the PDU session modification reject message to the UE_A 10 by using the N1 interface.

Note that the PDU session modification reject message may be a NAS message transmitted and/or received on the N11 interface and the N1 interface. The PDU session modification reject message is not limited to the PDU session modification reject message described above, and only needs to be a message indicating that the PDU session modification request message has been rejected.

Here, the SMF_A 230 may include one or multiple pieces of identification information in the PDU session modification reject message, or may indicate that the request of the UE_A 10 has been rejected by including these pieces of identification information. Note that two or more pieces of identification information out of these pieces of identification information may be configured as one or more pieces of identification information. Further, the matters indicated by transmission of each of the pieces of identification information from the SMF_A 230 may not be limited to those matters described above.

Further, the SMF_A 230 may determine which piece of identification information out of the one or multiple pieces of identification information is to be included in the PDU session modification reject message, based on received identification information, and/or capability information of the network, and/or a policy such as an operator policy, and/or a state of the network. Note that the determination performed by the SMF_A 230 as to which piece of identification information is to be included in the PDU session modification reject message is not limited to the determination described above.

The UE_A 10 receives the PDU session modification reject message. The UE_A 10 performs 32nd processing, based on reception of the PDU session modification reject message (S1112). The UE_A 10 may perform the 32nd processing, based on completion of the present procedure.

Here, the 32nd processing may be processing in which the UE_A 10 recognizes matters indicated by the SMF_A 230. Further, the 32nd processing may be processing in which the UE_A 10 stores received identification information as a context, or may be processing in which the UE_A 10 forwards received identification information to a higher layer and/or a lower layer. Further, the 32nd processing may be processing in which the UE_A 10 receives a notification from a higher layer and/or a lower layer, or may be processing in which the UE_A 10 recognizes such a received notification. Further, the 32nd processing may be processing in which the UE_A 10 recognizes that the present procedure has been completed, based on the received notification. Further, the 32nd processing may be processing in which the UE_A 10 recognizes that the request of the present procedure has been rejected, or may be processing in which the UE_A 10 recognizes a cause why the request of the present procedure has been rejected. Note that the 32nd processing may not be limited to the processing described above.

Further, the UE_A 10 may recognize that the request of the UE_A 10 has been rejected, based on the fact of receiving the PDU session modification reject message, or based on that fact of not receiving the PDU session modification command message. Each apparatus completes the procedure of (B) in the present procedure, based on transmission and/or reception of the PDU session modification reject message.

Each apparatus completes the present procedure, based on completion of the procedure of (A) or (B) in the present procedure. Note that each apparatus may transition to a state in which a state of a PDU session has been modified, and/or a state in which a state of UP resources associated with a PDU session has been modified, based on completion of the procedure of (A) in the present procedure. Further, each apparatus may transition to a state in which UP resources associated with a PDU session have been released while the PDU session is maintained, based on completion of the procedure of (A) in the present procedure. Each apparatus may recognize that the present procedure has been rejected, or may transition to a state in which a state of a PDU session has not been modified, and/or a state in which a state of UP resources associated with a PDU session have not been modified, based on completion of the procedure of (B) in the present procedure.

Further, each apparatus may perform processing that is based on the identification information transmitted and/or received in the present procedure, based on completion of the present procedure. In other words, the UE_A 10 may perform the 31st processing, or may perform the 32nd processing, based on completion of the present procedure.

The 31st condition determination may be performed based on identification information included in the PDU session modification request message, and/or subscription information, and/or an operator policy. For example, the 31st condition determination may be true in a case that the network allows the request of the UE_A 10. The 31st condition determination may be false in a case that the network does not allow the request of the UE_A 10. Note that conditions for determining true or false of the 31st condition determination need not be limited to the conditions described above.

1.4.6. Overview of Core Network-Initiated UP Connection Deactivation Procedure

Next, an overview of a core network-initiated UP connection deactivation procedure for releasing UP connection associated with a PDU session will be described. The core network-initiated UP connection deactivation procedure is hereinafter also referred to as the present procedure. The present procedure is a procedure for allowing each apparatus to release a PDU session. Here, "releasing a PDU session" may be releasing UP resources associated with a PDU session. Note that each apparatus may perform the present procedure in a state in which a PDU session has been established, or may initiate the present procedure at any timing after the PDU session establishment procedure.

Further, the present procedure may be a procedure initiated by the apparatus in the core network such as the SMF_A 230. For example, the apparatus in the core network such as the SMF_A 230 may initiate the present procedure, based on reception of a request message from the UE_A 10, may initiate the present procedure, based on network configuration and/or an operator policy, or may initiate the present procedure, based on a trigger other than reception of a request message from the UE_A 10.

Note that the trigger other than reception of a request message from the UE_A 10 may be detection of mobility of the UE_A 10, may be detection of a change in the state of the UE_A 10 and/or the access network and/or the core network, or may be a change in the state of the network slice. Further, the trigger other than reception of a request message from the UE_A 10 may be reception of a request from the application server of the DN_A 5, may be a change in the network configuration, or may be a change in the operator policy. Further, the trigger other than reception of a request message from the UE_A 10 may be expiration of a started timer. Note that the trigger that causes the apparatus in the core network to initiate the present procedure is not limited to those triggers described above.

Based on completion of the present procedure, each apparatus may release UP connection associated with a PDU session, or may release a context of UP connection associated with a PDU session. Further, in a case that multiple PDU sessions are established, each apparatus may perform the present procedure for each of the PDU sessions.

1.4.6.1. Example of Core Network-Initiated UP Connection Deactivation Procedure

Figure 13:
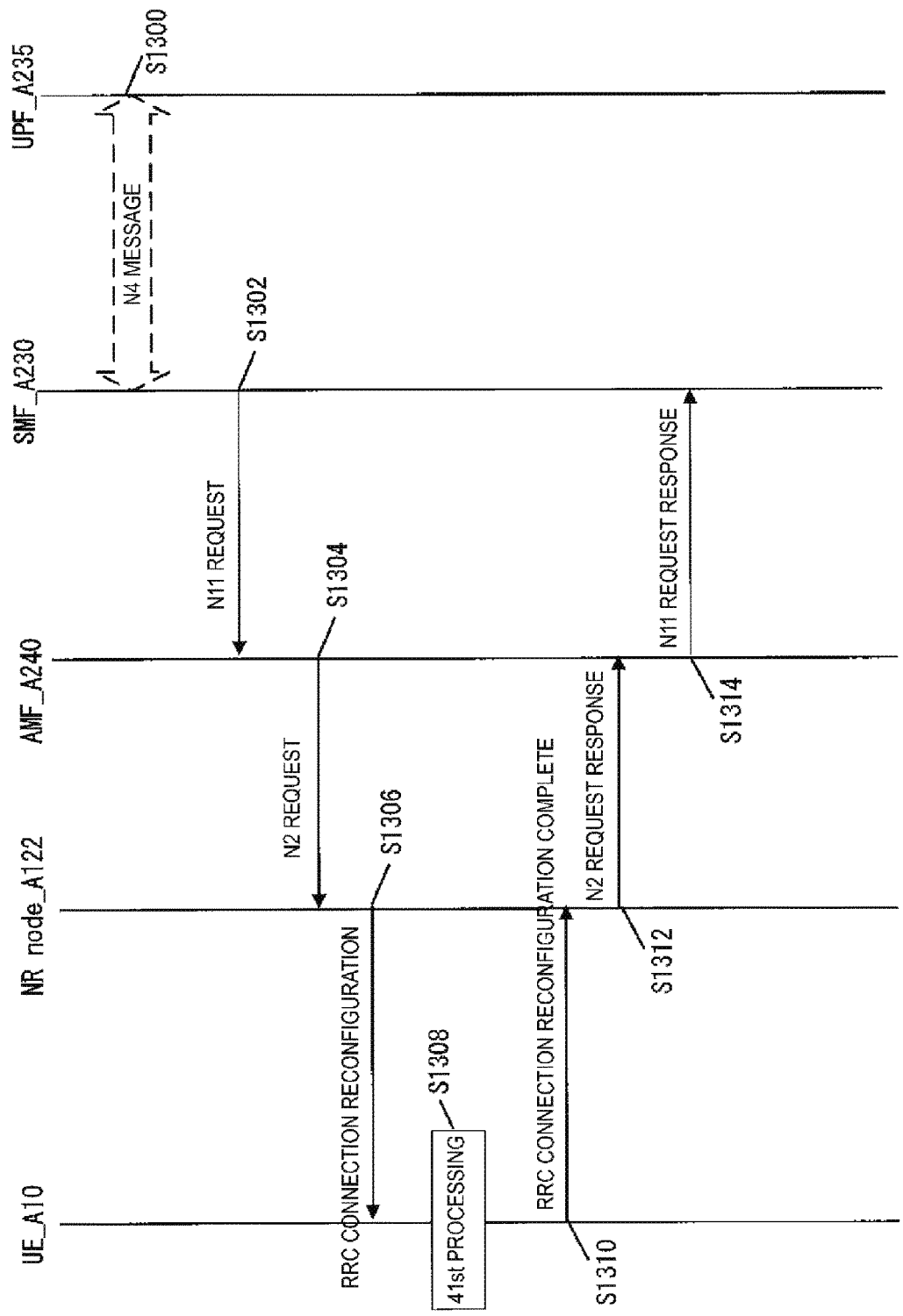
FIG. 13 is a diagram illustrating a core network-initiated UP connection deactivation procedure.

With reference to FIG. 13, an example of a process for performing a core network-initiated UP connection deactivation procedure will be described. Each step of the present procedure will be described below. In a case that the present procedure is a procedure initiated by the UE_A 10, first, the SMF_A 230 selects the UPF_A 235 with which the PDU session to be released is established, transmits and/or receives an N4 message to and/or from the selected UPF_A 235 (S1300), and thereby initiates the core network-initiated UP connection deactivation procedure. Note that the N4 message may be a control message transmitted and/or received on the N4 interface, may be an N4 session release request message, or may be an N4 session release response message.

Next, the SMF_A 230 transmits an N11 request message to the AMF_A 240, based on transmission and/or reception of the N4 message (S1302). Further, the AMF_A 240 receives the N11 request message, and transmits an N2 request message to the NR node_A 122 (S1304). Further, the NR node_A 122 receives the N2 request message, and transmits an RRC connection reconfiguration message to the UE_A 10 (S1306).

Here, the AMF_240 may transmit the N2 request message including information for identifying a PDU session and/or information indicating that the AMF_240 releases radio bearers used to transmit and/or receive user data. Further, the AMF_240 may transmit the N2 message including these pieces of information, so as to notify the access network that the AMF_240 releases all the radio bearers, including the default DRBs, that are used to transmit and/or receive user data associated with the PDU session.

Alternatively, the AMF_240 may transmit the N2 request message including information for identifying a PDU session and/or information indicating that the AMF_240 maintains radio bearers used to transmit and/or receive user data. Further, the AMF_240 may transmit the N2 message including these pieces of information, so as to notify the access network that the AMF_240 maintains the radio bearers, such as the default DRBs, that are used to transmit and/or receive user data associated with the PDU session.

The UE_A 10 receives the RRC connection reconfiguration message. The UE_A 10 receives the RRC connection reconfiguration message to recognize contents of various pieces of identification information included in the RRC connection reconfiguration message.

The UE_A 10 further performs 41st processing, based on reception of the RRC connection reconfiguration message (S1308). Note that the UE_A 10 may perform the 41st processing, based on transmission of the RRC connection reconfiguration complete message, or may perform the 41st processing, based on completion of the present procedure.

Here, the 41st processing may be processing in which the UE_A 10 recognizes matters indicated by the apparatus in the access network and/or the apparatus in the core network. Further, the 41st processing may be processing in which the UE_A 10 stores received identification information as a context, or may be processing in which the UE_A 10 forwards received identification information to a higher layer and/or a lower layer. Further, the 41st processing may be processing in which the UE_A 10 receives a notification from a higher layer and/or a lower layer, or may be processing in which the UE_A 10 recognizes such a received notification. Further, the 41st processing may be processing in which the UE_A 10 recognizes that the present procedure has been completed, based on the received notification. Further, the 41st processing may be processing in which the UE_A 10 releases radio bearers associated with a PDU session.

Further, the 41st processing may be processing in which the UE_A 10 releases UP resources associated with a PDU session while maintaining the PDU session, or may be processing in which the UE_A 10 releases a context of UP resources associated with a PDU session. Further, the 41st processing may be processing in which the UE_A 10 notifies the higher layer of information indicating that radio bearers and/or UP resources for transmitting and/or receiving user data have been released, based on a release of the radio bearers and/or the UP resources for transmitting and/or receiving user data. Further, the 41st processing may be processing in which the UE_A 10 receives a notification from the lower layer, indicating that radio bearers and/or UP resources for transmitting and/or receiving user data have been released.

Further, in a case that the UE_A 10 receives a notification from the lower layer, indicating that radio bearers and/or UP resources for transmitting and/or receiving user data have been released, the 41st processing may be processing in which the UE_A 10 determines and recognizes that UP resources associated with a PDU session and/or a context of UP resources associated with a PDU session is to be released, based on the received notification. Further, even in a case that the UE_A 10 receives a notification indicating that radio bearers and/or UP resources for transmitting and/or receiving user data have been released, the 41st processing may be processing in which the UE_A 10 determines and recognizes that the UE_A 10 continues to maintain a PDU session, based on identification information received in the registration procedure and/or the PDU session establishment procedure.

Further, the 41st processing may be processing in which the UE_A 10 selects and recognizes a transition target state out of the 31st to 36th states, based on identification information received in the initial procedure and/or a state of the UE_A 10 before the present procedure is performed, or may be processing in which the UE_A 10 transitions to the selected state. Note that the 41st processing may not be limited to the processing described above.

Next, the UE_A 10 transmits an RRC connection reconfiguration complete message to the NR node_A 122, based on reception of the RRC connection reconfiguration message and/or completion of the 41st processing (S1310). Further, the NR node_A 122 receives the RRC connection reconfiguration complete message, and transmits an N2 request response message to the AMF_A 240 (S1312). Further, the AMF_A 240 receives the N2 response message, and transmits an N11 request response message to the SMF_A 230 (S1314). Further, the SMF_A 230 receives the N11 request response message.

Note that each of the RRC connection reconfiguration message and the RRC connection reconfiguration complete message may be an RRC message, and/or may be a message for releasing radio bearers associated with a PDU session that are established between the UE_A 10 and the NR node_A 122. Further, each of the N2 request message and the N2 request response message may be a message transmitted and/or received on the N2 interface. Further, each of the N11 request message and the N11 request response message may be a message transmitted and/or received on the N11 interface.

Each apparatus completes the present procedure, based on transmission and/or reception of the RRC connection reconfiguration complete message and/or transmission and/or reception of the N2 request response message and/or transmission and/or reception of the N11 request response message. Note that each apparatus may transition to a state in which UP connection associated with a PDU session has been released, and/or a state in which UP connection associated with a PDU session has been released while the PDU session is maintained, based on completion of the present procedure.

Further, each apparatus may perform processing that is based on the identification information transmitted and/or received in the present procedure, based on completion of the present procedure. In other words, the UE_A 10 may perform the 41st processing, based on completion of the present procedure.

1.4.7. Overview of UE-Initiated Service Request Procedure

Next, an overview of a UE-initiated Service request procedure will be described. The UE-initiated Service request procedure is hereinafter also referred to as the present procedure. The UE-initiated Service request procedure is a procedure initiated by the UE_A 10 so as to establish N1 interface connectivity and/or UP connection.

The UE_A 10 can perform the present procedure at any timing, on the condition that the UE_A 10 is registered with the network. In other words, the UE_A 10 may initiate the present procedure at any timing, on the condition that the UE_A 10 is in the registered state (RM-REGISTERED state and/or 5GMM-REGISTERED state). In still other words, the UE_A 10 may initiate the present procedure in the disconnected state (5GMM-IDLE state and/or CM-IDLE state), or may initiate the present procedure in the connected state (5GMM-CONNECTED state and/or CM-CONNECTED state).

Further, the UE_A 10 may initiate the present procedure in a case that there is a pending NAS message to be transmitted, or may initiate the present procedure in a case that there is pending user data to be transmitted. Further, the UE_A 10 may initiate the present procedure, based on a notification from the higher layer, or may initiate the present procedure, based on a notification from the lower layer. Further, the UE_A 10 may initiate the present procedure, based on reception of a message from the apparatus in the core network and/or the apparatus in the access network.

Further, the UE_A 10 may initiate the present procedure, based on a change in the state of the UE_A 10, and/or a request from the application of the UE_A 10, and/or a policy of the UE_A 10. Further, the UE_A 10 may initiate the present procedure, based on expiration of a started timer. Furthermore, the UE_A 10 may initiate the present procedure in a case that a change occurs in capability information and/or preference concerning PDU session establishment of the UE_A 10. Note that, in addition to the cases described above, the UE_A 10 can perform the present procedure at any timing, on the condition that the UE_A 10 is in the registered state.

Further, the UE-initiated service request procedure may include a UE-initiated service request procedure initiated in the disconnected state, and a UE-initiated service request procedure initiated in the connected state. Note that the UE-initiated service request procedure initiated in the disconnected state may be a procedure similar to a UE triggered Service Request procedure provided in EPS. Further, the UE-initiated service request procedure initiated in the connected state may be a procedure different from the UE triggered service request procedure provided in EPC. In other words, the UE-initiated service request procedure initiated in the disconnected state may be a procedure similar to the UE triggered service request procedure described in NPL 3. Further, the UE-initiated service request procedure initiated in the connected state may be a procedure different from the UE triggered service request procedure described in NPL 3. Note that the UE-initiated service request procedure initiated in the disconnected state and the UE-initiated service request procedure initiated in the connected state may not be limited to those procedures described above.

Each apparatus may establish N1 interface connectivity, based on completion of the present procedure, or may transmit and/or receive the NAS message by using the established N1 interface. Further, each apparatus may establish UP connection, based on completion of the present procedure, or may transmit and/or receive user data by using the established UP connection. Further, each apparatus may transition to the connected state, based on completion of the present procedure.

1.4.7.1. Example of UE-Initiated Service Request Procedure

Figure 14:
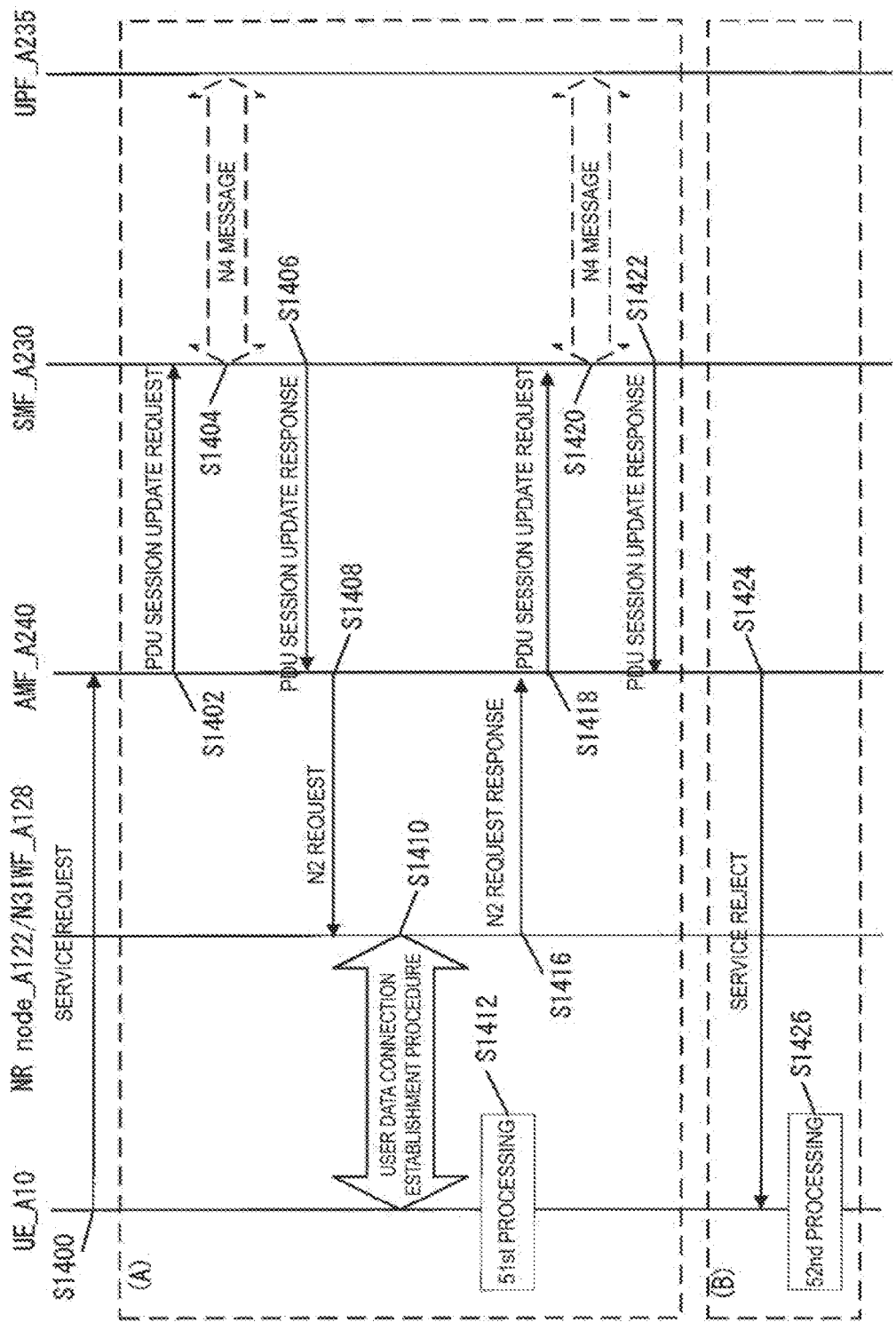
FIG. 14 is a diagram illustrating a UE-initiated service request procedure.

With reference to FIG. 14, an example of a process for performing a UE-initiated service request procedure will be described. In this section, the present procedure refers to the UE-initiated service request procedure. Each step of the present procedure will be described below.

First, the UE_A 10 transmits a Service Request message to the AMF_A 240 via the NR node_A 122 and/or the N3IWF_A 128 (S1400), and thereby initiates the UE-initiated service request procedure. The UE_A 10 may transmit the service request message including the Session Management (SM) message or may transmit the SM message together with the service request message, and may thereby initiate a procedure for the SM during the UE-initiated service request procedure.

Specifically, in a case of transmitting the service request message via 3GPP access, the UE_A 10 transmits a Radio Resource Control (RRC) message including the service request message to the NR node_A 122. In a case that the NR node_A 122 receives the RRC message including the service request message, the NR node_A 122 extracts the service request message from the RRC message, and selects the AMF_A 240 as a routing destination of the service request message. Here, the NR node_A 122 may select the AMF_A 240, based on information included in the RRC message. The NR node_A 122 transmits or forwards the service request message to the selected AMF_A 240.

Further, in a case of transmitting the service request message via non-3GPP access, the UE_A 10 transmits an Internet Key Exchange version 2 (IKEv2) message including the service request message to the N3IWF_A 128. In a case that the N3IWF_A 128 receives the IKEv2 message including the service request message, the N3IWF_A 128 extracts the service request message from the IKEv2 message, and selects the AMF_A 240 as a routing destination of the service request message. Here, the N3IWF_A 128 may select the AMF_A 240, based on information included in the IKEv2 message. The N3IWF_A 128 transmits or forwards the service request message to the selected AMF_A 240.

Note that the service request message is a Non-Access-Stratum (NAS) message transmitted and/or received on the N1 interface. The RRC message is a control message transmitted and/or received between the UE_A 10 and the NR node_A 122. The IKEv2 message is a control message transmitted and/or received between the UE_A 10 and the N3IWF_A 128. The NAS message is processed in the NAS layer, the RRC message is processed in the RRC layer, the IKEv2 message is processed in the IKEv2 layer, and the NAS layer is a layer higher than the RRC layer and the IKEv2 layer.

Here, the UE_A 10 may include the 21st identification information in the service request message and/or the IKEv2 message. Further, the UE_A 10 may include the 21st identification information in the service request message, and/or the RRC message, and/or the IKEv2 message.

Further, the UE_A 10 may transmit the service request message, and/or the RRC message, and/or the IKEv2 message including the 21st identification information, so as to indicate a PDU session for requesting UP resource establishment, or indicate a request for establishment of UP resources associated with the PDU session indicated by the 21st identification information.

Further, in a case that the present procedure is the UE-initiated service request procedure initiated in the disconnected state, and/or in a case that the UE_A 10 is in the disconnected state, the UE_A 10 may transmit the service request message including one or multiple security parameters and/or a PDU session status as well as the 21st identification information. Further, in this case, the UE_A 10 may transmit these pieces of information, so as to request establishment of an N1 tunnel as well as establishment of UP resources associated with a PDU session, or may request transition to the connected state.

In contrast, in a case that the present procedure is the UE-initiated service request procedure initiated in the disconnected state, and/or in a case that the UE_A 10 is in the connected state, the UE_A 10 may transmit the service request message including only the 21st identification information, without including one or multiple security parameters and a PDU session status. Further, in this case, the UE_A 10 may transmit only the 21st identification information, so as to request only establishment of UP resources associated with a PDU session. Further, the UE_A 10 in the connected state need not perform the present procedure via non-3GPP access.

Note that the matters indicated by transmission of each of the pieces of identification information from the UE_A 10 may not be limited to those matters described above. Further, the UE_A 10 may determine whether or not the 21st identification information is to be included in the service request message, based on a state of the UE_A 10, and/or capability information of the UE_A 10, and/or a policy such as a UE policy, and/or a preference of the UE_A 10, and/or an application (higher layer). Note that the determination performed by the UE_A 10 as to which piece of identification information is to be included in the service request message is not limited to the determination described above.

In a case that the AMF_A 240 receives the service request message, the AMF_A 240 performs a 51st condition determination. The 51st condition determination is a condition determination for determining whether or not the AMF_A 240 accepts the request of the UE_A 10. In the 51st condition determination, the AMF_A 240 determines whether the 51st condition determination is true or false. In a case that the 51st condition determination is true (in other words, in a case that the network accepts the request of the UE_A 10), the AMF_A 240 initiates the procedure of (A) in the present procedure. In a case that the 51st condition determination is false (in other words, in a case that the network does not accept the request of the UE_A 10), the AMF_A 240 initiates the procedure of (B) in the present procedure. Note that the 51st condition determination may be performed by the AMF_A 240, may be performed by the SMF_A 230, or may be performed by the AMF_A 240 and the SMF_A 230 transmitting and/or receiving a control message to and/or from each other.

In the following, steps performed in a case that the 51st condition determination is true, i.e., steps of the procedure of (A) in the present procedure, will be described. The AMF_A 240 performs a 54th condition determination, and initiates the procedure of (A) in the present procedure. The 54th condition determination is a condition determination for determining whether or not the AMF_A 240 transmits and/or receives the N11 message to and/or from the SMF_A 230. In a case that the 54th condition determination is true (in other words, in a case that the AMF_A 240 transmits and/or receives the N11 message to and/or from the SMF_A 230), the AMF_A 240 selects the SMF_A 230, and transmits and/or receives the N11 message to and/or from the selected SMF_A 230 (S1402) and (S1406). In a case that the 54th condition determination is false (in other words, in a case that the AMF_A 240 does not transmit and/or receive the N11 message to and/or from the SMF_A 230), the AMF_A 240 omits those operations. Further, in the case that the 54th condition determination is true, the SMF_A 230 may select the UPF_A 235, and transmit and/or receive the N4 message to and/or from the selected UPF_A 235, based on reception of the N11 message (S1404). Note that, in a case that the AMF_A 240 receives an N11 message indicating rejection from the SMF_A 230, the AMF_A 240 may halt the procedure of (A) in the present procedure, and may initiate the procedure of (B) in the present procedure.

Here, the N11 message may be a message transmitted and/or received on the N11 interface. For example, the N11 message transmitted from the AMF_A 240 to the SMF_A 230 may be a PDU Session Update Request message, and the N11 message transmitted from the SMF_A 230 to the AMF_A 240 may be a PDU Session Update Response message. Further, the N4 message may be a message transmitted and/or received on the N4 interface.

Next, the AMF_A 240 transmits the N2 request message to the NR node_A 122 or the N3IWF_A 128, based on reception of the service request message from the UE_A 10, and/or completion of transmission and/or reception of the N11 message to and/or from the SMF_A 230 (S1408). The AMF_A 240 may transmit the N2 request message including a Service Accept message message. The NR node_A 122 or the N3IWF_A 128 receives the N2 request message. Here, in a case that the AMF_240 receives the service request message via 3GPP access, the AMF_240 may transmit the N2 request message to the NR node_A 122. Further, in a case that the AMF_240 receives the service request message via non-3GPP access, the AMF_240 may transmit the N2 request message to the N3IWF_A 128.

Next, the NR node_A 122 or the N3IWF_A 128 performs a user data connection establishment procedure with the UE_A 10, based on reception of the N2 request message (S1410). Note that the user data connection establishment procedure is a procedure for establishing connection for transmission and/or reception of user data between the UE_A 10 and the NR node_A 122 or the N3IWF_A 128. More specifically, the user data connection establishment procedure may be a procedure for establishing connection for transmission and/or reception of user data between the UE_A 10 and the NR node_A 122 in a case that the NR node_A 122 receives the N2 request message, and may be a procedure for establishing connection for transmission and/ or reception of user data between the UE_A 10 and the N3IWF_A 128 in a case that the N3IWF_A 128 receives the N2 request message.

Further, in a case that the UE_A 10 establishes multiple PDU sessions, the N3IWF_A 128 may perform the user data connection establishment procedure for each of the established PDU sessions. In other words, in a case that the N3IWF_A 128 receives PDU session IDs indicating multiple PDU sessions through the N2 request message, the N3IWF_A 128 may perform the user data connection establishment procedure as many times as the number of established PDU sessions.

Here, the connection for transmission and/or reception of user data between the UE_A 10 and the NR node_A 122 may be radio bearers for transmitting and/or receiving user data. Further, the connection for transmission and/or reception of user data between the UE_A 10 and the N3IWF_A 128 may be IKEv2 Child SA, or may be an IP Security (IPSec) tunnel.

The user data connection establishment procedure will be described below. First, the user data connection establishment procedure performed between the NR node_A 122 and the UE_A 10 will be described. The NR node_A 122 transmits an RRC connection reconfiguration message to the UE_A 10, and thereby initiates the user data connection establishment procedure.

Here, the NR node_A 122 may transmit the RRC connection reconfiguration message including one or multiple PDU session IDs, or may transmit the RRC connection reconfiguration message including these PDU session IDs so as to establish connection for transmission and/or reception of user data associated with PDU session(s) indicated by these PDU session IDs.

Next, the UE_A 10 receives the RRC connection reconfiguration message. Further, in a case that the RRC connection reconfiguration message includes a service accept message, the UE_A 10 receives the service accept message. The UE_A 10 receives the RRC connection reconfiguration message and/or the service accept message to recognize contents of various pieces of identification information included in the RRC connection reconfiguration message and/or the service accept message.

Next, the UE_A 10 further performs 51st processing, based on reception of the RRC connection reconfiguration message and/or the service accept message (S1412). Note that the UE_A 10 may perform the 51st processing, based on transmission of the RRC connection reconfiguration complete message, or may perform the 51st processing, based on completion of the present procedure.

Next, the UE_A 10 transmits an RRC connection reconfiguration complete message to the NR node_A 122, based on reception of the RRC connection reconfiguration message and/or the service accept message, and/or completion of the 51st processing. Next, the NR node_A 122 receives the RRC connection reconfiguration complete message, and completes the user data connection establishment procedure performed between the NR node_A 122 and the UE_A 10.

Next, the user data connection establishment procedure performed between the N3IWF_A 128 and the UE_A 10 will be described. The N3IWF_A 128 transmits an IKE create child SA request (IKE Create_Child_SA request) message to the UE_A 10, and thereby initiates the user data connection establishment procedure.

Here, the N3IWF_A 128 may transmit the IKE create child SA request message including a PDU session ID, or may transmit the IKE create child SA request message including a PDU session ID so as to establish connection for transmission and/or reception of user data associated with a PDU session indicated by the PDU session ID.

Next, the UE_A 10 receives the IKE create child SA request message. The UE_A 10 receives the IKE create child SA request message to recognize contents of various pieces of identification information included in the IKE create child SA request message.

Next, the UE_A 10 transmits an IKE create child SA response (IKE Create_Child_SA response) message, based on reception of the IKE create child SA request message. Next, the N3IWF_A 128 receives the IKE create child SA response message, and completes the user data connection establishment procedure performed between the N3IWF_A 128 and the UE_A 10.

Note that, in a case that multiple PDU sessions are established, the user data connection establishment procedure may be performed for each of the PDU sessions within the single service request procedure. Note that, in a case of being transmitted, the IKE create child SA request message that is transmitted by the N3IWF_A 128 includes PDU session IDs of respective PDU sessions.

Further, the N3IWF_A 128 may transmit the IKEv2 message including the service accept message to the UE_A 10, based on completion of all the user data connection establishment procedures. Here, the service accept message may be a message received from the AMF_240, and may be a message indicating completion of the present procedure. Further, in a case that the N3IWF_A 128 transmits the IKEv2 message including the service accept message, the UE_A 10 may receive the IKEv2 message, or may receive the service accept message included in the IKEv2 message. Further, in a case that the UE_A 10 receives the IKEv2 message including the service accept message, and/or the service accept message, the UE_A 10 may perform the 51st processing (S1412). Note that the UE_A 10 may perform the 51st processing, based on transmission of a response message to the IKEv2 message including the service accept message, or may perform the 51st processing, based on completion of the present procedure.

Here, the 51st processing may be processing in which the UE_A 10 recognizes matters indicated by the AMF_A 240. Further, the 51st processing may be processing in which the UE_A 10 stores received identification information as a context, or may be processing in which the UE_A 10 forwards received identification information to a higher layer and/or a lower layer. Further, the 51st processing may be processing in which the UE_A 10 receives a notification from a higher layer and/or a lower layer, or may be processing in which the UE_A 10 recognizes such a received notification. Further, the 51st processing may be processing in which the UE_A 10 recognizes that the present procedure has been completed, based on the received notification. Further, the 51st processing may be processing in which the UE_A 10 recognizes that the request of the present procedure has been accepted.

Further, the 51st processing may be processing in which the UE_A 10 establishes connection for transmission and/or reception of user data, or may be processing in which the UE_A 10 establishes UP resources. Further, the 51st processing may be processing in which the UE_A 10 notifies the higher layer of information indicating that connection for transmission and/or reception of user data, and/or UP resources have been established, based on establishment of the connection for transmission and/or reception of user data, and/or UP resources. Further, the 51st processing may be processing in which the UE_A 10 receives a notification from the lower layer, indicating that connection for transmission and/or reception of user data, and/or UP resources have been established. Further, the 51st processing may be processing for allowing the UE_A 10 to transition to the 3rd state, or may be processing in which the UE_A 10 determines to transition to the 3rd state. Note that the 51st processing may not be limited to the processing described above.

Next, the NR node_A 122 or the N3IWF_A 128 transmits an N2 request response message to the AMF_A 240, based on completion of the user data connection establishment procedure, and/or transmission of the IKEv2 message including the service accept message (S1416). Next, the AMF_A 240 receives the N2 response message.

The AMF_A 240 may transmit and/or receive an N11 message to and/or from the SMF_A 230, based on reception of the N2 response message (S1418) and (S1422). Further, in a case that the SMF_A 230 receives the N11 message, the SMF_A 230 may select the UPF_A 235, and may transmit and/or receive an N4 message to and/or from the selected UPF_A 235, based on reception of the N11 message (S1420). Note that the AMF_A 240 may determine whether or not to transmit and/or receive the N11 message to and/or from the SMF_A 230, in a similar manner to the 54th condition determination.

Here, the SMF_A 230 may include one or multiple PDU session IDs in the N4 message, or may indicate that target PDU session(s) is one or multiple PDU sessions identified by PDU session ID(s) by including these PDU session IDs. Further, the SMF_A 230 may transmit the N4 message, so as to indicate establishment of UP resources associated with a PDU session. Further, the UPF_A 235 may establish UP resources associated with a PDU session, based on reception of the N4 message.

Note that each of the RRC connection reconfiguration message and the RRC connection reconfiguration complete message may be an RRC message, and/or may be a message for establishing radio bearers associated with a PDU session. Further, each of the IKE create child SA request message and the IKE create child SA response message may be an IKEv2 message, and/or may be a message for creating IKEv2 child SA associated with a PDU session and/or for establishing an IPSec tunnel. Further, each of the N2 request message and the N2 request response message may be a message transmitted and/or received on the N2 interface.

Each apparatus completes the procedure of (A) in the present procedure, based on transmission and/or reception of the service accept message, anchor transmission and/or reception of the RRC connection reconfiguration complete message, and/or transmission and/or reception of the IKEv2 message, and/or transmission and/or reception of the N2 request response message, and/or transmission and/or reception of the PDU session update response message, and/or transmission and/or reception of the N4 message. Further, the UE_A 10 may complete the procedure of (A) in the present procedure, not based on reception of the service accept message but based on a notification from the lower layer, indicating that radio bearers and/or UP resources for transmitting and/or receiving user data have been established.

Next, steps performed in a case that the 51st condition determination is false, i.e., steps of the procedure of (B) in the present procedure, will be described. The AMF_A 240 transmits a Service Reject message to the UE_A 10 via the NR node_A 122 or the N3IWF_A 128 (S1424), and thereby initiates the procedure of (B) in the present procedure. Here, the service reject message may be transmitted as a response message to the service request message. The service reject message is a NAS message transmitted and/or received on the N1 interface. For example, the AMF_A 240 may transmit the service reject message as an N2 interface control message to the NR node_A 122 or the N3IWF_A 128, and the NR node_A 122 or the N3IWF_A 128 that has received the service reject message may transmit the RRC message including the received service reject message to the UE_A 10 or transmit the IKEv2 message including the received service reject message to the UE_A 10. The service reject message transmitted by the AMF_A 240 is not limited to the service reject message described above, and only needs to be a message for rejecting the request of the UE_A 10.

Here, the AMF_A 240 may include the 31st identification information in the service reject message, or may indicate that the request of the UE_A 10 has been rejected by including the identification information. Further, the AMF_240 may transmit the service reject message including the 31st identification information, so as to indicate a cause why the request of the UE_A 10 has been rejected.

Specifically, the AMF_A 240 may transmit the service reject message including the 31st identification information, so as to indicate that the request for establishment of UP resources associated with a PDU session has been rejected, or may indicate that establishment of UP resources associated with a PDU session is not allowed.

Note that the matters indicated by transmission of each of the pieces of identification information from the AMF_A 240 may not be limited to those matters described above. Further, the AMF_A 240 may determine whether or not to include the 31st identification information in the service reject message, based on a state of the UE_A 10, and/or a state of the apparatus in the core network, and/or received identification information, and/or capability information of the network, and/or a policy such as an operator policy, and/or a state of the network.

For example, the 31st identification information may be information transmitted in a case that the network does not allow establishment of UP resources associated with a PDU session indicated by the 21st identification information. More specifically, the 31st identification information may be information transmitted in a case that the network does not allow establishment of UP resources associated with a PDU session indicated by the 21st identification information in the TA to which the UE_A 10 currently belongs, and/or in a case that the network temporarily does not allow establishment of UP resources associated with a PDU session indicated by the 21st identification information due to network congestion, a state of the network slice instance, or the like. Note that the determination performed by the AMF_A 240 as to which piece of identification information is to be included in the service reject message is not limited to the determination described above.

The UE_A 10 receives the service reject message. The UE_A 10 performs 52nd processing, based on reception of the service reject message (S1426). The UE_A 10 may perform the 52nd processing, based on completion of the present procedure.

Here, the 52nd processing may be processing in which the UE_A 10 recognizes matters indicated by the AMF_A 240. Further, the 52nd processing may be processing in which the UE_A 10 stores received identification information as a context, or may be processing in which the UE_A 10 forwards received identification information to a higher layer and/or a lower layer. Further, the 52nd processing may be processing in which the UE_A 10 receives a notification from a higher layer and/or a lower layer, or may be processing in which the UE_A 10 recognizes such a received notification. Further, the 52nd processing may be processing in which the UE_A 10 recognizes that the present procedure has been completed, based on the received notification. Further, the 52nd processing may be processing in which the UE_A 10 recognizes that the request of the present procedure has been rejected, or may be processing in which the UE_A 10 recognizes a cause why the request of the present procedure has been rejected.

Further, in a case that the UE_A 10 receives the 31st identification information, the 52nd processing may be processing in which the UE_A 10 recognizes that establishment of UP resources associated with a PDU session is not allowed, based on the received identification information. More specifically, in a case that the UE_A 10 receives the 31st identification information, the 52nd processing may be processing in which the UE_A 10 recognizes that the establishment of the UP resources is not allowed due to inappropriateness of the TA to which the UE_A 10 currently belongs, or may be processing in which the UE_A 10 recognizes that the establishment of the UP resources is not allowed due to the location outside of the LADN service area.

Further, in a case that the UE_A 10 receives the 31st identification information, the 52nd processing may be processing in which the UE_A 10 recognizes that establishment of UP resources is not allowed due to temporary unavailability of the network slice instance, or may be processing in which the UE_A 10 recognizes that establishment of UP resources is not allowed due to core network congestion and/or access network congestion.

Further, in a case that the UE_A 10 recognizes that the establishment of the UP resources is not allowed, the 52nd processing may be processing in which the UE_A 10 recognizes that the service request message indicating the same request cannot be transmitted on the same condition. Specifically, in a case that the UE_A 10 recognizes that establishment of UP resources is not allowed due to inappropriateness of the TA to which the UE_A 10 currently belongs and/or due to location outside of the LADN service area, the 52nd processing may be processing in which the UE_A 10 recognizes that the UE_A 10 cannot transmit the service request message indicating the same request in the same TA and/or cell.

Further, in a case that the UE_A 10 recognizes that establishment of UP resources is not allowed due to temporary unavailability of the network slice instance and/or due to core network congestion and/or access network congestion, the 52nd processing may be processing in which the UE_A 10 recognizes that the UE_A 10 cannot transmit the service request message indicating the same request in the same TA and/or cell for a certain period of time. Note that the certain period of time may be a period of time before the expiration of the timer. In other words, in this case, the UE_A 10 may transmit the service request message indicating the same request after the expiration of the timer. Note that the 52nd processing may not be limited to the processing described above.

Further, the UE_A 10 may receive the service reject message to recognize that the request of the UE_A 10 has been rejected. Each apparatus completes the procedure of (B) in the present procedure, based on transmission and/or reception of the service reject message.

Each apparatus completes the present procedure, based on completion of the procedure of (A) or (B) in the present procedure. Note that each apparatus may transition to the connected state, based on completion of the procedure of (A) in the present procedure, or may maintain the disconnected state or the connected state, based on completion of the procedure of (B) in the present procedure. Each apparatus may transition to each state, based on completion of the present procedure.

Further, each apparatus may establish radio bearers for transmitting and/or receiving user data, may establish UP connection associated with a PDU session, or may transition to a state in which radio bearers for transmitting and/or receiving user data and/or UP connection associated with a PDU session has been established, based on completion of the procedure of (A) in the present procedure.

Further, each apparatus may perform processing that is based on the identification information transmitted and/or received in the present procedure, based on completion of the present procedure. In other words, the UE_A 10 may perform the 51st processing, or may perform the 52nd processing, based on completion of the present procedure.

The 51st condition determination may be performed based on identification information included in the service request message, and/or subscription information, and/or an operator policy. For example, the 51st condition determination may be true in a case that the network allows the request of the UE_A 10. The 51st condition determination may be false in a case that the network does not allow the request of the UE_A 10. Further, the 51st condition determination may be true in a case that a registration destination network of the UE_A 10 and/or an apparatus in a network supports a function requested by the UE_A 10; otherwise, the 51st condition determination may be false. Further, the 51st condition determination may be true in a case that it is determined that the network is in a congested state, and may be false in a case that it is determined that the network is not in a congested state. Note that conditions for determining true or false of the 51st condition determination need not be limited to the conditions described above.

The 54th condition determination may be performed based on whether or not the AMF_A 240 has received information for identifying a PDU session, or may be performed based on whether or not the service request message includes information for identifying a PDU session. For example, the 54th condition determination may be true in a case that the AMF_A 240 receives information for identifying a PDU session and/or in a case that the service request message includes information for identifying a PDU session, and may be false in a case that the AMF_A 240 does not receive information for identifying a PDU session and/or in a case that the service request message does not include information for identifying a PDU session. Note that conditions for determining true or false of the 54th condition determination need not be limited to the conditions described above.

1.4.8. Overview of Network-Initiated Service Request Procedure

Next, an overview of a network-initiated Service request procedure will be described. The network-initiated service request procedure is hereinafter also referred to as the present procedure. The network-initiated service request procedure is a procedure initiated by the apparatus in the core network so as to establish N1 interface connectivity and/or UP connection. The apparatus in the core network can perform the present procedure at any timing, on the condition that the UE_A 10 is registered with the network. In other words, the apparatus in the core network may initiate the present procedure at any timing, on the condition that the UE_A 10 is in the registered state (RM-REGISTERED state and/or 5GMM-REGISTERED state). In still other words, the apparatus in the core network may initiate the present procedure with the UE_A 10 being in the connected state (5GMM-CONNECTED state and/or CM-CONNECTED state).

Further, the apparatus in the core network may initiate the present procedure in a case that there is a pending NAS message to be transmitted, or may initiate the present procedure in a case that there is pending user data to be transmitted. Further, the apparatus in the core network may initiate the present procedure, based on network configuration and/or an operator policy, or may initiate the present procedure, based on a trigger other than reception of a request message from the UE_A 10.

Note that the trigger other than reception of a request message from the UE_A 10 may be detection of mobility of the UE_A 10, may be detection of a change in the state of the UE_A 10 and/or the access network and/or the core network, or may be a change in the state of the network slice. Further, the trigger other than reception of a request message from the UE_A 10 may be reception of a request from the application server of the DN_A 5, may be a change in the network configuration, or may be a change in the operator policy. Further, the trigger other than reception of a request message from the UE_A 10 may be expiration of a started timer. Note that the trigger that causes the apparatus in the core network to initiate the present procedure is not limited to those triggers described above.

Each apparatus may establish N1 interface connectivity, based on completion of the present procedure, or may transmit and/or receive the NAS message by using the established N1 interface. Further, each apparatus may establish UP connection, based on completion of the present procedure, or may transmit and/or receive user data by using the established UP connection. Further, each apparatus may transition to the connected state, based on completion of the present procedure.

1.4.8.1. Example of Network-Initiated Service Request Procedure

Figure 15:
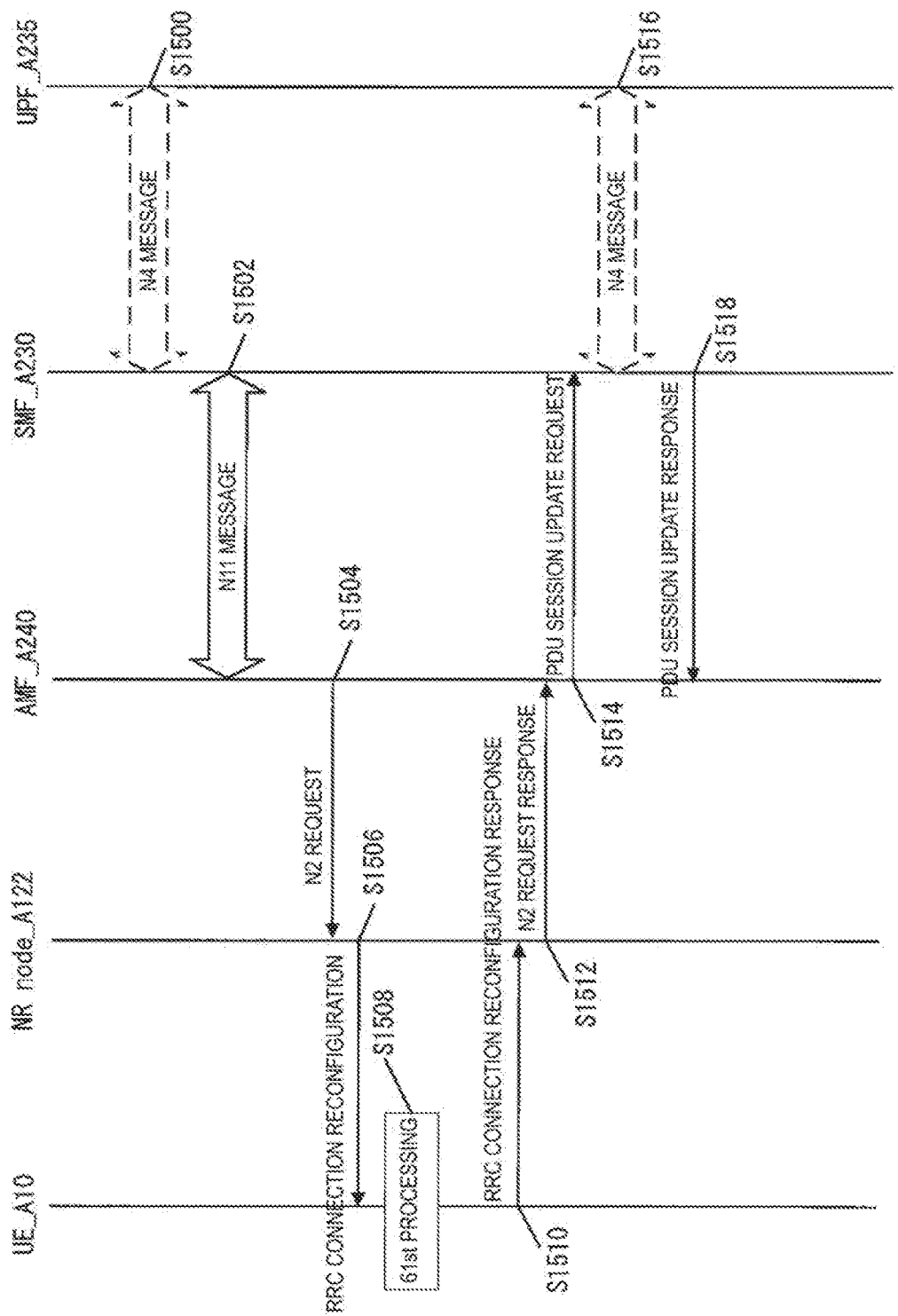
FIG. 15 is a diagram illustrating a network-initiated service request procedure.

With reference to FIG. 15, an example of a process for performing a network-initiated service request procedure will be described. In this section, the present procedure refers to the network-initiated service request procedure. Each step of the present procedure will be described below.

First, the SMF_A 230 transmits and/or receives an N11 message to and/or from the AMF_A 240 (S1502), and thereby initiates the network-initiated service request procedure. Note that the SMF_A 230 may initiate transmission and/or reception of the N11 message, based on the N4 message transmitted and/or received to and/or from the UPF_A 235 (S1500), or may initiate transmission and/or reception of the N11 message, irrespective of transmission and/or reception of the N4 message.

Here, the N11 message may be a message transmitted and/or received on the N11 interface. Further, the N4 message may be a message transmitted and/or received on the N4 interface.

Next, the AMF_A 240 transmits an N2 request message to the NR node_A 122, based on transmission and/or reception of the N11 message to and/or from the SMF_A 230 (S1504). The NR node_A 122 receives the N2 request message, and transmits an RRC connection reconfiguration message to the UE_A 10 (S1506).

The UE_A 10 receives the RRC connection reconfiguration message. The UE_A 10 receives the RRC connection reconfiguration message to recognize contents of various pieces of identification information included in the RRC connection reconfiguration message.

The UE_A 10 further performs 61st processing, based on reception of the RRC connection reconfiguration message and/or the service accept message (S1508). Note that the UE_A 10 may perform the 61st processing, based on transmission of the RRC connection reconfiguration complete message, or may perform the 61st processing, based on completion of the present procedure.

Here, the 61st processing may be processing in which the UE_A 10 recognizes matters indicated by the AMF_A 240. Further, the 61st processing may be processing in which the UE_A 10 stores received identification information as a context, or may be processing in which the UE_A 10 forwards received identification information to a higher layer and/or a tower layer. Further, the 61st processing may be processing in which the UE_A 10 receives a notification from a higher layer and/or a lower layer, or may be processing in which the UE_A 10 recognizes such a received notification. Further, the 61st processing may be processing in which the UE_A 10 recognizes that the present procedure has been completed, based on the received notification. Further, the 61st processing may be processing in which the UE_A 10 recognizes that the request of the present procedure has been accepted.

Further, the 61st processing may be processing in which the UE_A 10 establishes radio bearers transmitting and/or receiving user data, or may be processing in which the UE_A 10 establishes UP resources. Further, the 61st processing may be processing in which the UE_A 10 notifies the higher layer information indicating that radio bearers and/or UP resources for transmitting and/or receiving user data have been established, based on establishment of the radio bearers and/or the UP resources for transmitting and/or receiving user data. Further, the 61st processing may be processing in which the UE_A 10 receives a notification from the lower layer, indicating that radio bearers and/or UP resources for transmitting and/or receiving user data have been established. Further, the 61st processing may be processing for allowing the UE_A 10 to transition to the 3rd state, or may be processing in which the UE_A 10 determines to transition to the 3rd state. Note that the 61st processing may not be limited to the processing described above.

Next, the UE_A 10 transmits an RRC connection reconfiguration complete message to the NR node_A 122, based on reception of the RRC connection reconfiguration message and/or completion of the 61st processing (S1510). Further, the NR node_A 122 receives the RRC connection reconfiguration complete message, and transmits an N2 request response message to the AMF_A 240 (S1512). Further, the AMF_A 240 receives the N2 response message.

The AMF_A 240 may transmit and/or receive an N11 message to and/or from the SMF_A 230, based on reception of the N2 response message (S1514) and (S1518). Further, in a case that the SMF_A 230 receives the N11 message, the SMF_A 230 may select the UPF_A 235, and may transmit and/or receive an N4 message to and/or from the selected UPF_A 235, based on reception of the N11 message (S1516).

Here, the SMF_A 230 may include one or multiple PDU session IDs in the N4 message, or may indicate that target PDU session(s) is one or multiple PDU sessions identified by PDU session ID(s) by including these PDU session IDs. Further, the SMF_A 230 may transmit the N4 message, so as to indicate establishment of UP resources associated with a PDU session. Further, the UPF_A 235 may establish UP resources associated with a PDU session, based on reception of the N4 message.

Note that each of the RRC connection reconfiguration message and the RRC connection reconfiguration complete message may be an RRC message, and/or may be a message for establishing radio bearers associated with a PDU session. Further, each of the N2 request message and the N2 request response message may be a message transmitted and/or received on the N2 interface. Further, the N11 message may be a message transmitted and/or received on the N11 interface. For example, the N11 message transmitted from the AMF_A 240 to the SMF_A 230 may be a PDU Session Update Request message, and the N11 message transmitted from the SMF_A 230 to the AMF_A 240 may be a PDU Session Update Response message.

Each apparatus completes the present procedure, based on transmission and/or reception of the RRC connection reconfiguration complete message, and/or transmission and/or reception of the N2 request response message, and/or transmission and/or reception of the PDU session update response message, and/or transmission and/or reception of the N4 message. Further, the UE_A 10 may complete the present procedure, based on a notification from the lower layer, indicating that radio bearers and/or UP resources for transmitting and/or receiving user data have been established.

Note that each apparatus may transition to the connected state, based on completion of the present procedure. Further, each apparatus may establish radio bearers for transmitting and/or receiving user data, may establish UP connection associated with a PDU session, or may transition to a state in which radio bearers for transmitting and/or receiving user data and/or UP connection associated with a PDU session has been established, based on completion of the present procedure.

Further, each apparatus may perform processing that is based on the identification information transmitted and/or received in the present procedure, based on completion of the present procedure. In other words, the UE_A 10 may perform the 61st processing, based on completion of the present procedure.

1.4.9. Overview of Network-Initiated UP Connection Establishment Procedure

Next, an overview of a network-initiated UP connection establishment procedure will be described. The network-initiated UP connection establishment procedure is hereinafter also referred to as the present procedure. The network-initiated UP connection establishment procedure is a procedure initiated by the apparatus in the core network so as to establish N1 interface connectivity and/or UP connection. The apparatus in the core network can perform the present procedure at any timing, on the condition that the UE_A 10 is registered with the network. In other words, the apparatus in the core network may initiate the present procedure at any timing, on the condition that the UE_A 10 is in the registered state (RM-REGISTERED state and/or 5GMM-REGISTERED state). In still other words, the apparatus in the core network may initiate the present procedure with the UE_A 10 being in the disconnected state (5GMM-IDLE state and/or CM-IDLE state), or may initiate the present procedure with the UE_A 10 being in the connected state (5GMM-CONNECTED state and/or CM-CONNECTED state).

Further, the apparatus in the core network may initiate the present procedure in a case that there is a pending NAS message to be transmitted, or may initiate the present procedure in a case that there is pending user data to be transmitted. Further, the apparatus in the core network may initiate the present procedure, based on network configuration and/or an operator policy, or may initiate the present procedure, based on a trigger other than reception of a request message from the UE_A 10. Note that the pending NAS message and/or user data to be transmitted may be a message scheduled to be transmitted via 3GPP access, or may be a message scheduled to be transmitted via non-3GPP access.

Note that the trigger other than reception of a request message from the UE_A 10 may be detection of mobility of the UE_A 10, may be detection of a change in the state of the UE_A 10 and/or the access network and/or the core network, or may be a change in the state of the network slice. Further, the trigger other than reception of a request message from the UE_A 10 may be reception of a request from the application server of the DN_A 5, may be a change in the network configuration, or may be a change in the operator policy. Further, the trigger other than reception of a request message from the UE_A 10 may be expiration of a started tinier. Note that the trigger that causes the apparatus in the core network to initiate the present procedure is not limited to those triggers described above.

Each apparatus may establish N1 interface connectivity, based on completion of the present procedure, or may transmit and/or receive the NAS message by using the established N1 interface. Further, each apparatus may establish UP connection, based on completion of the present procedure, or may transmit and/or receive user data by using the established UP connection. Further, each apparatus may transition to the connected state, based on completion of the present procedure.

1.4.9.1. Example of Network-Initiated UP Connection Establishment Procedure

Figure 16:
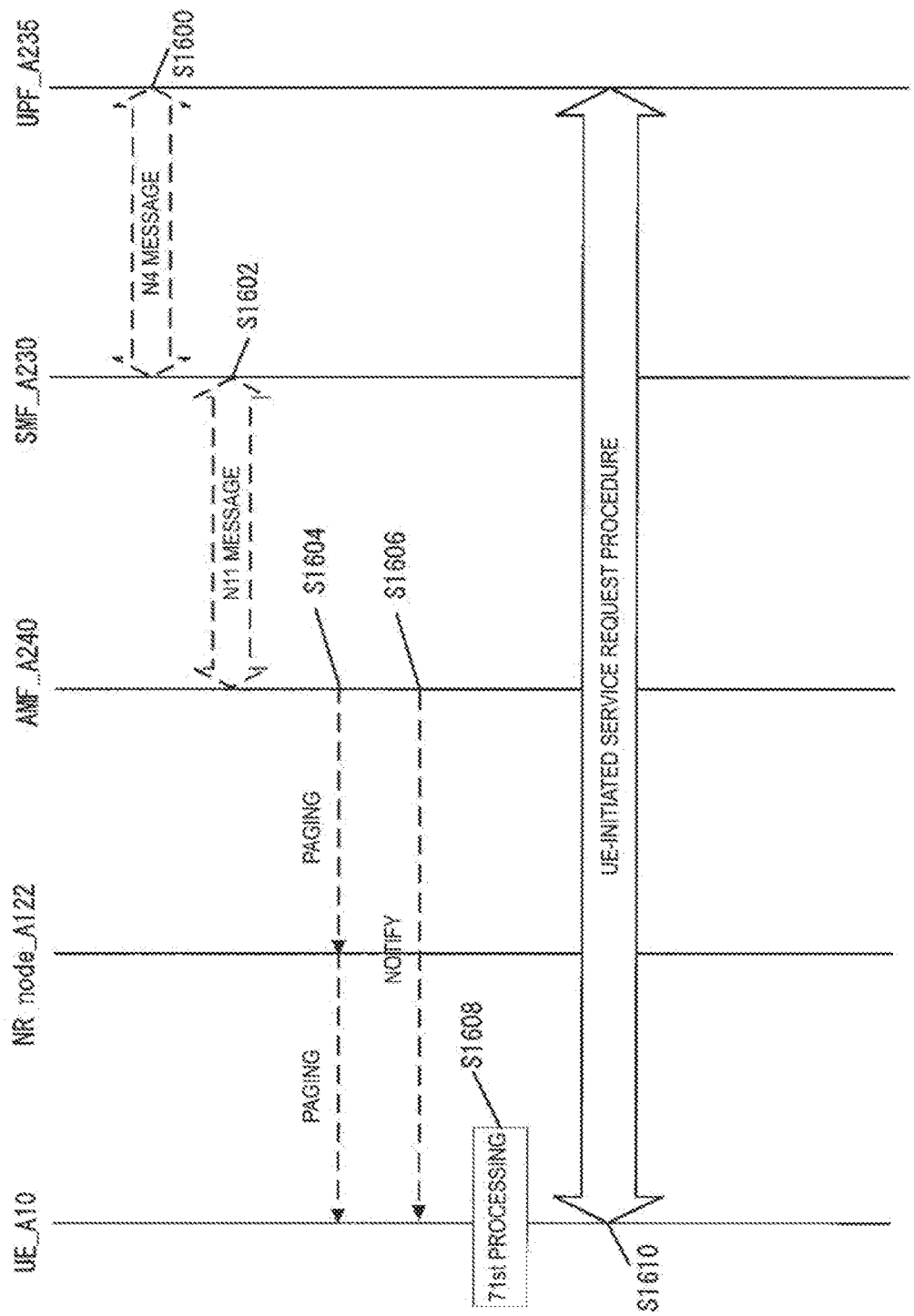
FIG. 16 is a diagram illustrating a network-initiated UP connection establishment procedure.

With reference to FIG. 16, an example of a process for performing a network-initiated UP connection establishment procedure will be described. In this section, the present procedure refers to the network-initiated UP connection establishment procedure. Each step of the present procedure will be described below.

First, the SMF_A 230 transmits and/or receives an N11 message to and/or from the AMF_A 240 (S1602), and thereby initiates the network-initiated UP connection establishment procedure. Note that the SMF_A 230 may initiate transmission and/or reception of the N11 message, based on the N4 message transmitted and/or received to and/or from the UPF_A 235 (S1600), or may initiate transmission and/or reception of the N11 message, irrespective of transmission and/or reception of the N4 message.

Here, the N11 message may be a message transmitted and/or received on the N11 interface. Further, the N4 message may be a message transmitted and/or received on the N4 interface.

Next, in a case that the UE_A 10 is in the disconnected state, the AMF_A 240 transmits a paging message to the NR node_A 122, based on transmission and/or reception of the N11 message to and/or from the SMF_A 230 (S1604). The NR node 122 receives the paging message, and transmits the paging message to the UE_A 10 (S1606).

In a case that the UE_A 10 is in the connected state, the AMF_A 240 transmits a Notification message to the UE_A 10 via the NR node_A 122, based on transmission and/or reception of the N11 message to and/or from the SMF_A 230 (S1606). Note that the notification message is a NAS message transmitted and/or received on the N1 interface. For example, the AMF_A 240 may transmit the notification message as an N2 interface control message to the NR node_A 122, and the NR node_A 122 that has received the notification message may transmit the RRC message including the received notification message to the UE_A 10. Further, the notification message may be a NAS message transmitted and/or received on the N1 interface. The notification message is not limited to the notification message described above, and only needs to be a message indicating necessity of initiation of the UE-initiated service request procedure.

Here, the AMF_A 240 and/or the NR node_A 122 may include the 11th identification information and/or the 12th identification information in the paging message and/or the notification message, or may indicate a request of the apparatus in the core network by including these pieces of identification information. Note that two or more pieces of identification information out of these pieces of identification information may be configured as one or more pieces of identification information.

Further, the AMF_A 240 and/or the NR node_A 122 may transmit the paging message and/or the notification message including the 11th identification information and/or the 12th identification information, so that the UE_A 10 requests initiation of the UE-initiated service request procedure to establish UP resources associated with a PDU session.

More specifically, the AMF_A 240 and/or the NR node_A 122 may transmit the paging message and/or the notification message including the 11th identification information, so as to indicate that all indicated by the 11th identification information and established via the access network requests establishment of UP resources associated with a PDU session for the PDU session, or so that the UE_A 10 requests initiation of the UE-initiated service request procedure for fulfilling the request. Further, the AMF_A 240 and/or the NR node_A 122 may transmit the paging message and/or the notification message including the 12th identification information, so as to request establishment of UP resources associated with PDU session(s) for one or multiple PDU sessions indicated by the 12th identification information, or so that the UE_A 10 requests initiation of the UE-initiated service request procedure for fulfilling the request.

Further, the AMF_A 240 and/or the NR node_A 122 may transmit the paging message and/or the notification message including the 11th identification information indicating 3GPP access, so that the UE_A 10 requests initiation of the UE-initiated service request procedure via 3GPP access. Further, the AMF_A 240 and/or the NR node_A 122 may transmit the paging message including the 11th identification information indicating non-3GPP access, so that the UE_A 10 requests initiation of the UE-initiated service request procedure via non-3GPP access.

Further, the AMF_A 240 may transmit two or more pieces of identification information out of the 11th identification information and the 12th identification information in combination, so as to make a request combining the matters described above. Note that the matters indicated by transmission of each of the pieces of identification information from the AMF_A 240 and/or the NR node_A 122 may not be limited to those matters described above.

Note that the AMF_A 240 may determine whether or not which piece of identification information out of the 11th identification information and the 12th identification information is to be included in the Registration Accept message, based on received identification information, and/or capability information of the network, and/or an operator policy, and/or a state of the network, and/or registration information of a user (user subscription), and/or a type of the access network, and/or the like.

For example, in a case that the PDU session with which establishment of UP resources is requested is established via 3GPP access or non-3GPP access, the 11th identification information may be the information to be transmitted. Further, in a case that the PDU session with which establishment of UP resources is requested is established via 3GPP access, the 12th identification information may be the information to be transmitted. Note that the determination performed by the AMF_A 240 as to which piece of identification information is to be included in the Registration Accept message is not limited to the determination described above.

The UE_A 10 receives the paging message and/or the notification message. The UE_A 10 receives the paging message and/or the notification message to recognize contents of various pieces of identification information included in the paging message and/or the notification message.

The UE_A 10 further performs 71st processing, based on reception of the paging message and/or the notification message (S1608). Note that the UE_A 10 may perform the 71st processing, based on initiation of the UE-initiated service request procedure, or may perform the 71st processing, based on completion of the present procedure.

Here, the 71st processing may be processing in which the UE_A 10 recognizes matters indicated by the apparatus in the core network and/or the apparatus in the access network. Further, the 71st processing may be processing in which the UE_A 10 stores received identification information as a context, or may be processing in which the UE_A 10 forwards received identification information to a higher layer and/or a lower layer. Further, the 71st processing may be processing in which the UE_A 10 receives a notification from a higher layer and/or a lower layer, or may be processing in which the UE_A 10 recognizes such a received notification. Further, the 71st processing may be processing in which the UE_A 10 recognizes that the present procedure has been completed, based on the received notification.

Further, the 71st processing may be processing in which the UE_A 10 determines to initiate the UE-initiated service request procedure, or may be processing in which the UE_A 10 initiates the UE-initiated service request procedure. Further, the 71st processing may be processing in which the UE_A 10 notifies the higher layer of information indicating necessity of initiation of the UE-initiated service request procedure. Further, the 71st processing may be processing in which a notification indicating necessity of initiation of the UE-initiated service request procedure is received from the lower layer. Further, the 71st processing may be processing in which the UE_A 10 initiates the UE-initiated service request procedure, based on information indicating necessity of initiation of the UE-initiated service request procedure that is notified from the lower layer.

Further, in a case that the UE_A 10 receives the 11th identification information, the 71st processing may be processing in which the UE_A 10 recognizes reception of a request from the network that establishes UP resources associated with a PDU session established via the access network identified by the 11th identification information, or may be processing in which the UE_A 10 initiates the UE-initiated service request procedure to establish the UP resources.

Further, in a case that the UE_A 10 receives the 12th identification information, the 71st processing may be processing in which the UE_A 10 recognizes reception of a request from the network that establishes UP resources associated with a PDU session identified by the 12th identification information, or may be processing in which the UE_A 10 initiates the UE-initiated service request procedure to establish the UP resources.

Further, as the 71st processing, the UE_A 10 may transmit the service request message including information for identifying one or multiple PDU sessions established via the access network identified by the 11th identification information and/or information for identifying one or multiple PDU sessions identified by the 12th identification information, as the 21st identification information.

Further, as the 71st processing, in a case that the UE_A 10 receives the paging message and/or the 11th identification information, the UE_A 10 may initiate the UE-initiated service request procedure in the disconnected state. Further, in a case that the UE_A 10 receives the notification message and/or the 12th identification information, the UE_A 10 may initiate the UE-initiated service request procedure in the connected state.

Further, in a case that the UE_A 10 receives the 11th identification information, the 71st processing may be processing in which the UE_A 10 selects and determines the access network to be used to perform the UE-initiated service request procedure, and may processing in which the UE_A 10 initiates the UE-initiated service request procedure via the determined access network, based on the 11th identification information. Specifically, in a case that the UE_A 10 receives the 11th identification information indicating 3GPP access, as the 71st processing, the UE_A 10 may initiate the UE-initiated service request procedure via 3GPP access. Further, in a case that the UE_A 10 receives the 11th identification information indicating non-3GPP access, as the 71st processing, the UE_A 10 may initiate the UE-initiated service request procedure via non-3GPP access. Note that the 71st processing may not be limited to the processing described above.

Next, the UE_A 10 initiates the UE-initiated service request procedure, based on reception of the paging message and/or the notification message and/or completion of the 71st processing (S1610). In other words, the UE_A 10 transmits a Service Request message to the AMF_A 240, based on reception of the paging message and/or the notification message and/or completion of the 71st processing. Note that the details of the UE-initiated service request procedure are described in another section, and thus description thereof is herein omitted.

Each apparatus completes the present procedure, based on completion of the UE-initiated service request procedure. Further, the UE_A 10 may complete the present procedure, based on a notification from the lower layer, indicating that radio bearers and/or UP resources for transmitting and/or receiving user data have been established.

Note that each apparatus may transition to the connected state, based on completion of the present procedure. Further, each apparatus may establish radio bearers for transmitting and/or receiving user data, may establish UP connection associated with a PDU session, or may transition to a state in which radio bearers for transmitting and/or receiving user data and/or UP connection associated with a PDU session has been established, based on completion of the present procedure.

Further, each apparatus may perform processing that is based on the identification information transmitted and/or received in the present procedure, based on completion of the present procedure. In other words, the UE_A 10 may perform the 71st processing, based on completion of the present procedure.

1.5. Transmission and/or Reception of User Data 1.5.1. Transmission and/or Reception of User Data of Uplink Packet Next, the flow of transmission and/or reception of user data of uplink packets will be described. First, the UE_A 10 receives user data from the higher layer. Based on reception of the user data from the higher layer, the UE_A 10 determines processing to be performed, based on a state of the UE_A 10.

More specifically, in a case that the UE_A 10 is in the connected state and is also in any state of the 1st state, the 3rd state, and the 41st to 46th states, the UE_A 10 may transmit the user data to the DN_A 5 and/or the application server in the DN_A 5 by using a corresponding PDU session, based on reception of the user data from the higher layer.

Further, in a case that the UE_A 10 is in the connected state and is also in any state of the 31st to 33rd states, the UE_A 10 may temporarily store the received user data, or may perform the UE-initiated service request procedure to establish UP resources associated with a PDU session, based on reception of the user data from the higher layer. Further, the UE_A 10 may transmit the user data to the DN_A 5 and/or the application server in the DN_A 5 by using a corresponding PDU session, based on establishment of UP resources associated with a PDU session.

Further, in a case that the UE_A 10 is in the disconnected state and is also in any state of the 2nd state and the 31st to 33rd states, the UE_A 10 may temporarily store the received user data, or may perform the UE-initiated service request procedure to establish UP resources associated with a PDU session, based on reception of the user data from the higher layer. Further, the UE_A 10 may transmit the user data to the DN_A 5 and/or the application server in the DN_A 5 by using a corresponding PDU session, based on establishment of UP resources associated with a PDU session.

Further, in a case that the UE_A 10 is in any state of the 34th to 36th states, the UE_A 10 may temporarily store the received user data, or may indicate that the UE_A 10 temporarily cannot transmit the user data to the higher layer, based on reception of the user data from the higher layer. Further, in this case, the UE_A 10 may perform a procedure for releasing a corresponding PDU session. Note that the operation of the UE_A 10 in response to reception of the user data from the higher layer may not be limited to those operations described above.

Next, in a case that the UE_A 10 transmits the user data, the DN_A 5 and/or the application server included in the DN_A 5 receives the user data from the UE_A 10 via the UPF_A 235. Through the above operation, each apparatus completes transmission and/or reception of user data of uplink packets.

1.5.2. Transmission and/or Reception of User Data of Downlink Packet

Next, the flow of transmission and/or reception of user data of downlink packets will be described. First, the UPF_A 235 receives user data from the DN_A 5 and/or the application server included in the DN_A 5. Based on reception of the user data from the DN_A 5 and/or the application server included in the DN_A 5, the SMF_A 230 determines processing to be performed, based on a state of the UE_A 10 and/or the apparatus in the core network.

More specifically, in a case that the UE_A 10 and/or the apparatus in the core network is in the connected state and is also in any state of the 1st state, the 3rd state, and the 41st to 46th states, the UPF_A 235 may transmit the user data to the UE_A 10 by using a corresponding PDU session, based on reception of the user data from the DN_A 5 and/or the application server included in the DN_A 5.

Further, in a case that the UE_A 10 and/or the apparatus in the core network is in the connected state and is also in any state of the 31st state, the 32nd state, the 34th state, and the 35th state, the UPF_A 235 may temporarily store the received user data, or the apparatus in the core network may perform the network-initiated service request procedure to establish UP resources associated with a PDU session, based on reception of the user data from the DN_A 5 and/or the application server included in the DN_A 5. Further, in a case that the UE_A 10 and/or the apparatus in the core network is in the connected state and is also in any state of the 31st state, the 33rd state, the 34th state, and the 36th state, the UPF_A 235 may temporarily store the received user data, or the apparatus in the core network may perform the network-initiated UP connection establishment procedure to establish UP resources associated with a PDU session, based on reception of the user data from the DN_A 5 and/or the application server included in the DN_A 5. Further, the UPF_A 235 may transmit the user data to the UE_A 10 by using a corresponding PDU session, based on establishment of UP resources associated with a PDU session.

Further, in a case that the UE_A 10 and/or the apparatus in the core network is in the disconnected state and is also in any state of the 2nd state, the 31st state, the 33rd state, the 34th state, and the 36th state, the UPF_A 235 may temporarily store the received user data, or the apparatus in the core network may perform the network-initiated UP connection establishment procedure to establish UP resources associated with a PDU session, based on reception of the user data from the DN_A 5 and/or the application server included in the DN_A 5. Further, the UPF_A 235 may transmit the user data to the UE_A 10 by using a corresponding PDU session, based on establishment of UP resources associated with a PDU session.

Further, in a case that the UE_A 10 and/or the apparatus in the core network is in the disconnected state and is also the 32nd identification information or the 35th identification information, the UPF_A 235 may temporarily store the received user data, or may indicate that the UPF_A 235 temporarily cannot transmit the user data to the DN_A 5 and/or the application server included in the DN_A 5, based on reception of the user data from the DN_A 5 and/or the application server included in the DN_A 5. Further, in this case, the UPF_A 235 may perform a procedure for releasing a corresponding PDU session. Note that the operation of the UPF_A 235 in response to reception of the user data from the DN_A 5 and/or the application server included in the DN_A 5 may not be limited to those operations described above.

Next, in a case that the UPF_A 235 transmits the user data, the UE_A 10 receives the user data from the DN_A 5 and/or the application server included in the DN_A 5 via the UPF_A 235. Through the above operation, each apparatus completes transmission and/or reception of user data of downlink packets.

2. Modifications

A program running on an apparatus according to the present invention may serve as a program that controls a Central Processing Unit (CPU) and the like to cause a computer to operate in such a manner as to realize the functions of the embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing such functions of the embodiment according to the present invention may be recorded on a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The above-mentioned electric circuit may include a digital circuit, or may include an analog circuit. Furthermore, in a case that with advances in semiconductor technology, a circuit integration technology that replaces the present integrated circuits appears, it is also possible to use a new integrated circuit based on the technology according to one or more aspects of the present invention.

Note that the invention of the present application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

REFERENCE SIGNS LIST

1 Mobile communication system
5 DN_A
10 UE_A
45 eNB_A
80 E-UTRAN_A
105 DN_B
120 5G-RAN_A
122 NR node_A
125 WLAN ANc
126 WAG_A
128 N3IWF_A
190 Core network_B
230 SMF_A
232 SMF_B
235 UPF_A
237 UPF_B
240 AMF_A

The invention claimed is:

1. A User Equipment (UE) comprising:
transmission and reception circuitry; and
a controller,
wherein
the controller is configured to perform a Service Request procedure via non-3GPP access to request a re-establishment of User Plane (UP) for a Protocol Data Unit (PDU) session,
the transmission and reception circuitry is configured to transmit a Service Request message in the Service Request procedure, and
the transmission and reception circuitry is configured to receive, from a core network device, an Internet Key Exchange (IKE) Create Child Security Association (SA) request message including an identification information of the PDU session in the Service Request procedure.

2. The UE according to claim 1, wherein the controller performs the Service Request procedure in a case that the UE is in CM-CONNECTED state or in CM-IDLE state.

\* \* \* \* \*